(12) United States Patent
Voss et al.

(10) Patent No.: US 11,064,256 B1
(45) Date of Patent: Jul. 13, 2021

(54) DYNAMIC CONFIGURATION OF COMMUNICATION VIDEO STREAM ARRANGEMENTS BASED ON AN ASPECT RATIO OF AN AVAILABLE DISPLAY AREA

(71) Applicant: MICROSOFT TECHNOLOGY LICENSING, LLC, Redmond, WA (US)

(72) Inventors: Chad A. Voss, Redmond, WA (US); Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/743,391

(22) Filed: Jan. 15, 2020

(51) Int. Cl.
*H04N 21/47* (2011.01)
*H04N 7/15* (2006.01)
*G06F 3/0481* (2013.01)
*H04N 21/431* (2011.01)

(52) U.S. Cl.
CPC ........... *H04N 21/47* (2013.01); *G06F 3/0481* (2013.01); *H04N 7/15* (2013.01); *H04N 21/4316* (2013.01); *G06F 2203/04803* (2013.01)

(58) Field of Classification Search
USPC .......................................... 348/14.01, 14.07
See application file for complete search history.

(56) References Cited

U.S. PATENT DOCUMENTS

| 7,554,571 B1 | 6/2009 | Beck et al. |
| 8,350,891 B2 | 1/2013 | Khot et al. |
| 8,379,077 B2 | 2/2013 | Wu et al. |
| 9,088,694 B2 | 7/2015 | Navon et al. |
| 9,148,627 B2 | 9/2015 | Anderson et al. |

(Continued)

FOREIGN PATENT DOCUMENTS

WO    2016168154 A1    10/2016

OTHER PUBLICATIONS

"About Sync Settings on Windows 10 devices", Retrieved from: https://web.archive.org/web/20190906210836/https:/support.microsoft.com/en-us/help/4026102/windows-10-about-sync-settings, Retrieved Date: Sep. 6, 2019, 2 Pages.

(Continued)

*Primary Examiner* — Maria El-Zoobi
(74) *Attorney, Agent, or Firm* — Newport IP, LLC; Scott Y. Shigeta

(57) ABSTRACT

The provided techniques improve user engagement and more efficient use of computing resources by dynamically configuring video stream arrangements based on an aspect ratio of an available display area and a target aspect ratio. Such techniques provide dynamically optimized user interface arrangements that accommodate any given shape of an available display area. The techniques can also help viewers maintain focus on the salient content of a multi-stream display when users resize a display window, move a window to a random shape, rotate a device, join a communication session, leave a communication session, present content streams, remove content streams, etc. A target aspect ratio can be utilized in a process to recursively divide a display area horizontally or vertically to accommodate any number of stream renderings. An adjustment of the target aspect can allow for an optimal display any number of video stream renderings for any shape of a display screen.

20 Claims, 48 Drawing Sheets

(56) References Cited

U.S. PATENT DOCUMENTS

| | | | |
|---|---|---|---|
| 9,369,672 | B2 | 6/2016 | Hiller et al. |
| 9,467,657 | B2 | 10/2016 | Decker et al. |
| 9,736,395 | B2 | 8/2017 | Ramon |
| 9,781,385 | B2 | 10/2017 | Ma et al. |
| 9,800,831 | B2 | 10/2017 | Diao |
| 9,819,877 | B1 | 11/2017 | Faulknerm et al. |
| 9,876,989 | B2 | 1/2018 | Noy et al. |
| 10,321,093 | B2 | 6/2019 | Duckworth et al. |
| 10,362,272 | B1 | 7/2019 | Van et al. |
| 10,389,977 | B1 | 8/2019 | Van Os et al. |
| 2004/0012724 | A1 | 1/2004 | Jang |
| 2005/0259144 | A1* | 11/2005 | Eshkoli .............. G06F 3/1454 348/14.07 |
| 2007/0200923 | A1* | 8/2007 | Eleftheriadis ...... H04N 21/4316 348/14.08 |
| 2007/0300165 | A1 | 12/2007 | Haveliwala |
| 2011/0093273 | A1 | 4/2011 | Lee et al. |
| 2011/0249074 | A1 | 10/2011 | Cranfill et al. |
| 2012/0062473 | A1 | 3/2012 | Xiao et al. |
| 2012/0249877 | A1 | 10/2012 | Hernandez costa et al. |
| 2013/0106988 | A1* | 5/2013 | Davis ................ H04L 65/403 348/14.09 |
| 2015/0092011 | A1 | 4/2015 | Zhan et al. |
| 2016/0308920 | A1 | 10/2016 | Brunsch et al. |
| 2018/0014049 | A1 | 1/2018 | Griffin et al. |
| 2018/0150433 | A1* | 5/2018 | Sowden ............. H04N 1/00185 |
| 2018/0191965 | A1 | 7/2018 | Faulkner et al. |
| 2019/0043453 | A1 | 2/2019 | Wang |
| 2019/0342519 | A1 | 11/2019 | Van Os et al. |

OTHER PUBLICATIONS

"Changing Your Own Video Layout", Retrieved from: https://documentation.avaya.com/bundle/UsingXTSeries_r91/page/xt1000_ug_calls_changeVideoLayout.html, Retrieved Date: Sep. 17, 2019, 4 Pages.

"Using Dual Monitors with the Zoom Desktop Client", Retrieved from: https://support.zoom.us/hc/en-us/articles/201362583-Using-Dual-Monitors-with-the-Zoom-Desktop-Client?mobile_site=true, Retrieved Date: Sep. 17, 2019, 3 Pages.

"ViewSplit-Display Layout Software", Retrieved from: https://web.archive.org/web/20170318042724/https:/www.viewsonic.com/us/viewsplit.html, Retrieved Date: Mar. 18, 2017, 4 Pages.

"Non-Final Office Action Issued in U.S. Appl. No. 16/179,255", dated Mar. 20, 2020, 10 Pages.

"Non-Final Office Action Issued in U.S. Appl. No. 16/729,272", dated Mar. 20, 2020, 8 Pages.

"Final Office Action Issued in U.S. Appl. No. 16/729,272", dated Oct. 8, 2020, 8 Pages.

"International Search Report and Written Opinion Issued in PCT Application No. PCT/US20/059254", dated Feb. 2, 2021, 18 Pages.

Girgensohn, Andreas, "A Fast Layout Algorithm for Visual Video Summaries", In Proceedings of the International Conference on Multimedia and Expo, vol. 2, Jul. 2003, pp. 77-80.

"International Search Report and Written Opinion Issued in PCT Application No. PCT/US20/061145", dated Feb. 25, 2021, 15 Pages.

"International Search Report and Written Opinion Issued in PCT Application No. PCT/US20/062469", dated Feb. 17, 2021, 15 Pages.

* cited by examiner

PROCESS:

DIVIDE AVAILABLE DISPLAY AREA VERTICALLY IF ASPECT RATIO OF AVAILABLE DISPLAY AREA > TARGET ASPECT RATIO

DIVIDE AVAILABLE DISPLAY AREA HORIZONTALLY IF ASPECT RATIO OF AVAILABLE DISPLAY AREA < TARGET ASPECT RATIO

EXAMPLE: DETERMINE TYPE OF DIVISION OF DISPLAY AREA 401

AVAILABLE DISPLAY AREA ASPECT RATIO 1:1 = 1   >   TARGET ASPECT RATIO 7:9 = .77

RESULT:

DIVIDE AVAILABLE DISPLAY AREA VERTICALLY (FIGURE 4B)

AVAILABLE DISPLAY AREA 401

BIN 411

TARGET ASPECT RATIO 410

CELL A
412A

EXAMPLE SCENARIO: COMPUTER RECEIVING 9 STREAMS

*FIG. 4A*

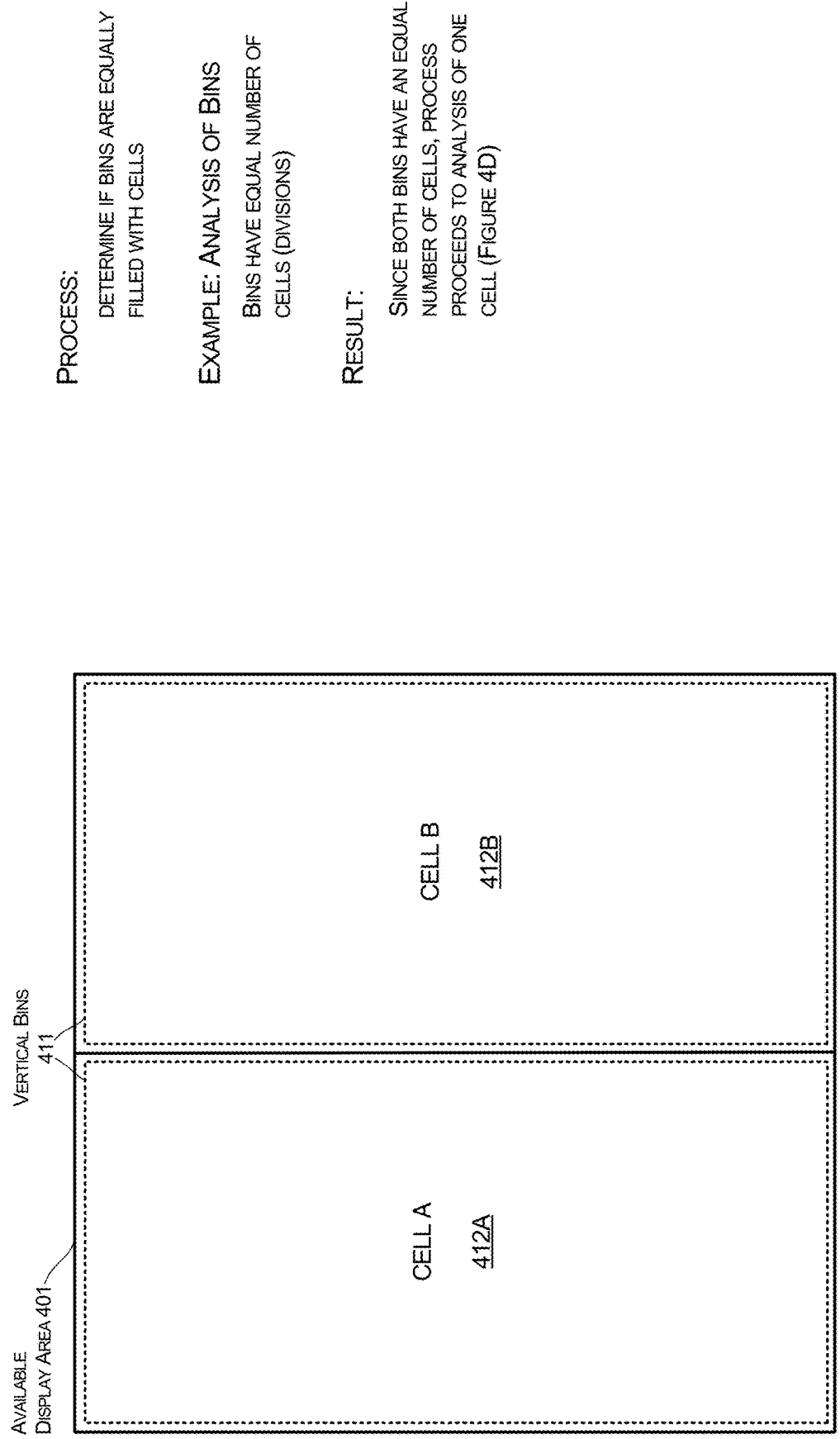

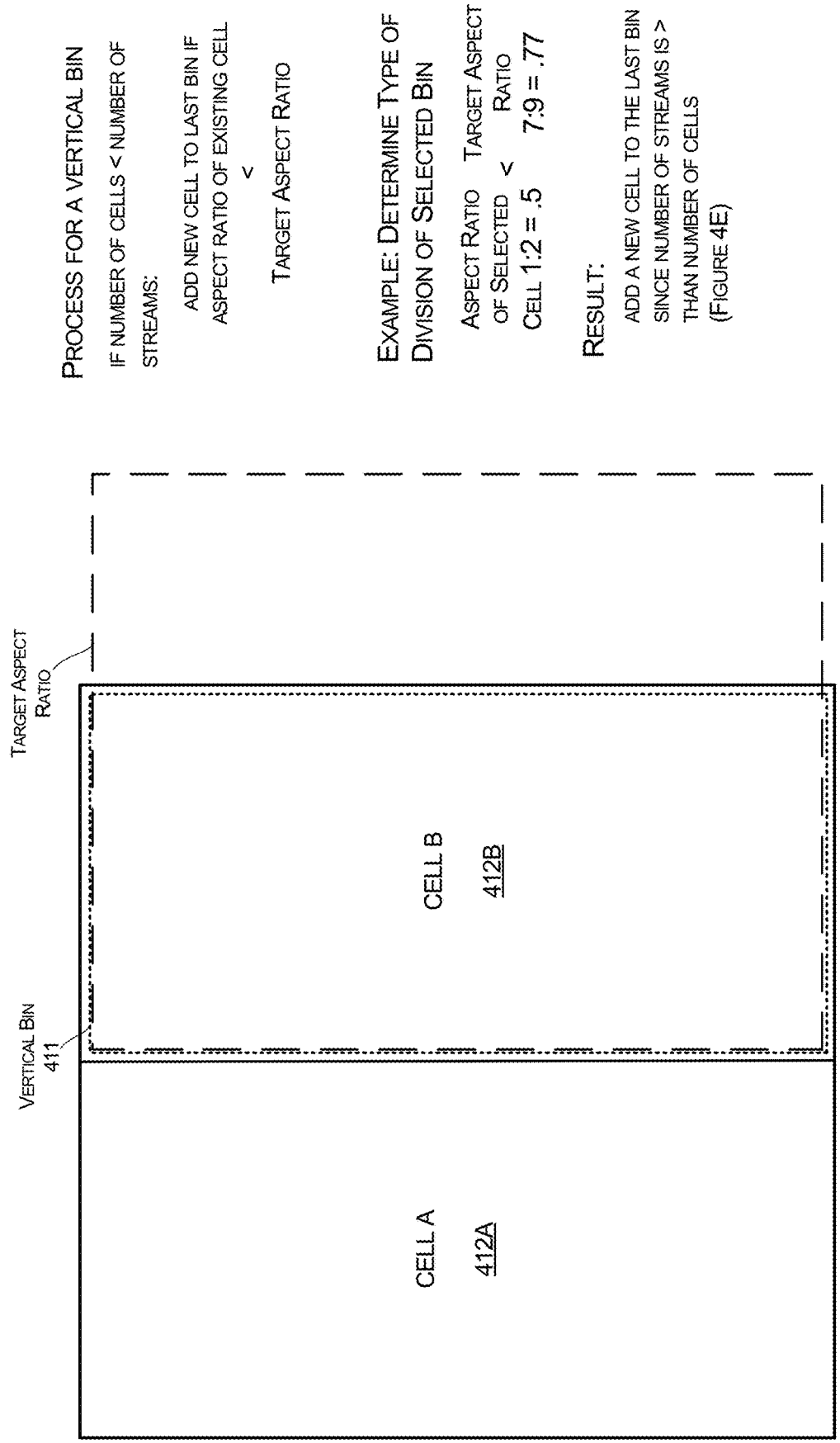

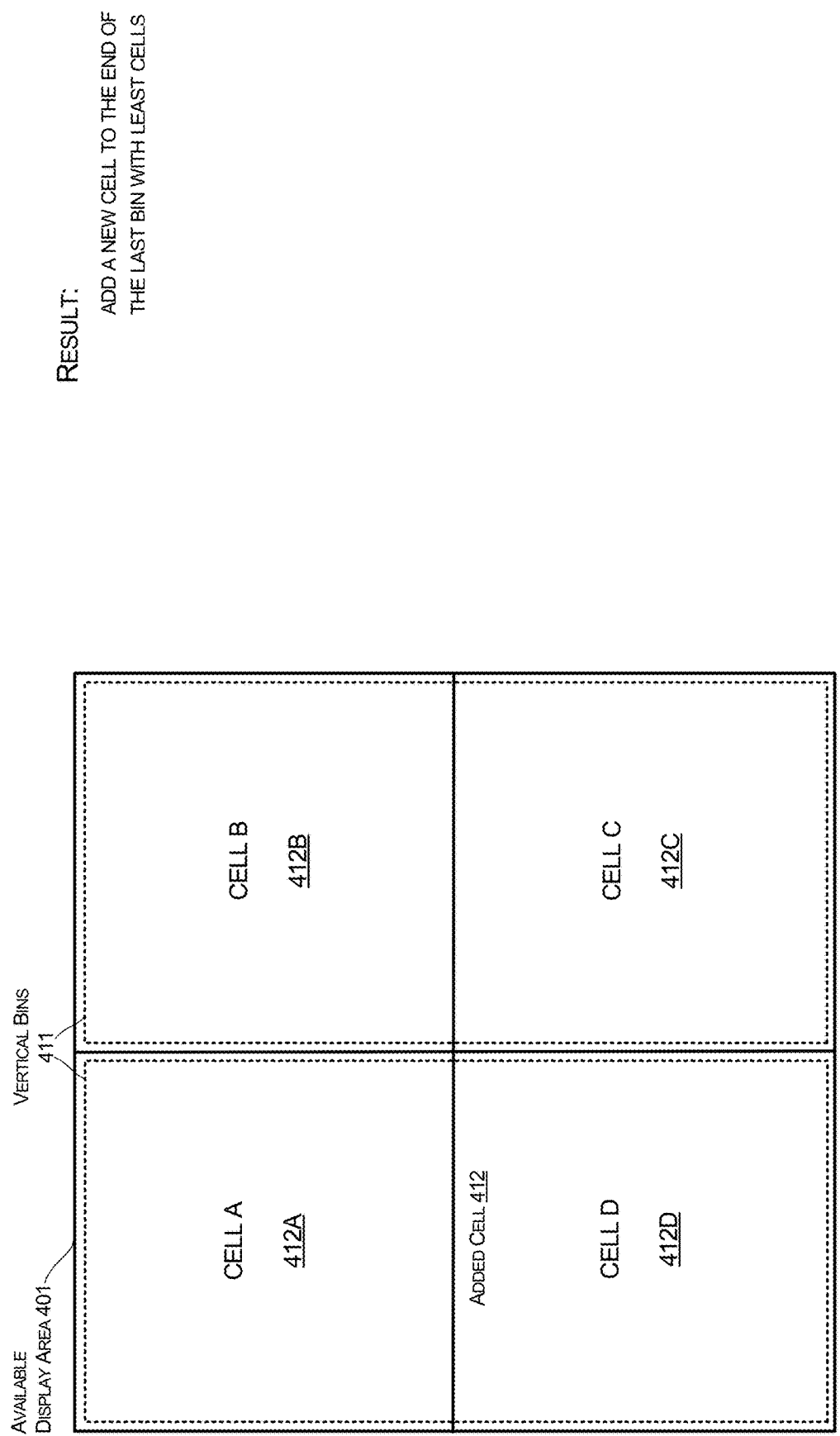

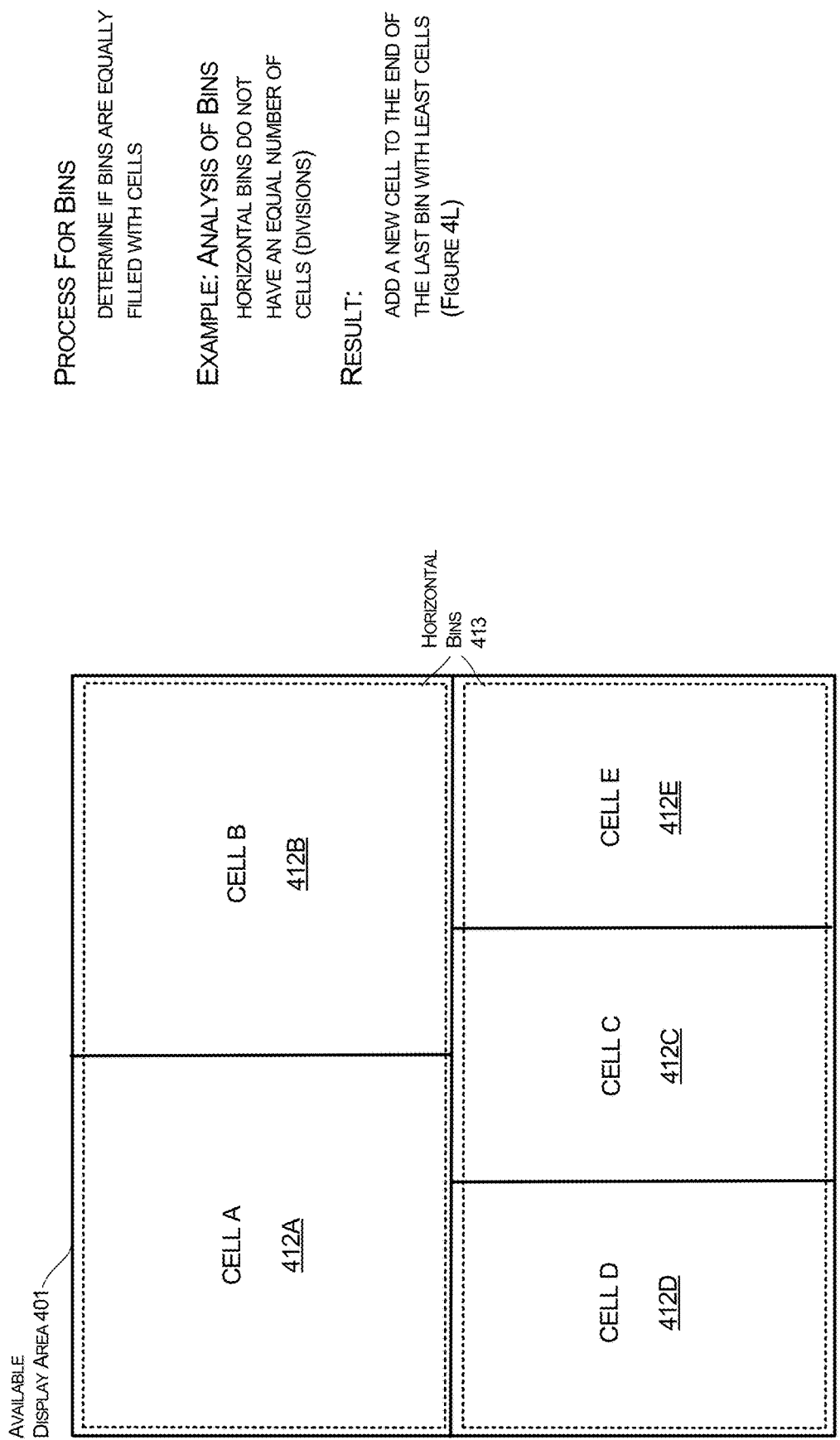

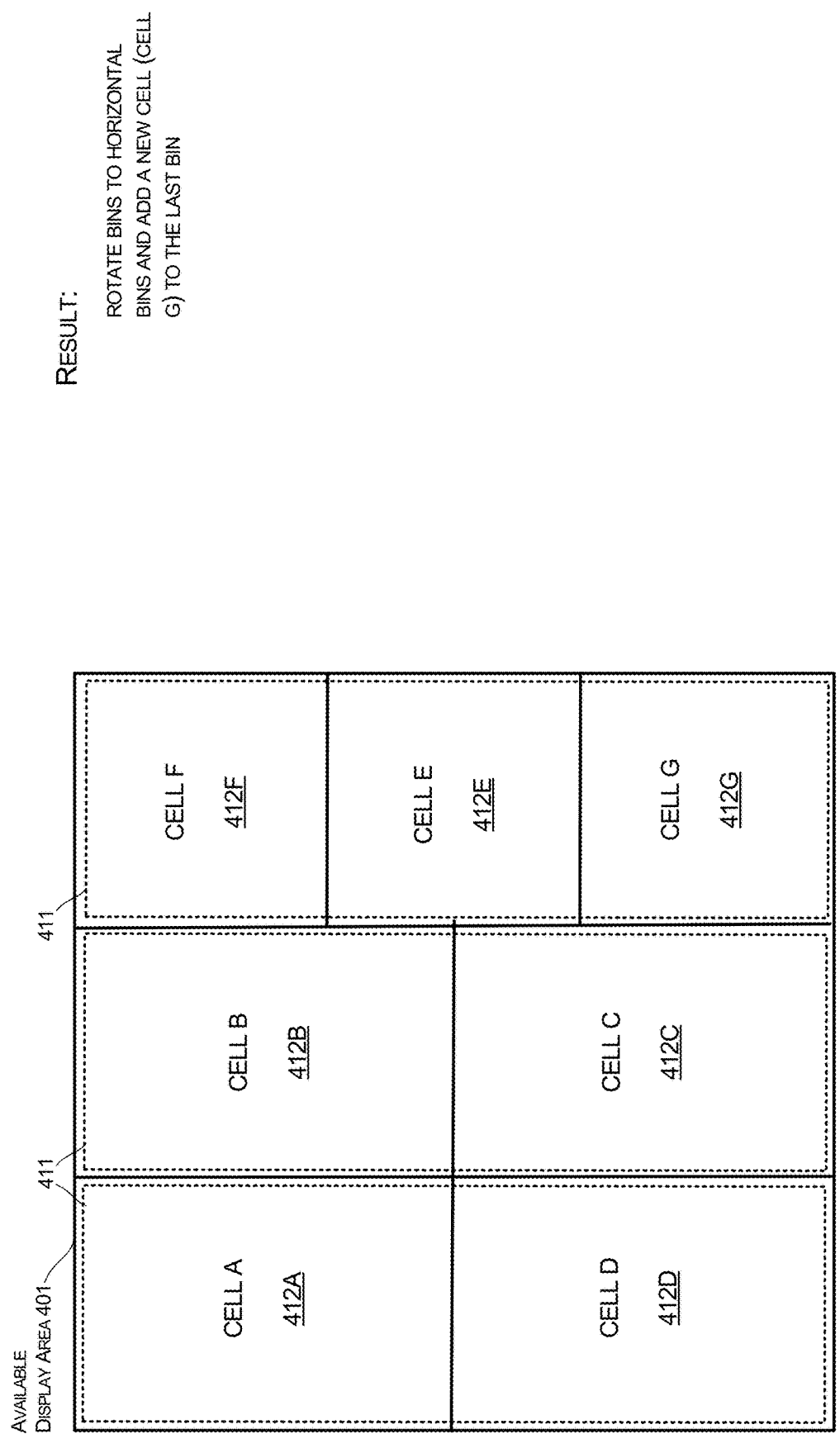

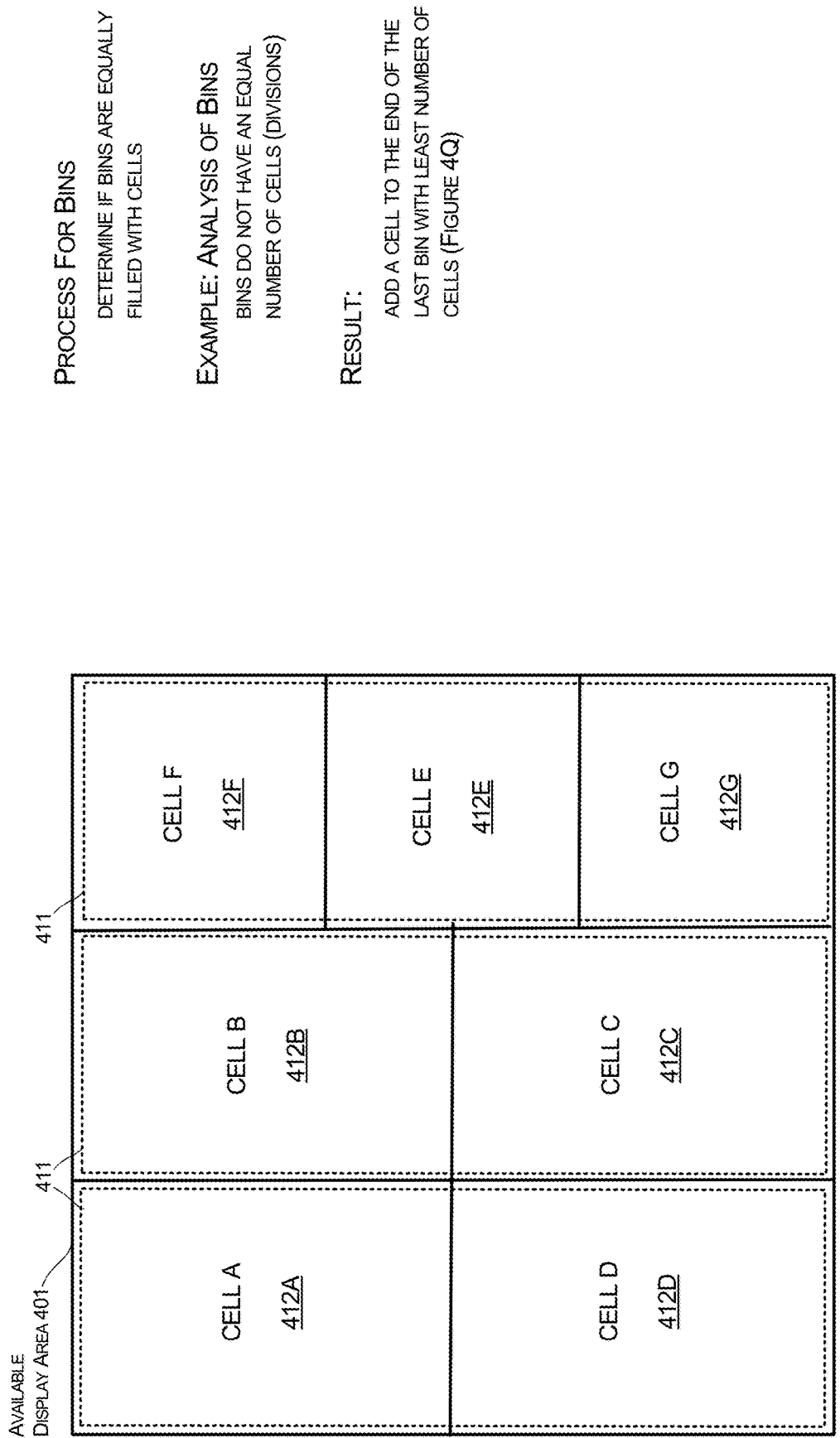

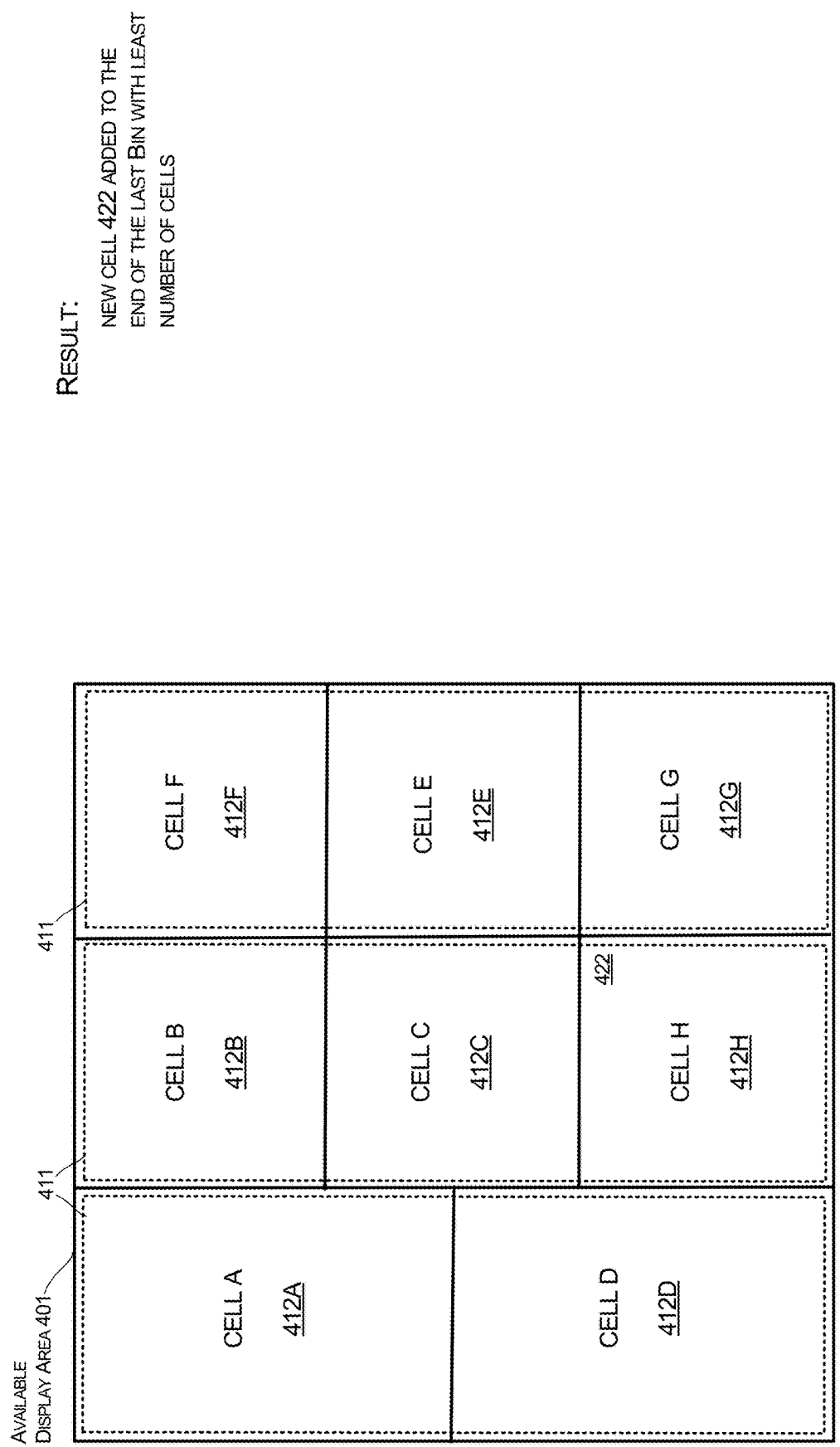

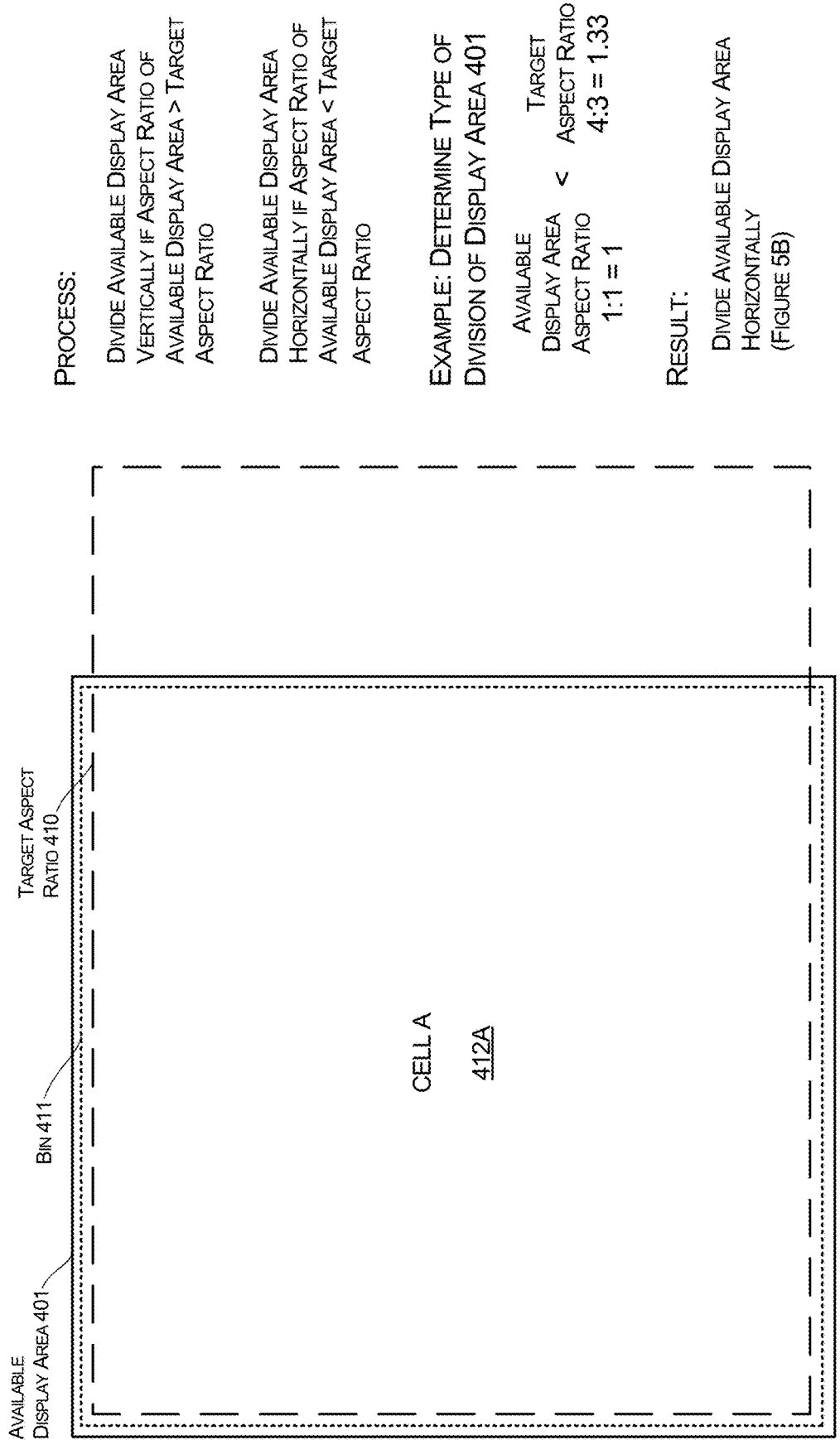

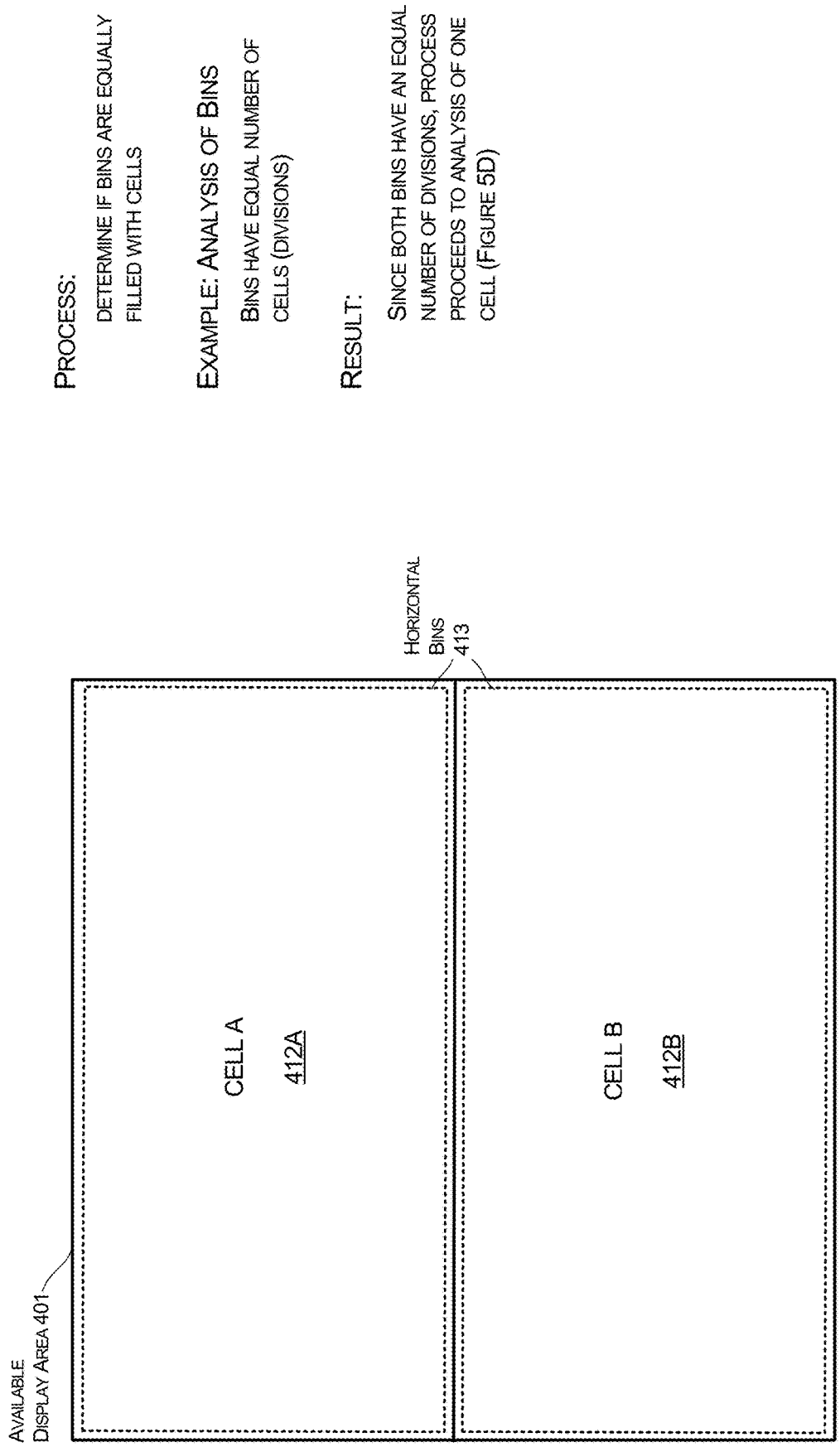

Example Scenario: Computer Receiving 5 Streams

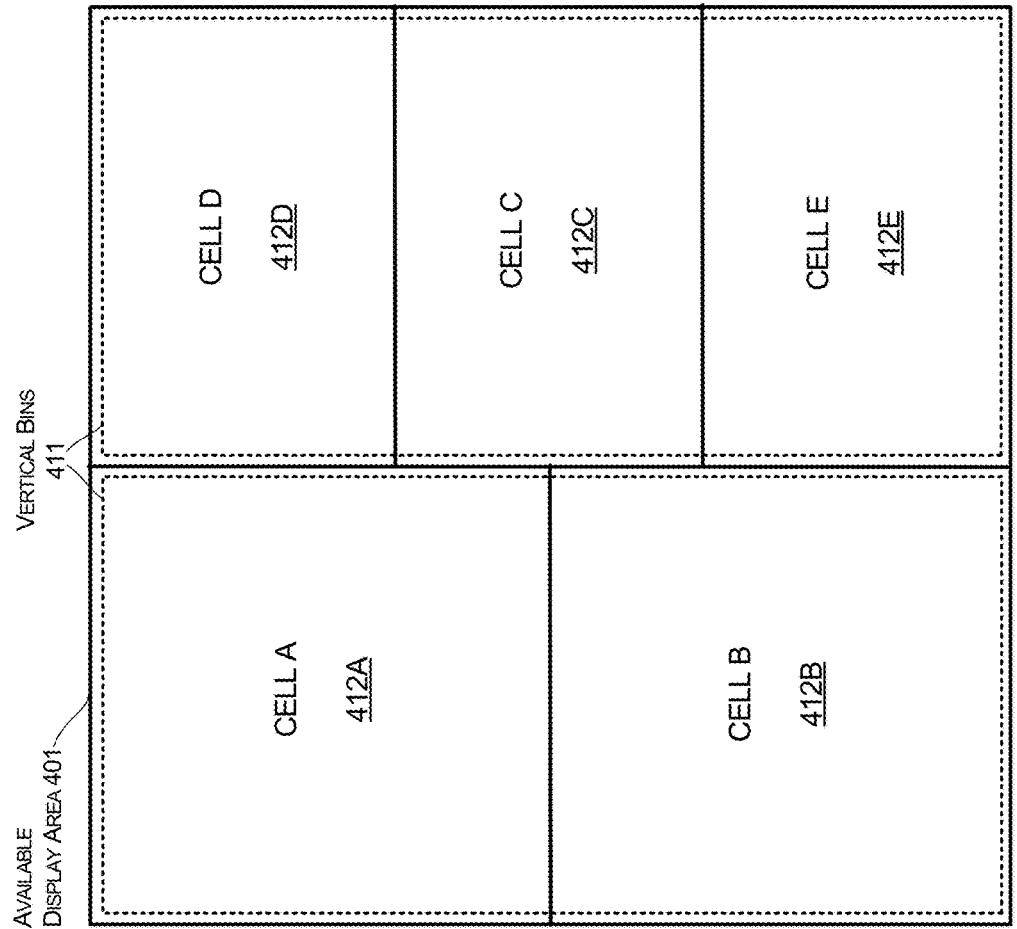

DYNAMIC CONFIGURATION OF COMMUNICATION VIDEO STREAM ARRANGEMENTS BASED ON AN ASPECT RATIO OF AN AVAILABLE DISPLAY AREA

BACKGROUND

There are a number of different communication systems that allow users to collaborate. For example, some systems allow people to collaborate by the use of live video streams, live audio streams, and other forms of text-based or image-based mediums. Participants of a communication session can share a video stream showing a single person or a group of people with a display of shared content. Such systems can provide participants of a communication session with an experience that simulates an in-person meeting.

Although there are a number of different types of systems that allow users to collaborate, such systems still have a number of shortcomings. For example, when a number of people participating in an on-line meeting changes, most existing systems have a user interface layout that adds or removes images of participants in a fixed order. When participants join a meeting, images of each participant are added in a fixed position or in a randomly selected position. Such activity can cause distractions to the displayed content. Even worse, some video stream renderings may be rearranged or moved as new streams are added to, or removed from, a user interface. Such movement can make it hard for viewers to follow the activity of a meeting. Such user interface arrangements may not optimally promote user engagement since participants may not be able to clearly see important gestures performed by each person, especially if images of certain people are repositioned as other users join or leave a session. Such issues can hinder user engagement and reduce the efficacy of a communication session.

Software applications that do not promote user engagement can lead to production loss and inefficiencies with respect to computing resources. For instance, participants of a communication session, such as an online meeting, may need to refer to recordings or other resources when content is missed or overlooked. Content may need to be re-sent or re-played when users miss salient points during a live meeting. Such activities can lead to inefficient use a network, processor, memory, or other computing resources. Also, when a participant's level of engagement is negatively impacted by a poor user interface arrangement, such a loss of production may cause a need for prolonged meetings or follow-up meetings, which in turn take additional computing resources. Such production loss and inefficiencies with respect to computing resources can be exacerbated when a system is used to provide a collaborative environment for a large number of participants.

In addition to a loss in user engagement, a number of other inefficiencies can result when communication systems do not effectively display a live video of a person. Participants can miss important social cues, e.g., when a person raises their hand, begins to speak, looks in a certain direction, etc. Such shortcomings sometimes require users to manually interact with a number of different systems. For example, some users still send text messages or emails to other participants while in a conference call if a cue was missed, etc. Such manual steps can be disruptive to a person's workflow and highly inefficient when it comes to helping a person establish a collaboration protocol with a group of people. Such drawbacks of existing systems can lead to loss of productivity as well as inefficient use of computing resources.

SUMMARY

The techniques disclosed herein improve user engagement and more efficient use of computing resources by providing a system that dynamically configures communication video stream arrangements based on an aspect ratio of an available display area and a target aspect ratio. Such techniques provide dynamically optimized user interface "UI" arrangements that accommodate a wide range of dimensions of an available display area. The techniques can also help viewers maintain focus on salient content of a multi-stream display when users resize a display window, re-shape a display window to an irregular set of dimensions, rotate a device, join a communication session, leave a communication session, present content streams, remove content streams, etc. A target aspect ratio can be utilized in a process to recursively divide a display area horizontally or vertically to accommodate any number of stream renderings. The target aspect ratio can be used by a system to determine a position, size and aspect ratio for each stream. An overall look and feel of the user interface can be controlled by the target aspect ratio. An adjustment of the target aspect ratio can allow a system to automatically arrange a user interface to optimally display any number of video stream renderings. One of the benefits of the target aspect ratio is that the movement of any stream renderings, e.g., a new person being added to, or remove from, a UI, is positioned away from the renderings of any streams having any salient content. The use of the target aspect ratio also minimizes changes to the size, shape, and position of the salient streams.

The examples described herein are provided within the context of collaborative environments involving a communication session, e.g., private chat sessions, multi-user editing sessions, group meetings, live broadcasts, etc. For illustrative purposes, it can be appreciated that a computer managing a collaborative environment involves any type of computer managing a communication session where two or more computers are sharing video data, both recorded and live video streams. In addition, it can be appreciated that the techniques disclosed herein can apply to any user interface arrangement that is used for displaying content. The scope of the present disclosure is not limited to embodiments associated with collaborative environments.

The techniques disclosed herein provide a number of features that improve existing computers. For instance, computing resources such as processor cycles, memory, network bandwidth, and power, are used more efficiently as a system can dynamically control the size, position, and shape of video streams depicting a threshold number of people. By providing dynamically controlled user interfaces that provide more visual details for objects of interest, the techniques disclosed herein can provide more efficient use of computing resources. The system can improve user interaction with a computing device by mitigating the need for additional communication systems, as the disclosed system can mitigate or eliminate the need for requests for content to be re-sent, repeated, etc. Improvement of user interactions with a device can also lead to the reduction of unnecessary or redundant inputs, which can mitigate inadvertent inputs, corrected inputs, and other types of user interactions that utilize computing resources. Other technical benefits not specifically mentioned herein can also be realized through implementations of the disclosed subject matter.

Those skilled in the art will also appreciate that aspects of the subject matter described herein can be practiced on or in conjunction with other computer system configurations beyond those specifically described herein, including multiprocessor systems, microprocessor-based or programmable consumer electronics, augmented reality or virtual reality devices, video game devices, handheld computers, smartphones, smart televisions, self-driving vehicles, smart watches, e-readers, tablet computing devices, special-purpose hardware devices, networked appliances, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 4A illustrates aspects of a first state of a process for configuring an arrangement of video stream renderings within a user interface based on an aspect ratio of an available display area and a target aspect ratio.

FIG. 4C illustrates aspects of a third state of a process for configuring an arrangement of video stream renderings within a user interface based on an aspect ratio of an available display area and a target aspect ratio.

FIG. 4D illustrates aspects of a fourth state of a process for configuring an arrangement of video stream renderings within a user interface based on an aspect ratio of an available display area and a target aspect ratio.

FIG. 4G illustrates aspects of a seventh state of a process for configuring an arrangement of video stream renderings within a user interface based on an aspect ratio of an available display area and a target aspect ratio.

FIG. 4K illustrates aspects of an eleventh state of a process for configuring an arrangement of video stream renderings within a user interface based on an aspect ratio of an available display area and a target aspect ratio.

FIG. 4O illustrates aspects of a fifteenth state of a process for configuring an arrangement of video stream renderings within a user interface based on an aspect ratio of an available display area and a target aspect ratio.

FIG. 4P illustrates aspects of a sixteenth state of a process for configuring an arrangement of video stream renderings within a user interface based on an aspect ratio of an available display area and a target aspect ratio.

FIG. 4Q illustrates aspects of a seventeenth state of a process for configuring an arrangement of video stream renderings within a user interface based on an aspect ratio of an available display area and a target aspect ratio.

FIG. 5A illustrates aspects of a first state of a process for configuring an arrangement of video stream renderings within a user interface based on an aspect ratio of an available display area and an adjusted target aspect ratio.

FIG. 5C illustrates aspects of a third state of a process for configuring an arrangement of video stream renderings within a user interface based on an aspect ratio of an available display area and an adjusted target aspect ratio.

FIG. 5I illustrates aspects of a ninth state of a process for configuring an arrangement of video stream renderings within a user interface based on an aspect ratio of an available display area and an adjusted target aspect ratio.

DETAILED DESCRIPTION

Figure 1A:
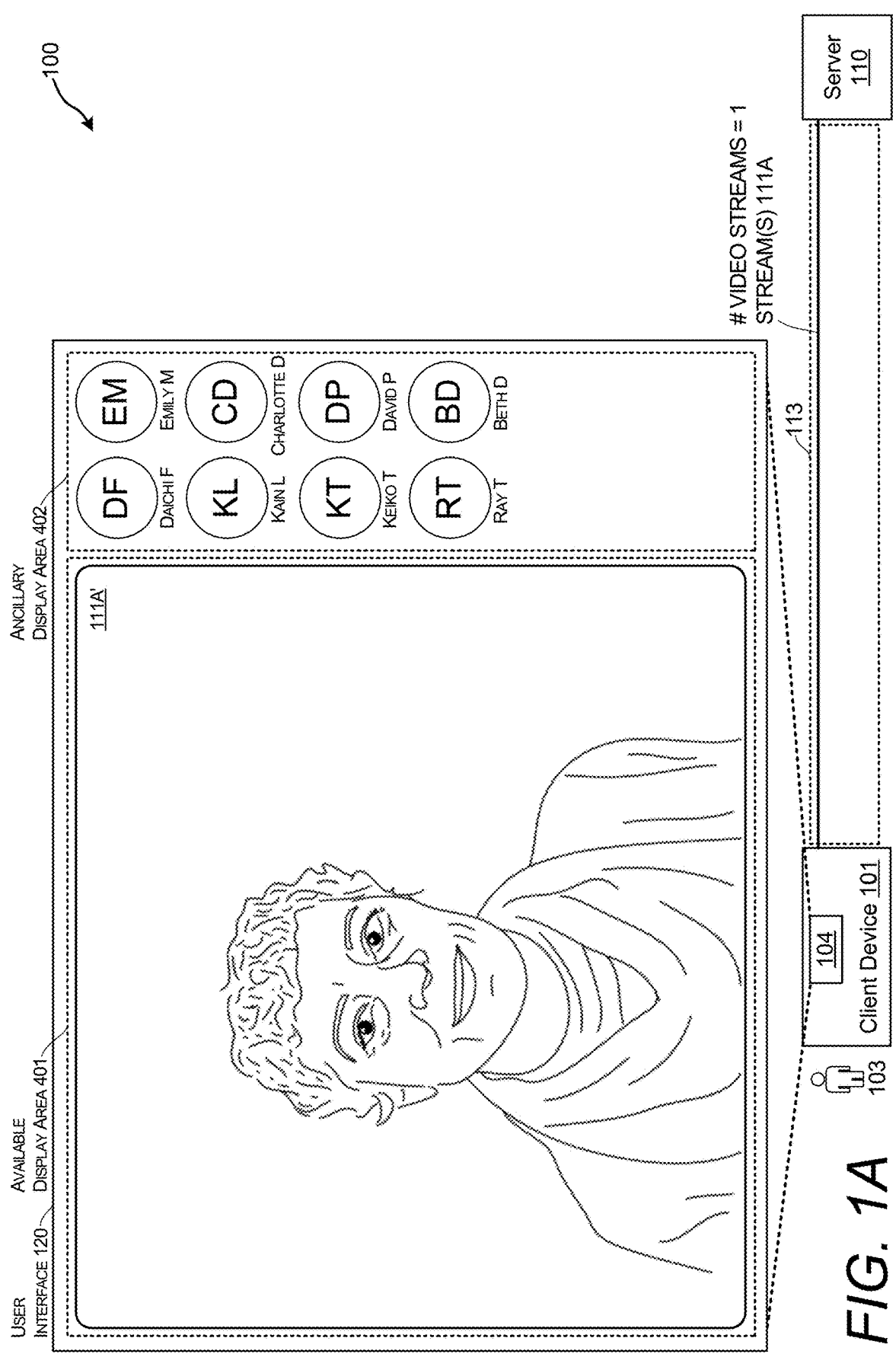
FIG. 1A illustrates aspects of a communication system in a first state of a process for configuring an arrangement of video stream renderings within a user interface based on an aspect ratio of an available display area.

The techniques disclosed herein improve user engagement and more efficient use of computing resources by providing a system that dynamically configures communication video stream arrangements based on an aspect ratios of an available display area. Such techniques provide dynamically optimized user interface "UI" arrangements that accommodate any given shape of an available display area. FIGS. 1A-1I illustrate aspects of a process for configuring a video stream arrangement of a user interface based on an aspect ratio of an available display area and a target aspect ratio. Specifically, FIG. 1A illustrates aspects of a system 100 comprising a server 110 and at least one client device 101. The server 110 can manage a number of data streams 111 (individually referred to as 111A, 111B, etc.) each having a video component and/or an audio component allowing the client device 101 to communicate with a number of other remote client devices. In general, the server 110 can generate session data 113 that can control a user interface layout displayed on the client device 101. In addition, the session data 113 can include one or more data streams which include an audio component and/or a video component. Additional aspects of the server 110 managing communication sessions between client computers are described in additional detail below with reference to the system 602 shown in FIG. 8. Additional aspects of the client device 101 are also described in more detail below with reference to the devices 606 shown in FIG. 8.

In some configurations, the user interface 120 can include an available display area 401 and an ancillary display area 402. Each display area can be utilized for displaying different types of content. For instance, the available display area 401 can be used to display live or recorded video streams of a communication session, while the ancillary display area 402 can be utilized for displaying graphical elements representing individual participants of a communication session. The graphical elements may be utilized to represent participants who are only communicating an audio stream. The graphical elements may also be utilized in an event where the number of displayed video streams is controlled by one or more predetermined configuration settings. Such configurations can cause some participants to be represented in the ancillary display area 402 instead of being displayed in the available display area 401, which can be reserved for select video streams having a threshold priority level.

The available display area 401 may be a display area that is designated within one or more display screens. For instance, the available display area 401 may be a specified display area spanning across multiple display devices or a specified display area of a portion of a single display device. In one illustrative example, a specific available display area 401 can be selected based on the boarders of a specific display window and one or more reserved areas, such as the ancillary display area 402. The available display area 401 may be defined by one or more parameters, such as an aspect ratio, one or more coordinates defining corners of the available display area 401, vector data and/or other data defining a viewable area of a user interface 120.

In the example of FIG. 1A, the available display area 401 is a portion of the user interface 120 that is reserved for displaying renderings of select streams 111 that are communicated from the server 110. The user interface 120 can be controlled, at least in part, by display data 104 that can be generated by the client device 101. As shown, a first state of the system 100 shows that the server 110 is communicating a first stream 111A to the client device 101, and the session data 113 and cause the client device 101 to generate display data 104 defining an arrangement of the user interface 120. As a result, the user interface 120 can display a first rendering 111A' of the first stream 111A.

As shown in the series of images of FIGS. 1A-1I, as the server 110 adds additional streams 111B-111N to the session data 113, the client device 101 changes the arrangement of the stream renderings 111A'-111N' shown within the available display area 401 of the user interface 120. This series of images is provided to show one example of a user interface arrangement that may result from the techniques disclosed herein. In one aspect, this example shows how the techniques disclosed herein can minimize the movement of select renderings while streams are being added to a communication session. In addition, this example shows, in conjunction with the other examples, how a target aspect ratio can be used by a computing system to change the characteristics of a user interface layout to maximize the use of a display area.

Figure 1B:
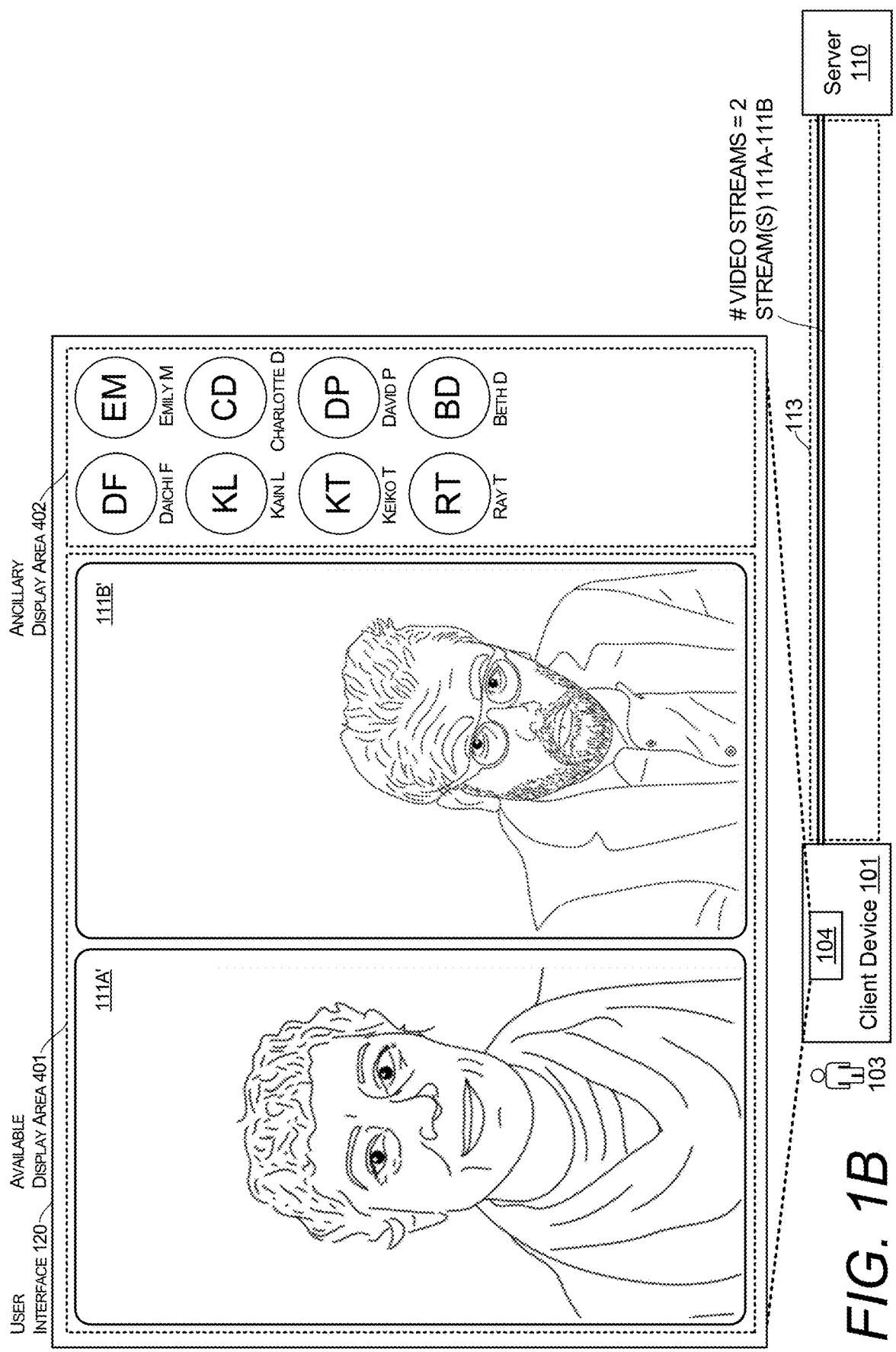
FIG. 1B illustrates aspects of a communication system in a second state of a process for configuring an arrangement of video stream renderings within a user interface based on an aspect ratio of an available display area.

FIG. 1B illustrates a second state of the process for configuring a user interface displaying a communication video stream arrangement based on an aspect ratio of the available display area. In this state, the addition of the second stream 111B causes the client device to display a rendering 111B' of the second stream 111B in accordance with the techniques disclosed herein. As will be described in more detail below, the aspect ratio of the available display area is compared with a target aspect ratio to determine the position and size of the rendering 111B' of the second stream 111B. In addition, the client device 101 adjusts the rendering of the first rendering 111A' of the first stream 111A to allocate space for the added rendering.

Figure 1C:
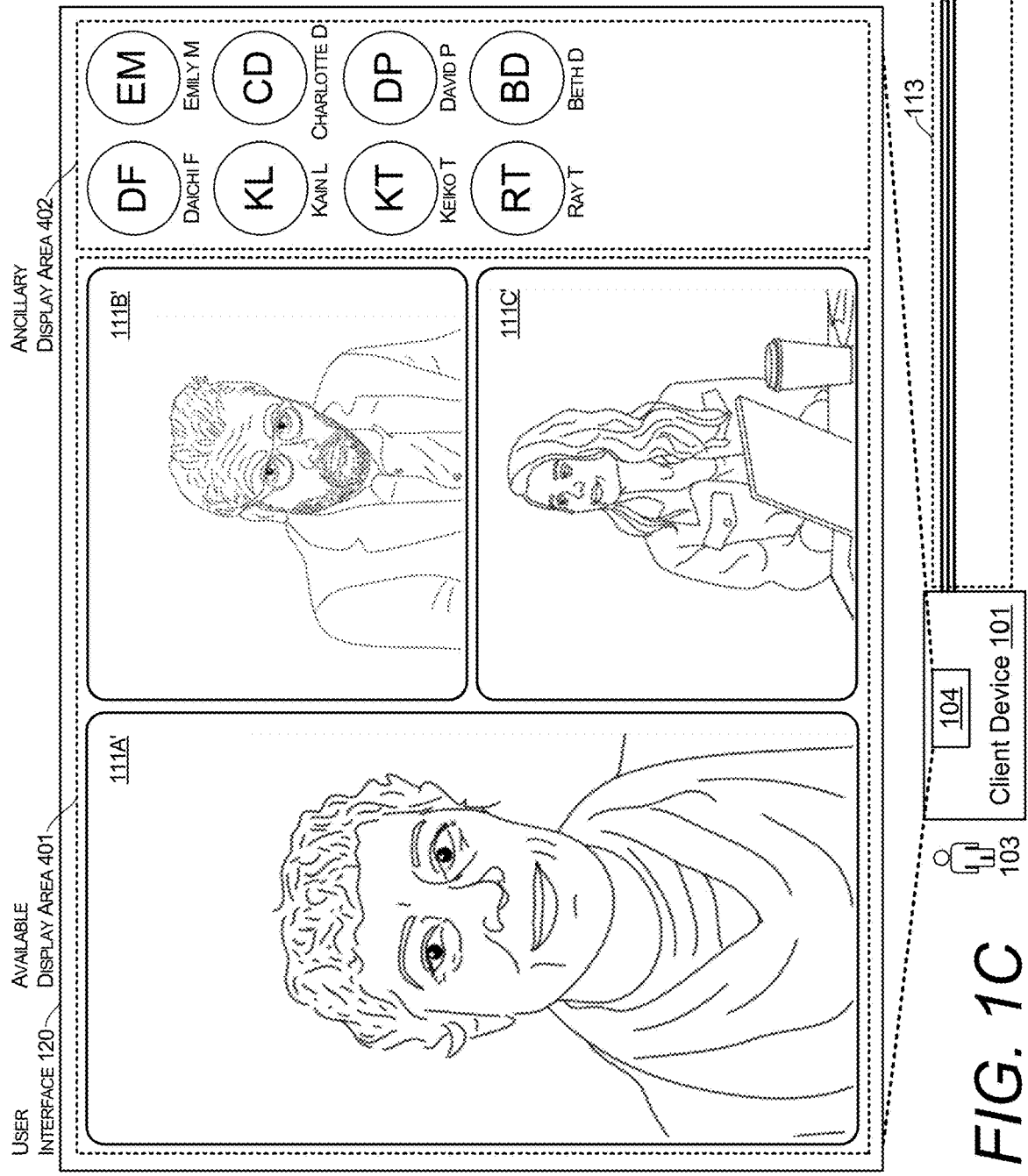
FIG. 1C illustrates aspects of a communication system in a third state of a process for configuring an arrangement of video stream renderings within a user interface based on an aspect ratio of an available display area.

FIG. 1C illustrates a third state of the process for configuring a user interface displaying a communication video stream arrangement. In this state, the addition of the third stream 111C causes the client device to display a rendering 111C' of the third stream 111C in accordance with the techniques disclosed herein. As will be described in more detail below, one or more sections of the available display area 401 are analyzed to determine the position and size of the rendering 111C' of the third stream 111C. In addition, the client device 101 adjusts the existing renderings 111A'-111B' to allocate space for the added rendering.

Figure 1D:
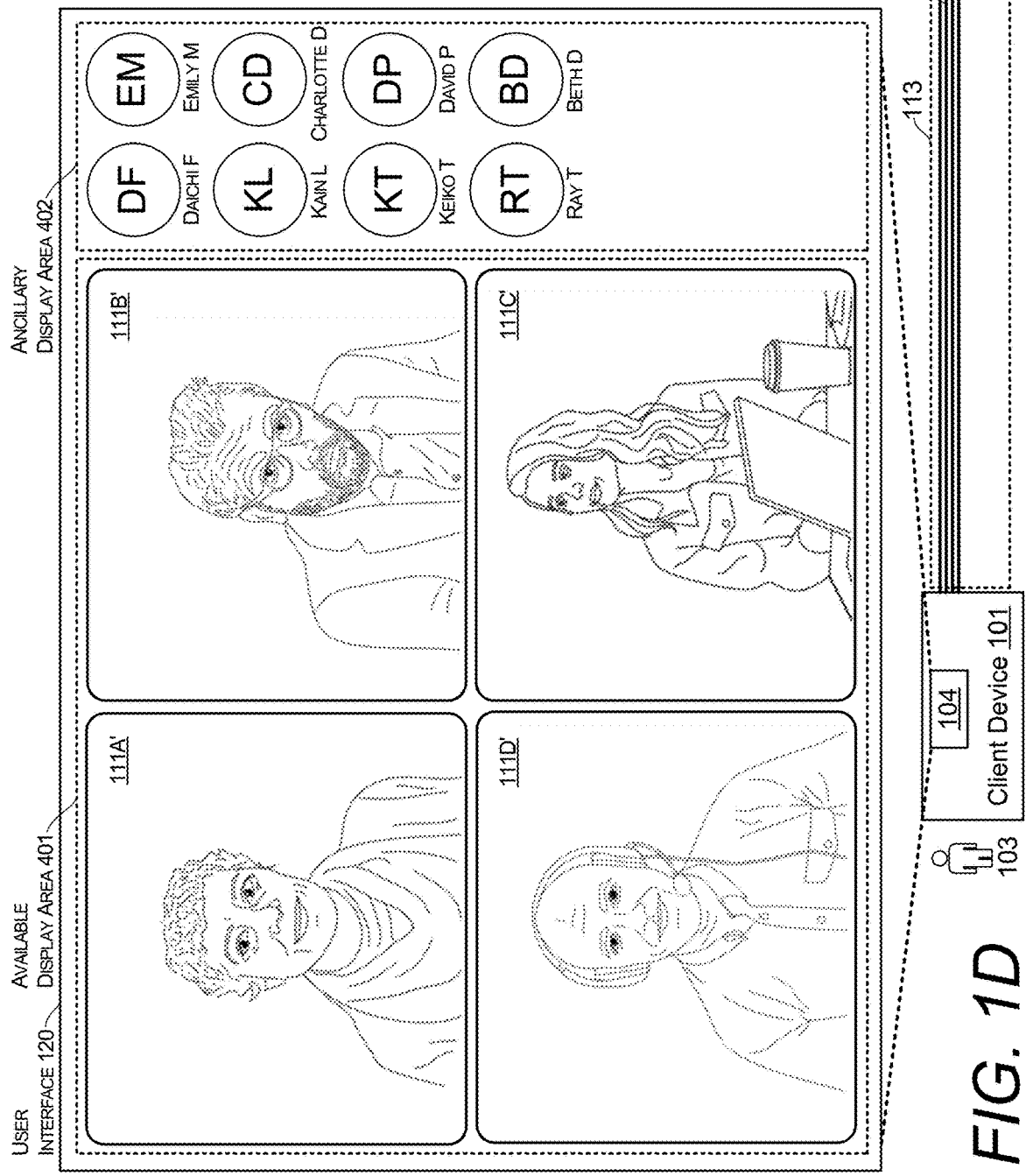
FIG. 1D illustrates aspects of a communication system in a fourth state of a process for configuring an arrangement of video stream renderings within a user interface based on an aspect ratio of an available display area.
Figure 1E:
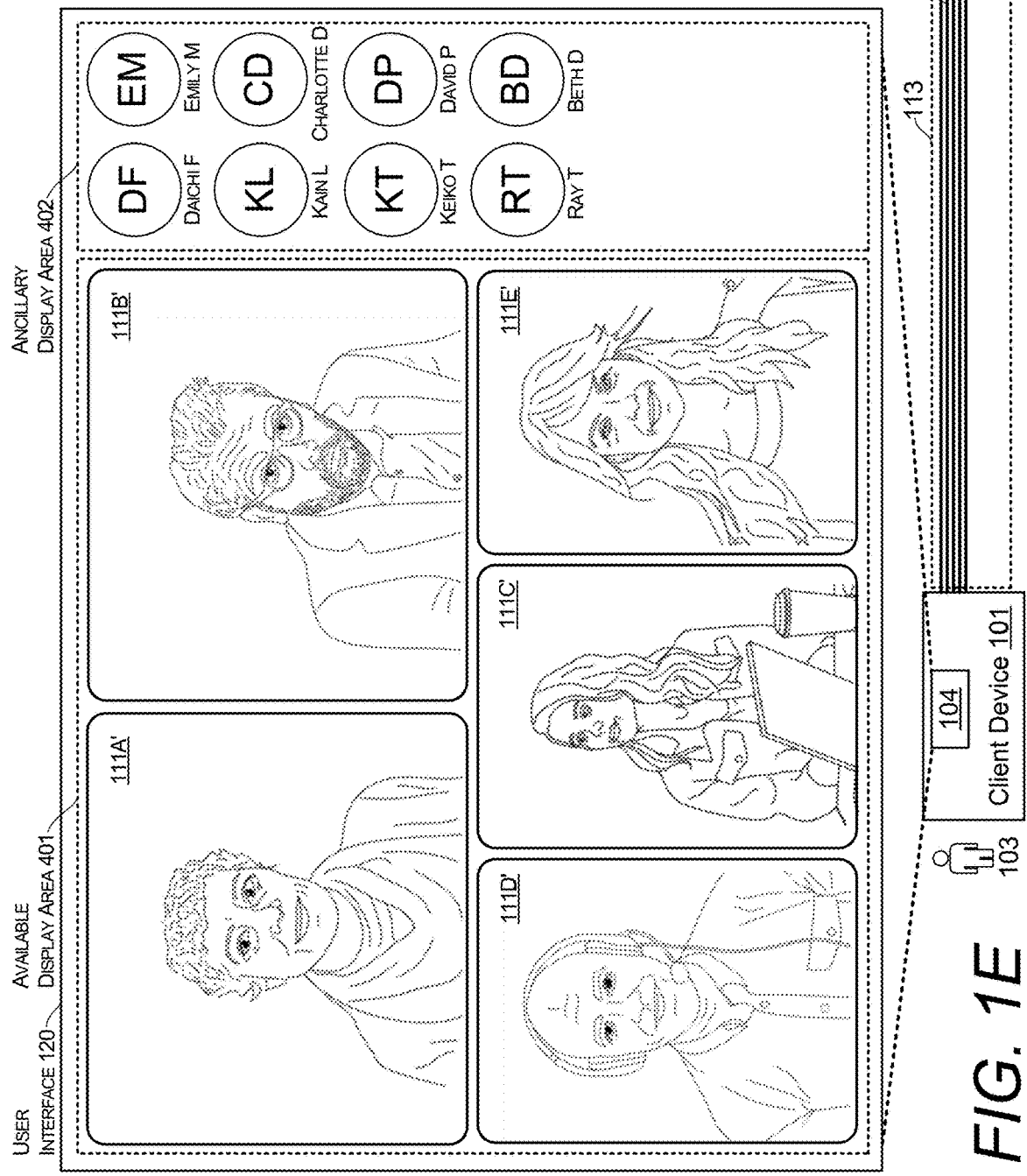
FIG. 1E illustrates aspects of a communication system in a fifth state of a process for configuring an arrangement of video stream renderings within a user interface based on an aspect ratio of an available display area.
Figure 1F:
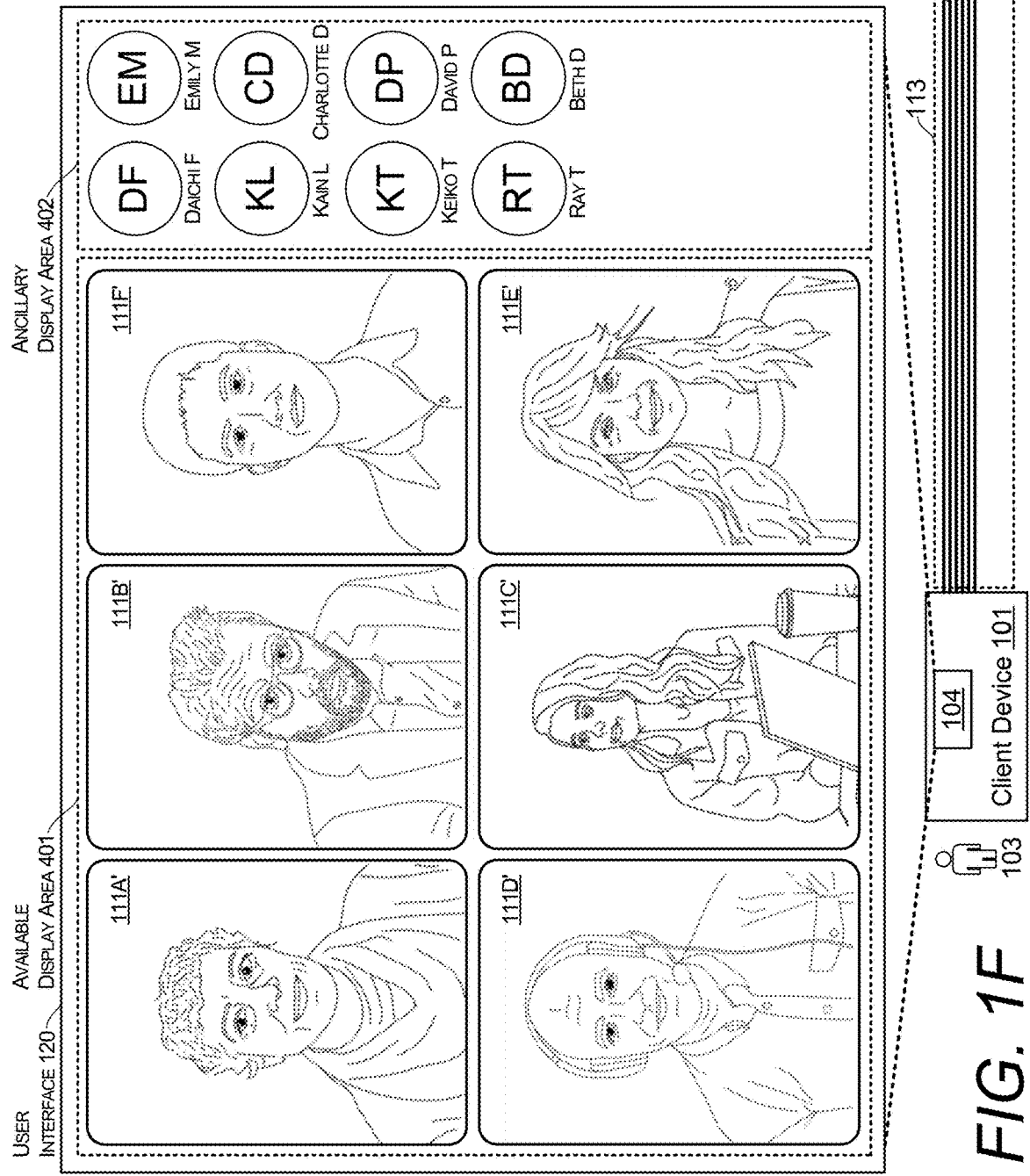
FIG. 1F illustrates aspects of a communication system in a sixth state of a process for configuring an arrangement of video stream renderings within a user interface based on an aspect ratio of an available display area.
Figure 1G:
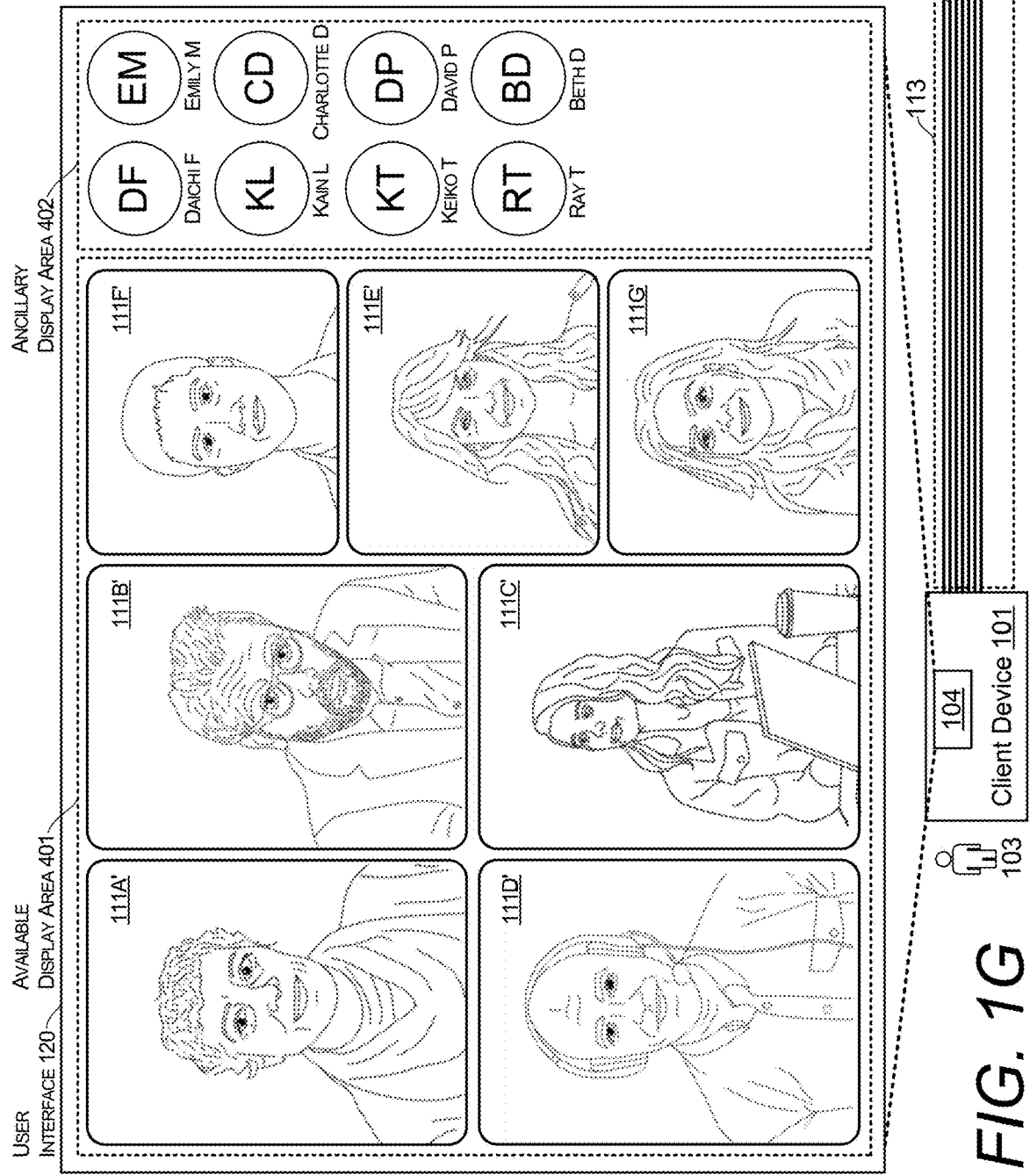
FIG. 1G illustrates aspects of a communication system in a seventh state of a process for configuring an arrangement of video stream renderings within a user interface based on an aspect ratio of an available display area.
Figure 1H:
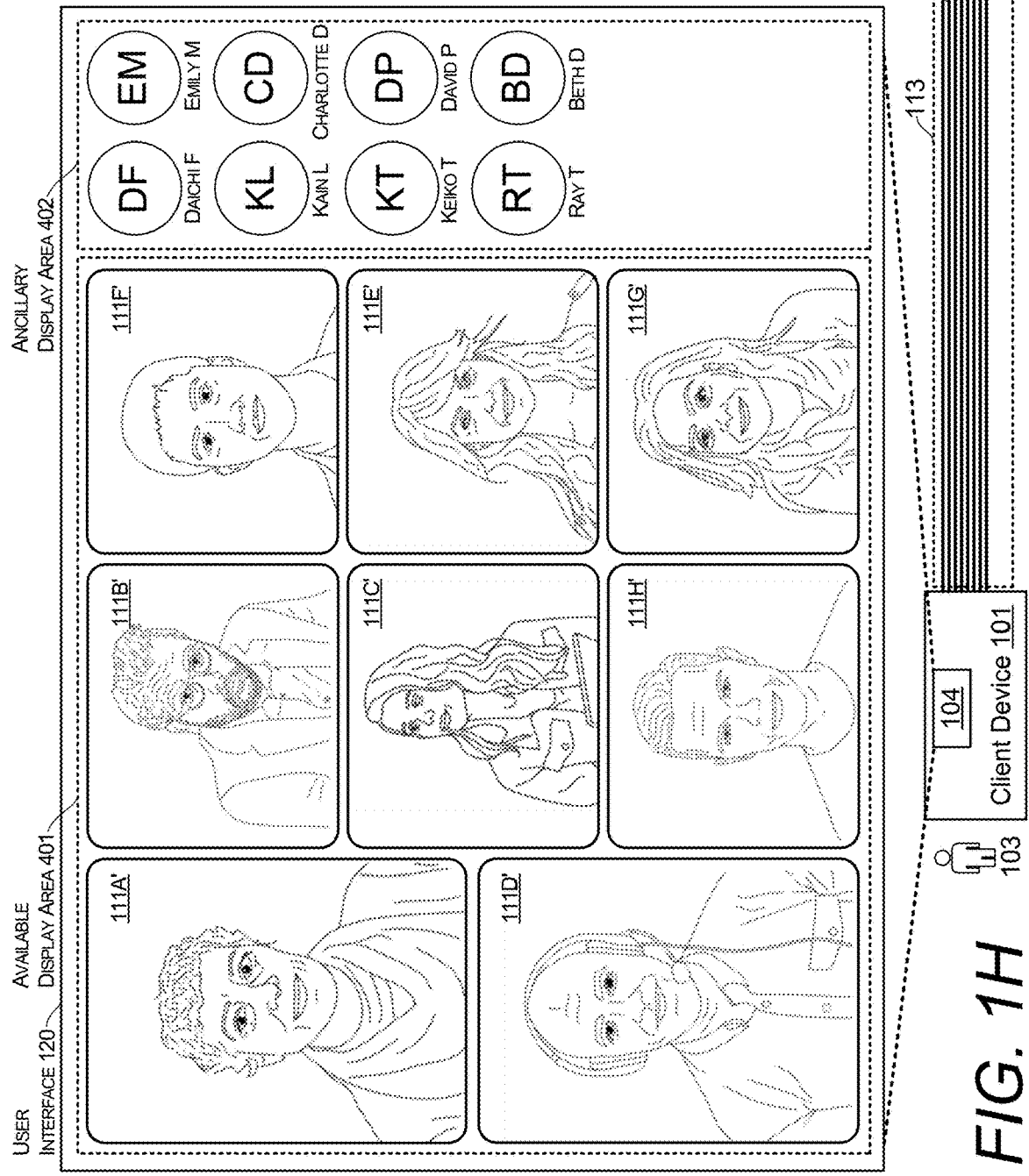
FIG. 1H illustrates aspects of a communication system in an eighth state of a process for configuring an arrangement of video stream renderings within a user interface based on an aspect ratio of an available display area.
Figure 1I:
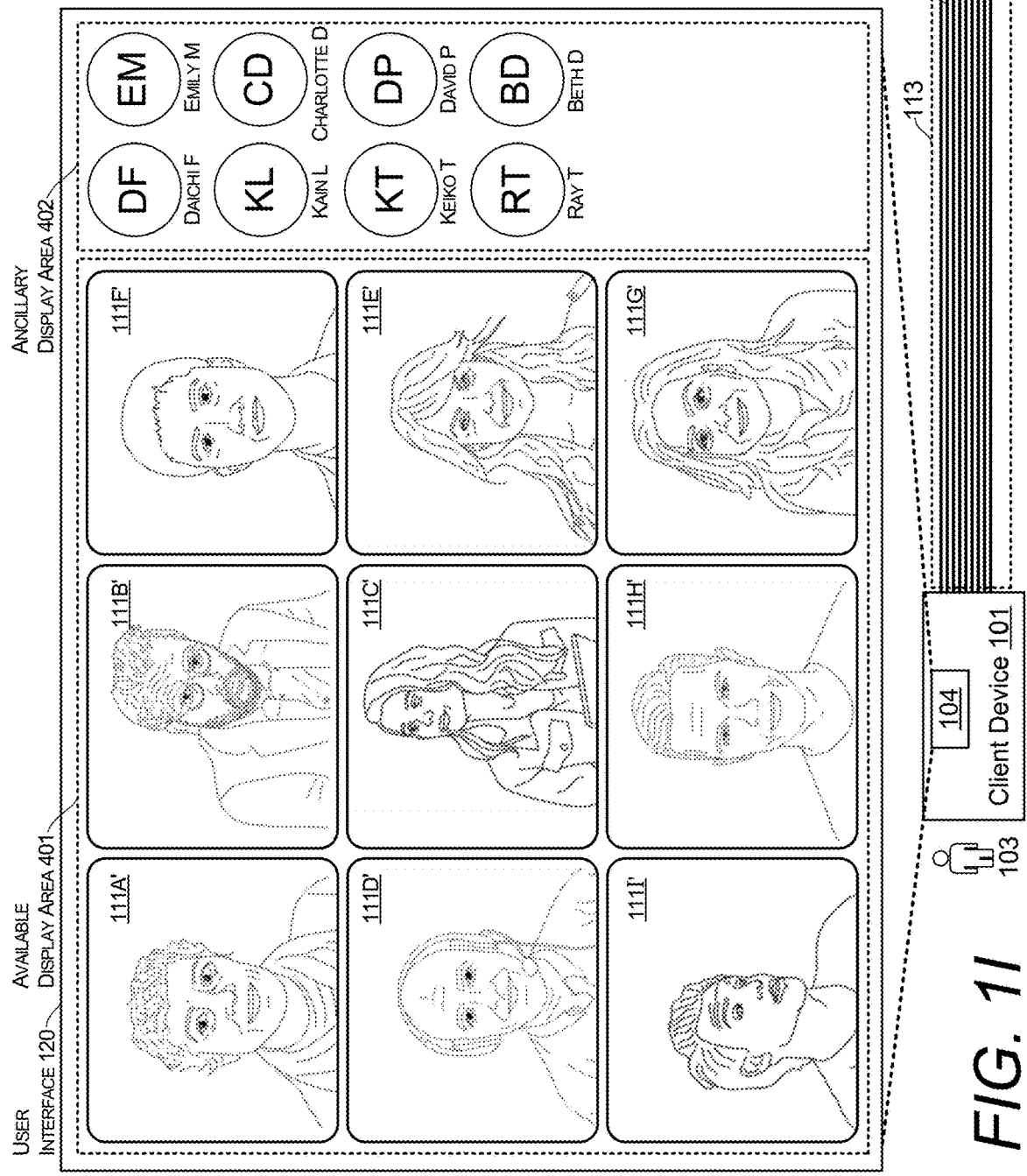
FIG. 1I illustrates aspects of a communication system in a ninth state of a process for configuring an arrangement of video stream renderings within a user interface based on an aspect ratio of an available display area.

FIG. 1D illustrates a fourth state of the process for configuring a user interface displaying a communication video stream arrangement. In this state, the addition of the fourth stream 111D causes the client device 101 to display a rendering 111D' of the fourth stream 111D in accordance with the techniques disclosed herein. As will be described in more detail below, one or more sections of the available display area 401 are analyzed to determine the position and size of the rendering 111D' of the fourth stream 111D. In addition, the client device 101 adjusts the existing renderings 111A'-111C' to allocate space for the added rendering.

FIGS. 1E through 1I illustrate the remaining states of the example process for configuring an arrangement of video stream renderings within a user interface. As shown, the addition of each stream, e.g., the fifth stream 111E through the ninth stream 111I, causes the client device 101 to display rendering 111E'-111I' of the fifth stream 111E through the ninth stream 111I in accordance with the techniques disclosed herein. As will be described in more detail below, as each stream 111 is added to the communication session, the client device 101 analyzes the aspect ratio of individual sections of the available display area 401 to determine the position and size of each rendering 111E'-111I' of the newly added streams 111E-111I. In addition, the client device 101 adjusts the existing renderings 111A'-111D' to allocate space for the added renderings.

Referring now to FIGS. 2A-2F another example process for configuring a user interface comprising an arrangement of video stream renderings is shown and described below. In this example, the arrangement of video stream renderings within the user interface is configured when the user interface 120 is resized and/or reshaped. In some configurations, the techniques disclosed herein, including the routine shown in FIG. 7, can be executed each time an input is received for resizing or reshaping a user interface 120.

As shown in the series of images of FIGS. 1A-1I, as the server 110 is communicating five streams 111A-111E to the client device 101. As the shape and size of the user interface is changed, the client device recalculates the size, shape and position of each rendering 111A'-111E' of the streams 111A-111E. This series of images is provided to show one example of a user interface arrangement that may result from the techniques disclosed herein. In one aspect, this example shows how the techniques disclosed herein can minimize the movement of select renderings while other streams are moved or resized. In addition, this example shows, in conjunction with the other examples, how a target aspect ratio can be used by a computing system to change the characteristics of a user interface layout to maximize the use of a display area.

Figure 2A:
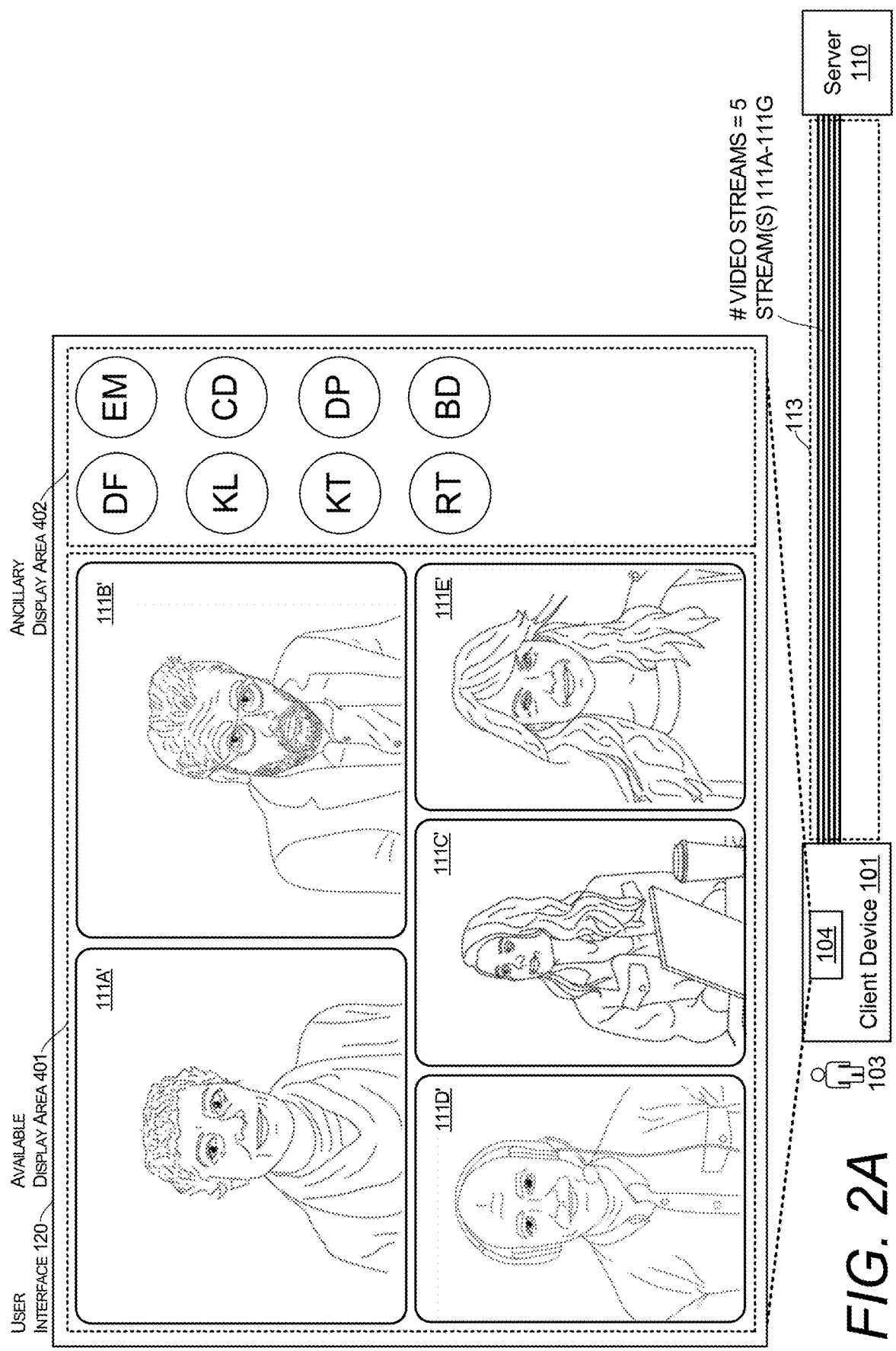
FIG. 2A illustrates aspects of a communication system in a first state of a process for configuring an arrangement of video stream renderings within a user interface based on an aspect ratio of an available display area that is modified by a user input.
Figure 2B:
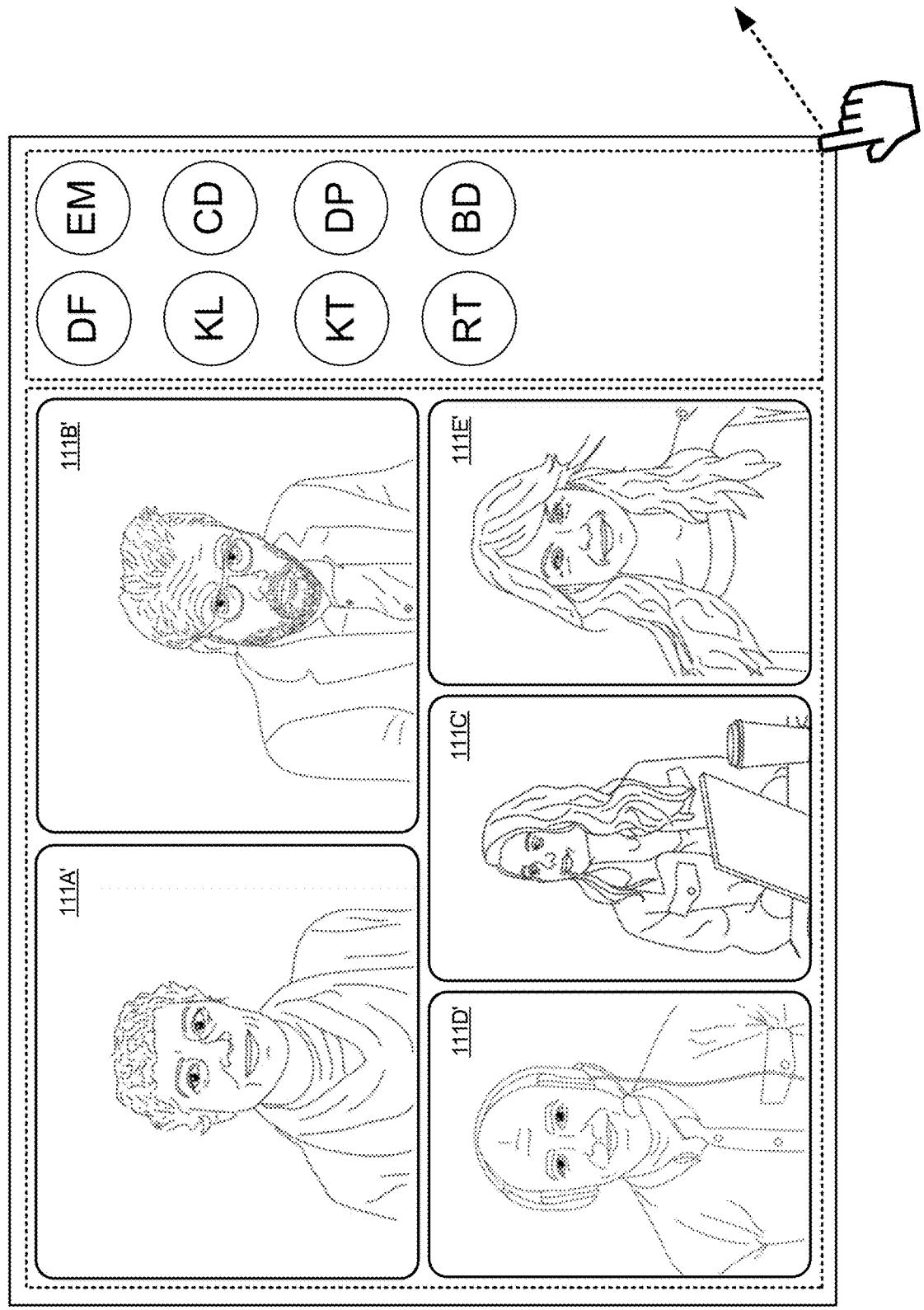
FIG. 2B illustrates aspects of a communication system in a second state of a process for configuring an arrangement of video stream renderings within a user interface based on an aspect ratio of an available display area that is modified by a user input.
Figure 2C:
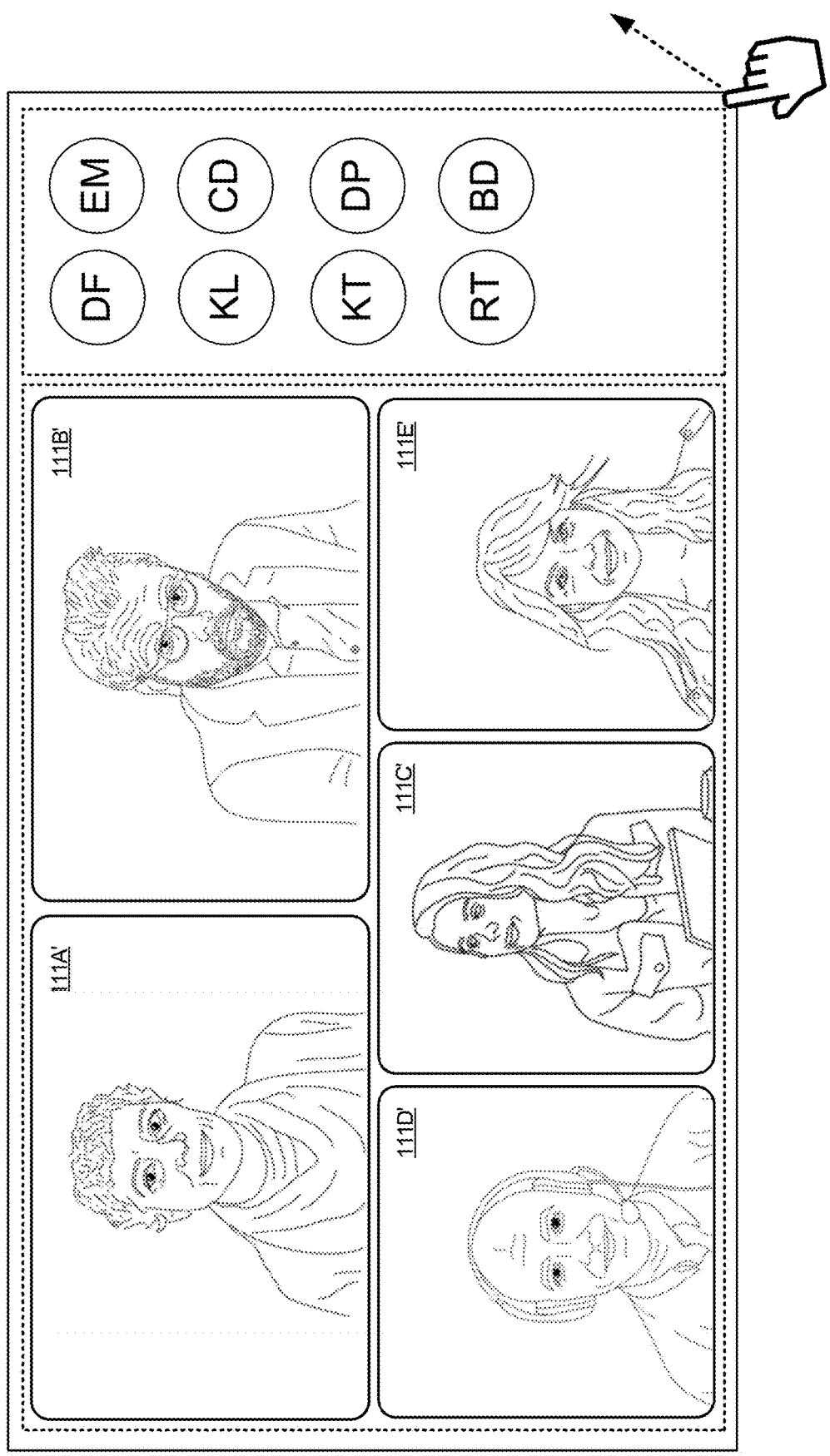
FIG. 2C illustrates aspects of a communication system in a third state of a process for configuring an arrangement of video stream renderings within a user interface based on an aspect ratio of an available display area that is modified by a user input.
Figure 2D:
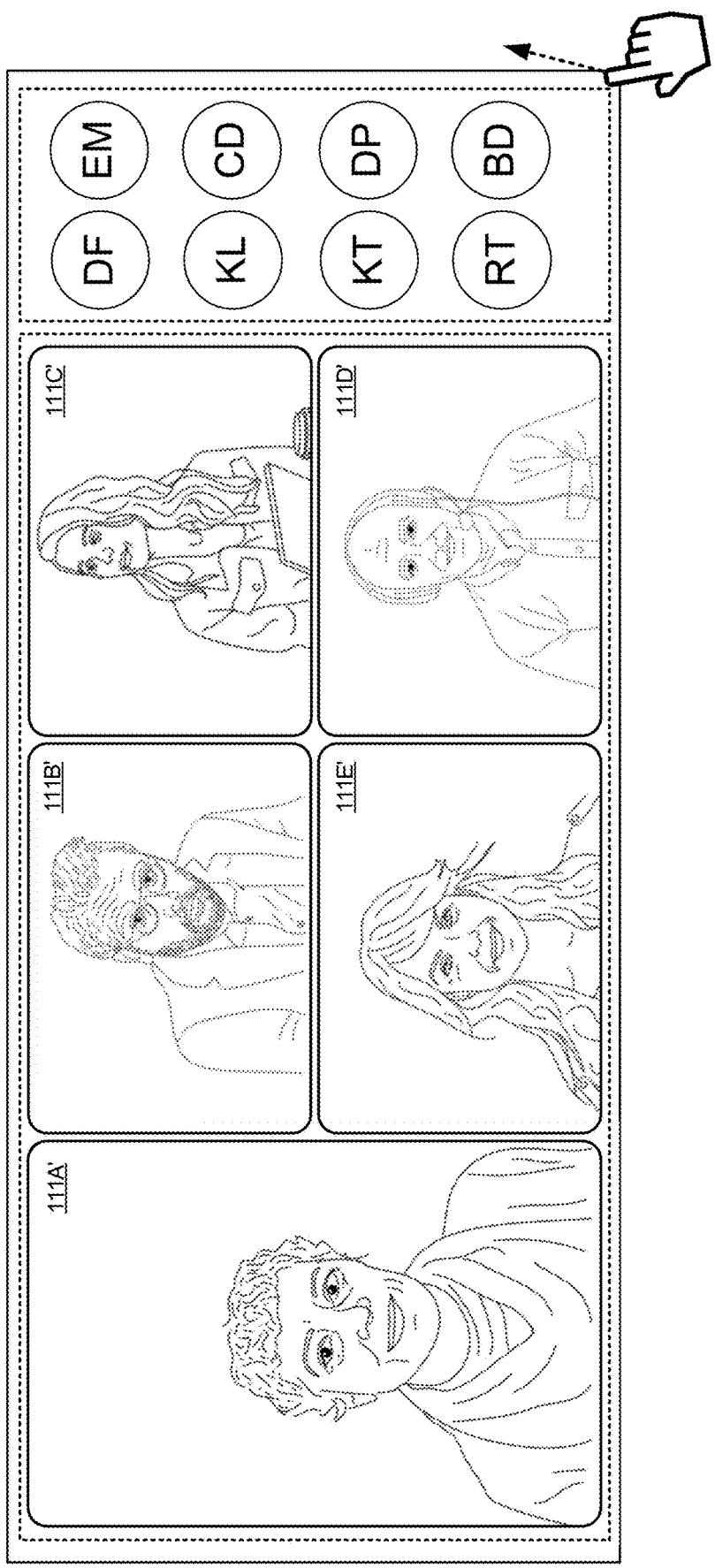
FIG. 2D illustrates aspects of a communication system in a fourth state of a process for configuring an arrangement of video stream renderings within a user interface based on an aspect ratio of an available display area that is modified by a user input.
Figure 2E:
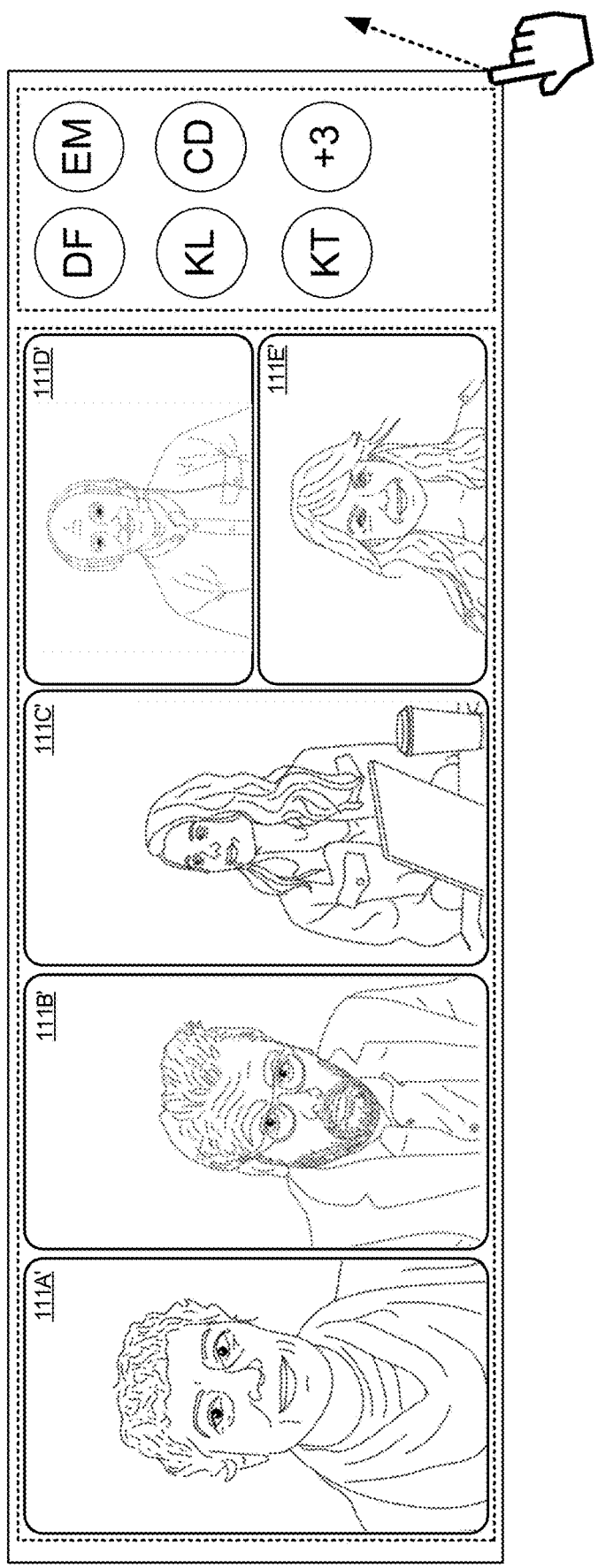
FIG. 2E illustrates aspects of a communication system in a fifth state of a process for configuring an arrangement of video stream renderings within a user interface based on an aspect ratio of an available display area that is modified by a user input.
Figure 2F:
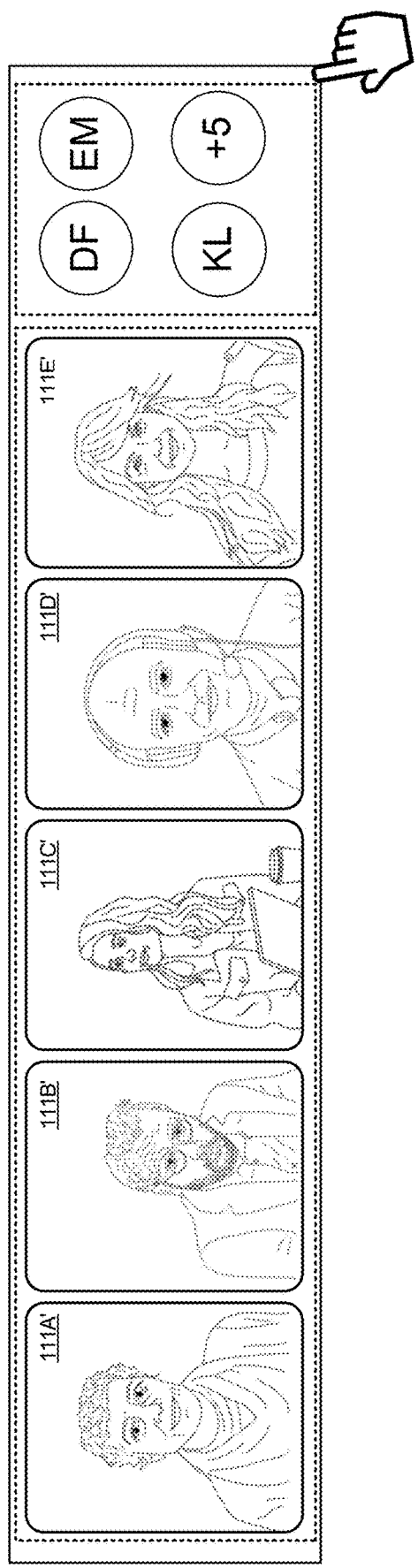
FIG. 2F illustrates aspects of a communication system in a sixth state of a process for configuring an arrangement of video stream renderings within a user interface based on an aspect ratio of an available display area that is modified by a user input.

The transition of the user interfaces shown in FIG. 2B and FIG. 2C can be initiated in a number of different ways. In one example, the client device 101 can receive a user input to resize and reshape the user interface 120, which in turn resizes and reshapes the available display area 401. In response to the detection of one or more criteria, such as a user input to resize a user interface, the client device 101 can compare the aspect ratio of the available display area 401 with a target aspect ratio. A target aspect ratio can be of value that is received as part of a user input, a value that is part of a configuration setting, or a value that is determined by one or more machine learning processes. Depending on a condition, also referred to herein as a target aspect ratio condition, the available display area 401 can be divided vertically or horizontally. Each section created by the division can be filled with bins and/or cells depending on one or more criteria. Each bin can be further divided recursively to create a number of cells that equals the number of select streams 111 received by the client device 101. By the utilization of the target aspect ratio, customized layouts for optimizing the use of the available display area to be achieved. Also, as a user interface 20 is resized and/or reshaped, the disclosed techniques utilizing the target aspect ratio can also minimize the movement of the various stream renderings as different arrangements are calculated. For instance, in the transition between user interfaces shown in FIG. 2B and FIG. 2C, the user interface transitions to an arrangement that includes renderings of the first and second stream and renderings of the third, fourth, and fifth streams in the second row. In the transition between user interfaces shown in FIG. 2C and FIG. 2D, the user interface transitions to an arrangement that includes renderings of the first stream in a first column, renderings of the second and fifth streams in a second column, and renderings of the third and fourth streams in the third column. In the transition between user interfaces shown in FIG. 2D and FIG. 2E, the user interface transitions to an arrangement that includes a rendering of the first stream in a first column, a rendering of the second stream in a second column, a rendering of the third stream in a third column, and renderings of the fourth and fifth streams in a fourth column. In the transition between user interfaces shown in FIG. 2E and FIG. 2F, the user interface transitions to an arrangement that includes a rendering of the first stream in a first column, a rendering of the second stream in a second column, a rendering of the third stream in a third column, a rendering of the fourth stream in a fourth column, and a rendering of the fifth stream in a fifth column. As will be described according to below, when a user interface 120 is reshaped or resized, the techniques disclosed herein, including the routine described conjunction with FIG. 7, can be utilized to determine a layout of the stream renderings based on a number of streams, a aspect ratio of it available display area, and a target aspect ratio.

Figure 3:
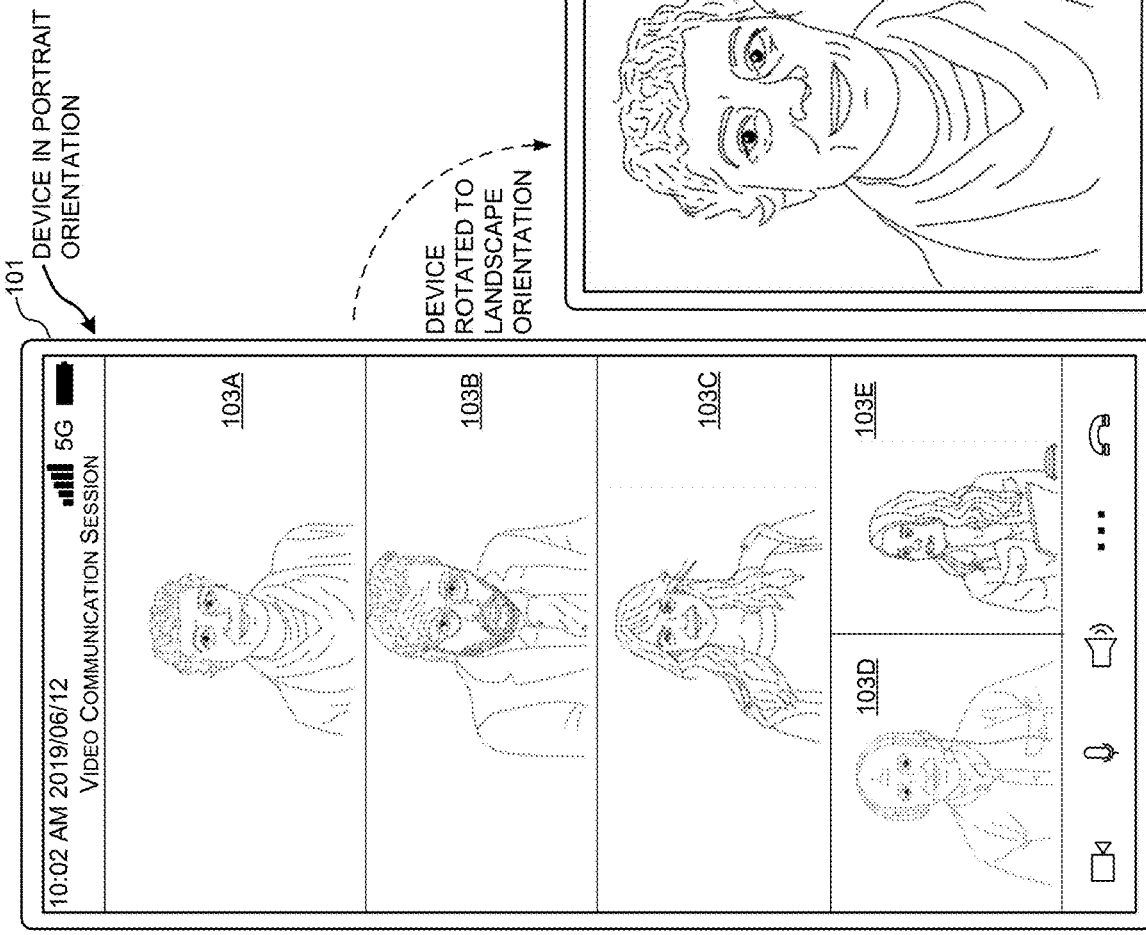
FIG. 3 illustrates aspects of a communication system for configuring an arrangement of video stream renderings within a user interface based on an aspect ratio of an available display area that is modified by a user action of rotating a display screen of a device.

Turning now to FIG. 3, another example process for configuring a user interface comprising an arrangement of video stream renderings is shown and described below. In this example, the arrangement of video stream renderings within the user interface is configured when the user interface 120 is reshaped due to a change in orientation of the display screen. In this example, when the device is rotated from a portrait orientation to a landscape orientation, the aspect ratio of an available display area, e.g., a viewable section of a display screen, is modified. Based on the aspect ratio of the available display area, a given target aspect ratio, and a number of selected streams, the system can arrange the renderings of each selected stream to optimize the display of each stream. In this example, in the portrait mode, the system can create individual rows for the first three streams 111A-111C and position the fourth and fifth streams in a side-by-side configuration in a fourth row. In the landscape mode, the system can create an individual column for the first stream 111A, a second column for the second stream and fourth stream, and a third column for the third stream and fifth stream. As described in more detail below, these layouts can be customized further to optimize the use of the available display area with an adjustment of a target aspect ratio. Such arrangements can be generated by a recursive division process, e.g., routine 500 of FIG. 7, each time a screen is re-oriented, each time a window is reshaped or resized, or each time an available display area is allocated.

Figure 4B:
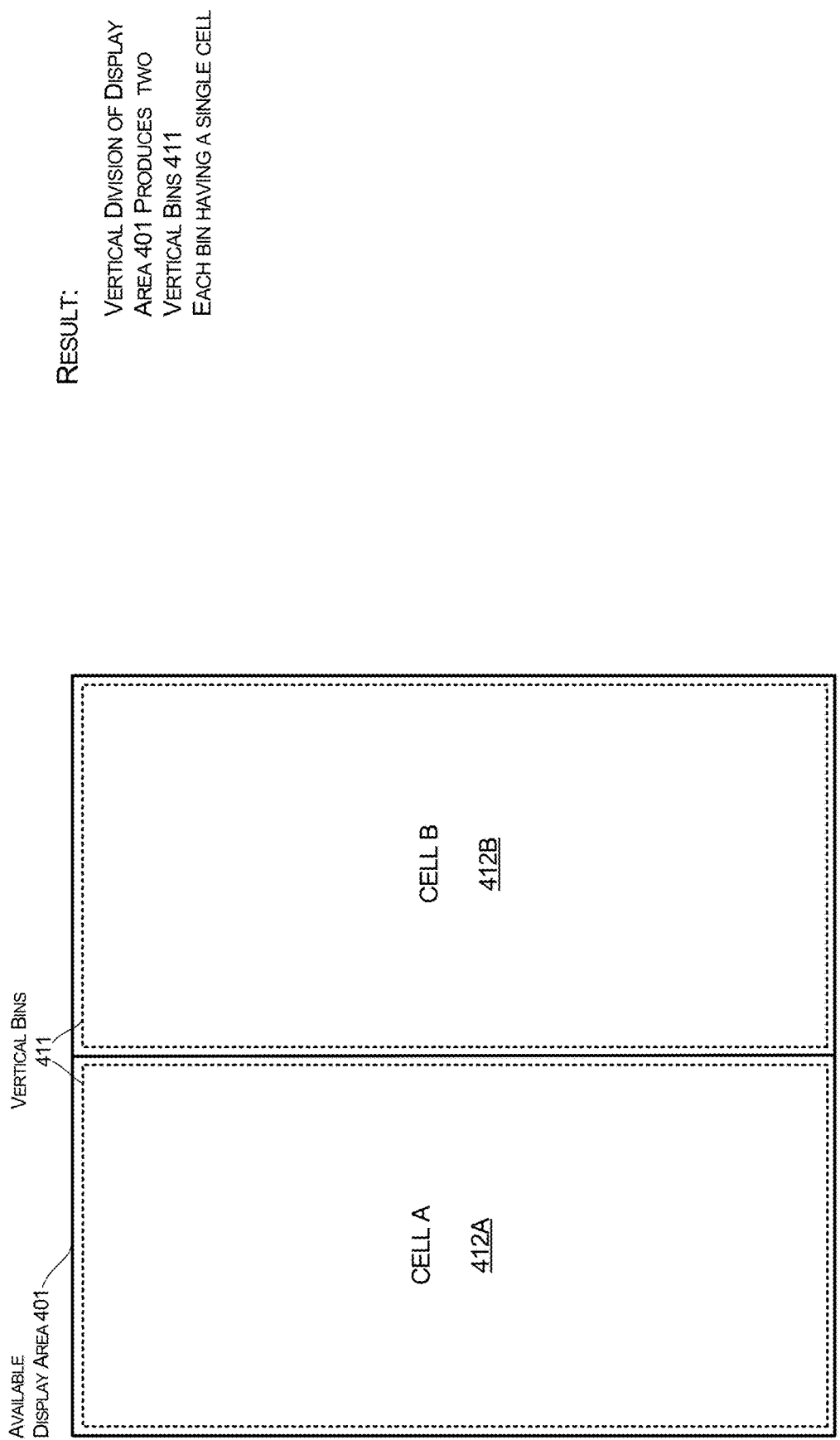
FIG. 4B illustrates aspects of a second state of a process for configuring an arrangement of video stream renderings within a user interface based on an aspect ratio of an available display area and a target aspect ratio.
Figure 4E:
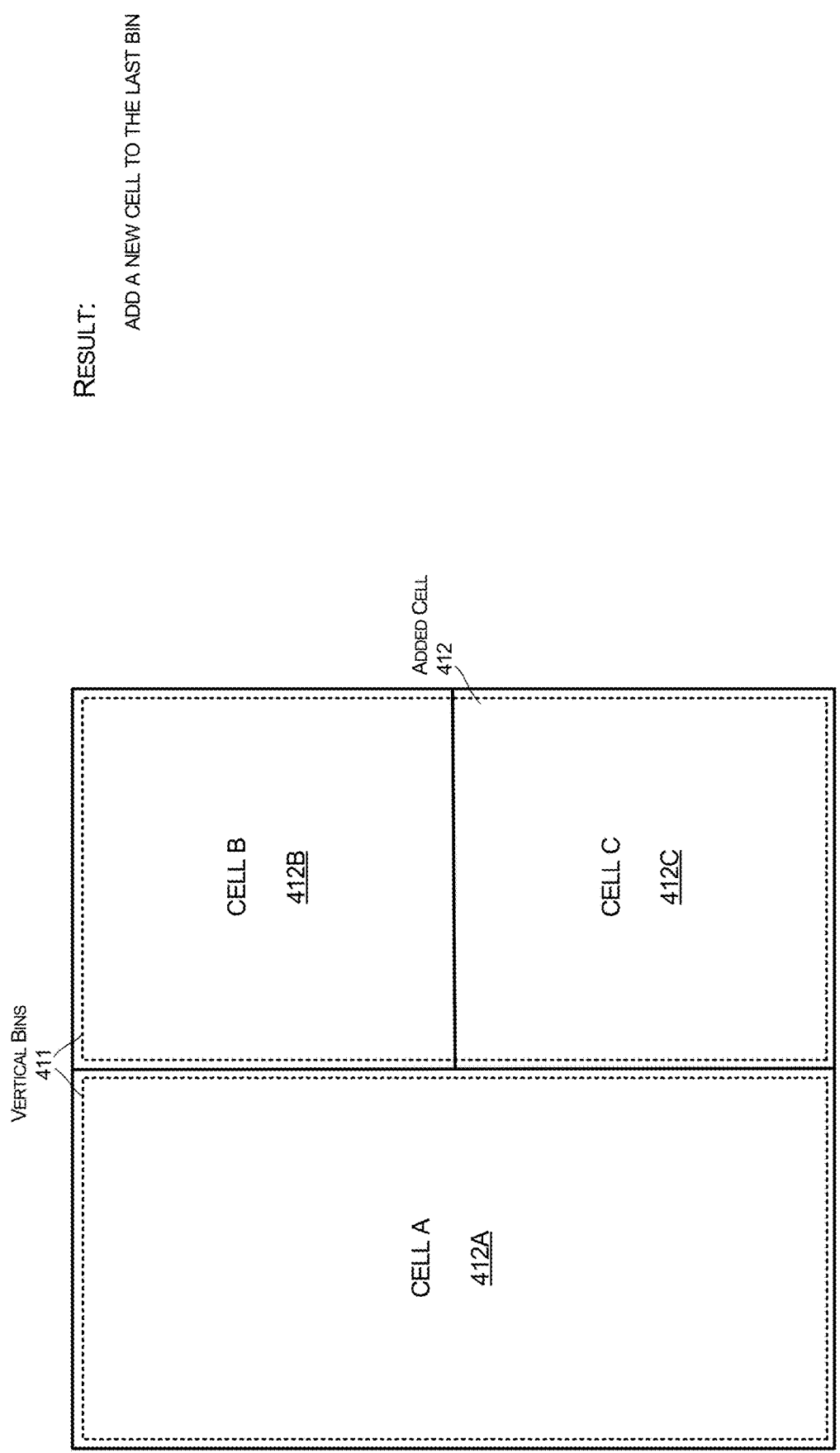
FIG. 4E illustrates aspects of a fifth state of a process for configuring an arrangement of video stream renderings within a user interface based on an aspect ratio of an available display area and a target aspect ratio.
Figure 4F:
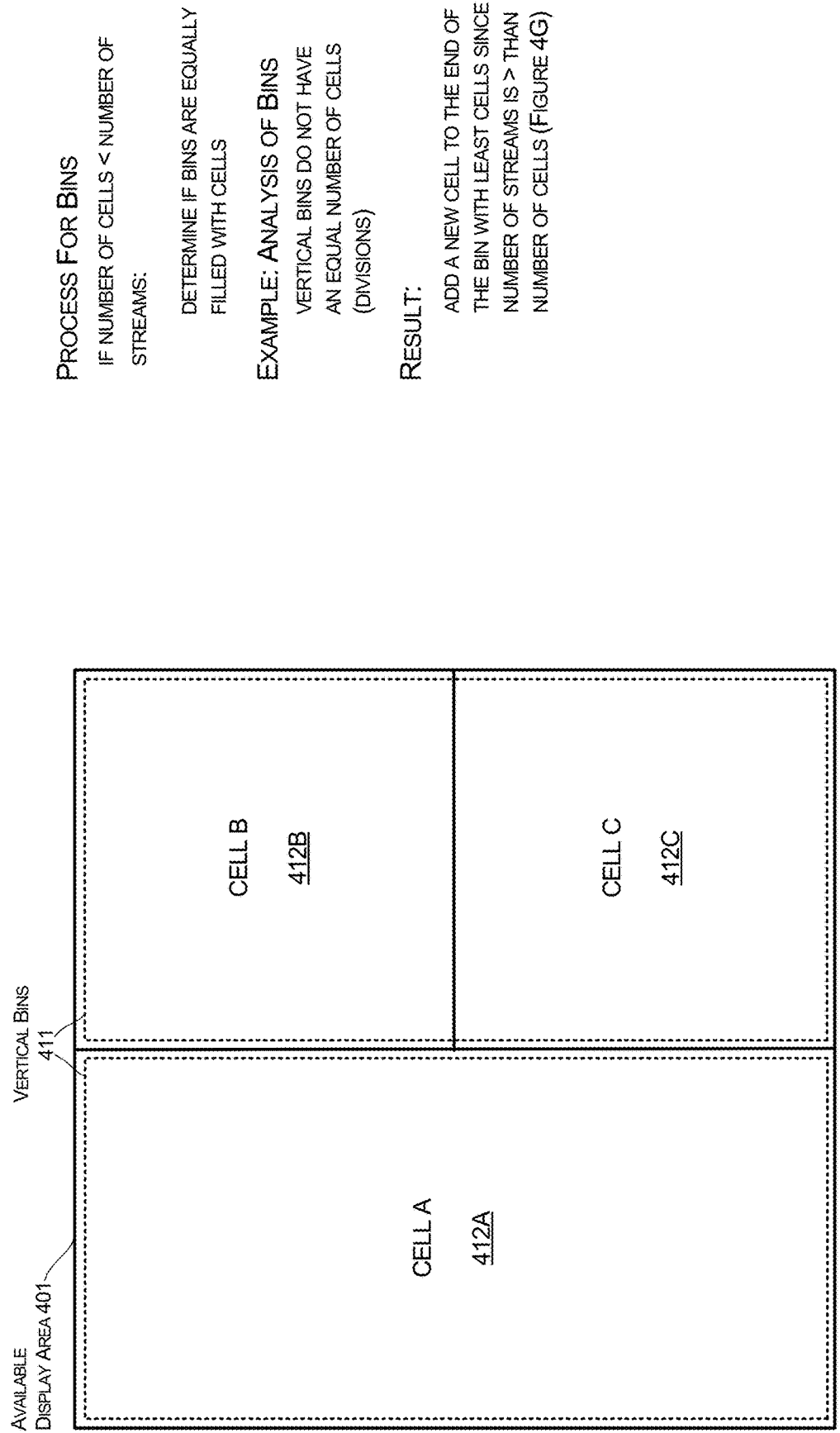
FIG. 4F illustrates aspects of a sixth state of a process for configuring an arrangement of video stream renderings within a user interface based on an aspect ratio of an available display area and a target aspect ratio.
Figure 4H:
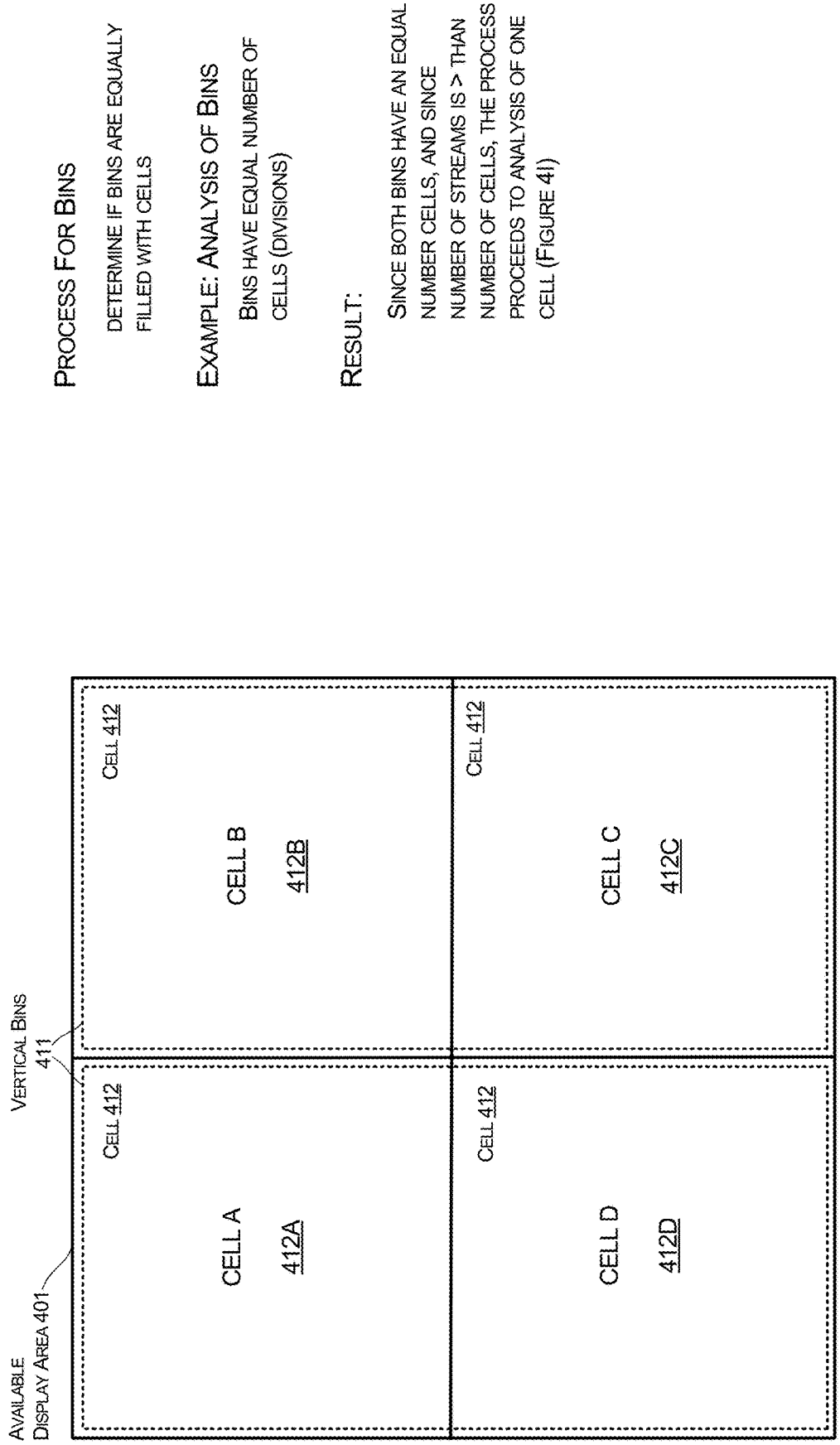
FIG. 4H illustrates aspects of an eighth state of a process for configuring an arrangement of video stream renderings within a user interface based on an aspect ratio of an available display area and a target aspect ratio.
Figure 4I:
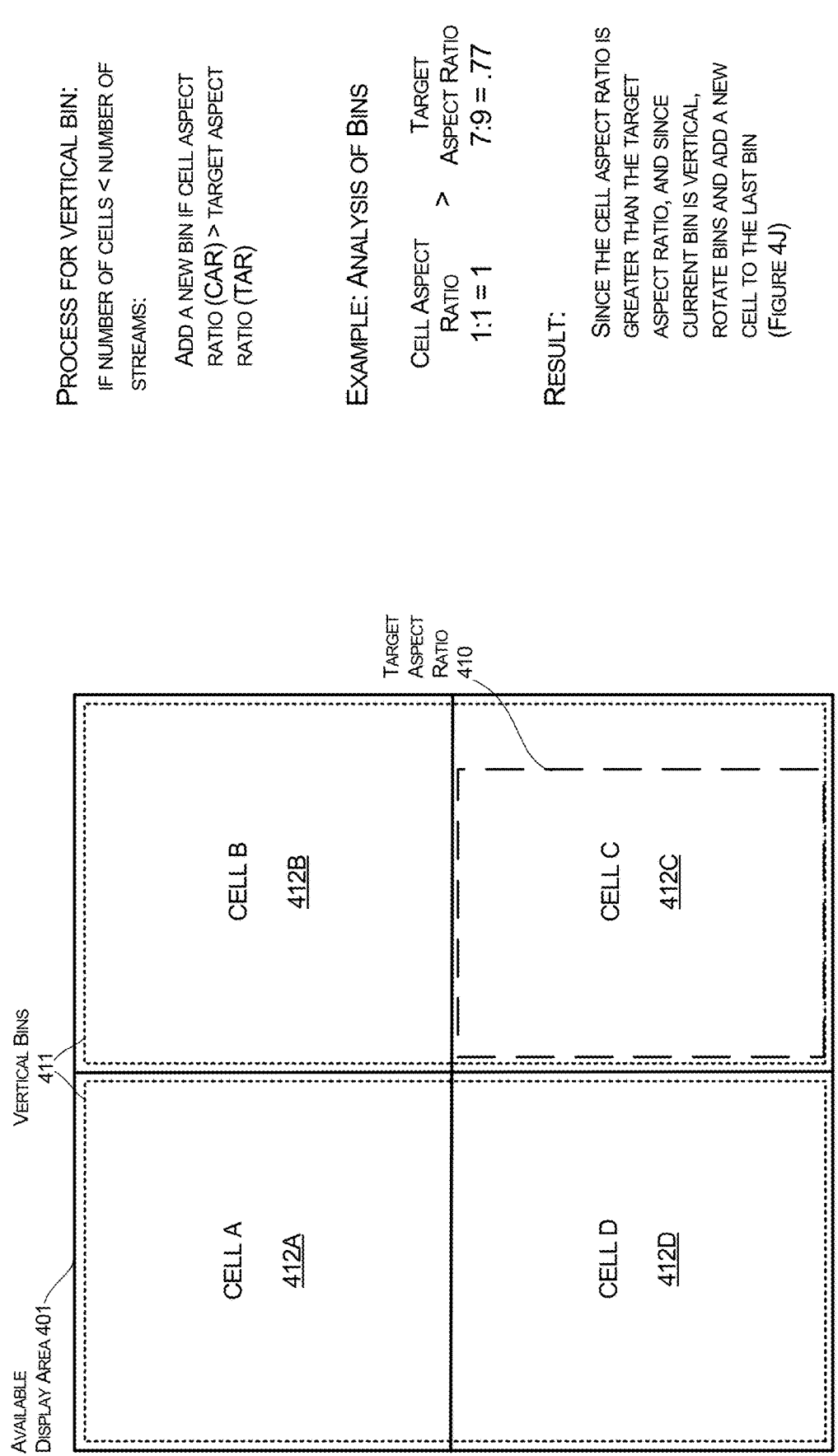
FIG. 4I illustrates aspects of a ninth state of a process for configuring an arrangement of video stream renderings within a user interface based on an aspect ratio of an available display area and a target aspect ratio.
Figure 4J:
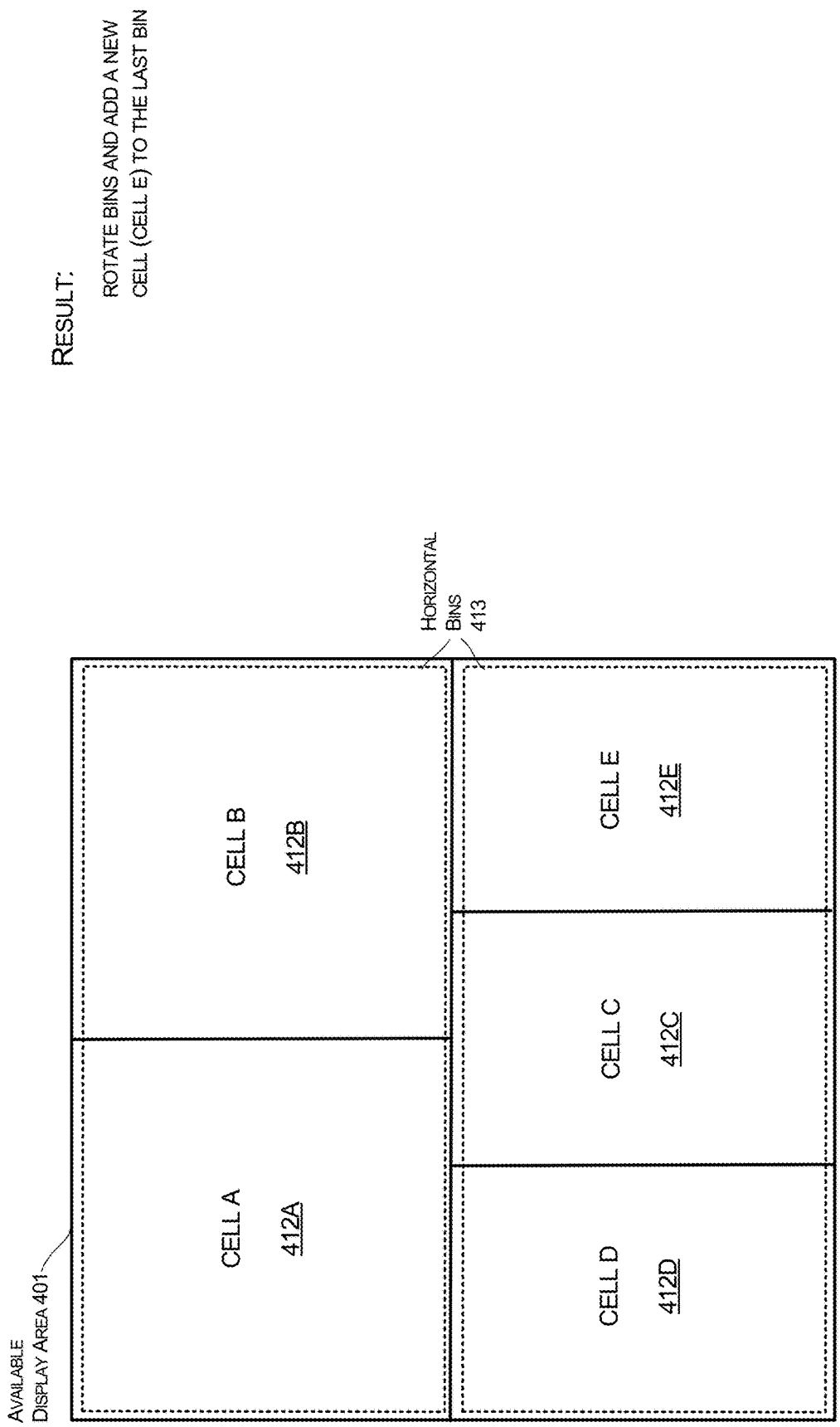
FIG. 4J illustrates aspects of a tenth state of a process for configuring an arrangement of video stream renderings within a user interface based on an aspect ratio of an available display area and a target aspect ratio.
Figure 4L:
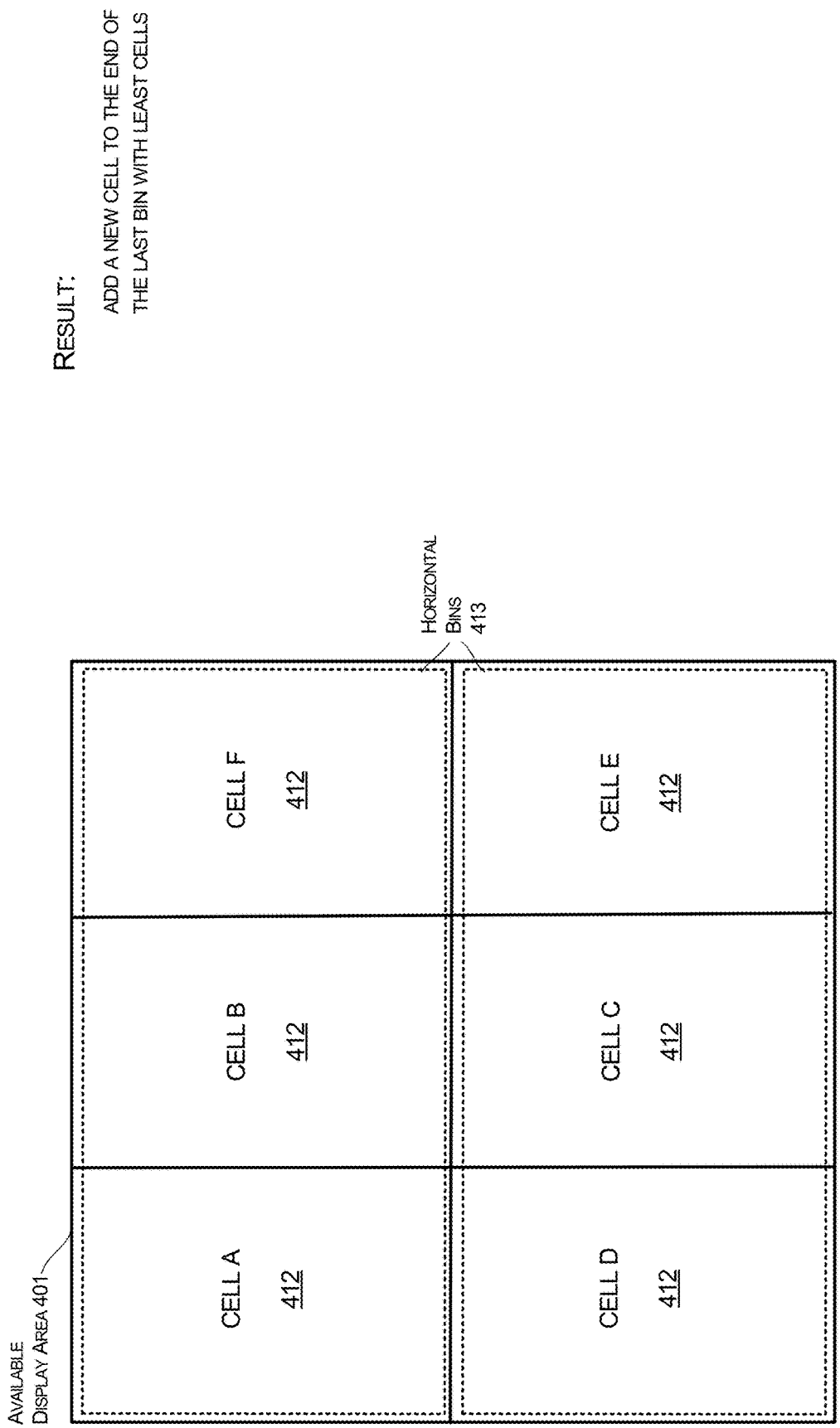
FIG. 4L illustrates aspects of a twelfth state of a process for configuring an arrangement of video stream renderings within a user interface based on an aspect ratio of an available display area and a target aspect ratio.
Figure 4M:
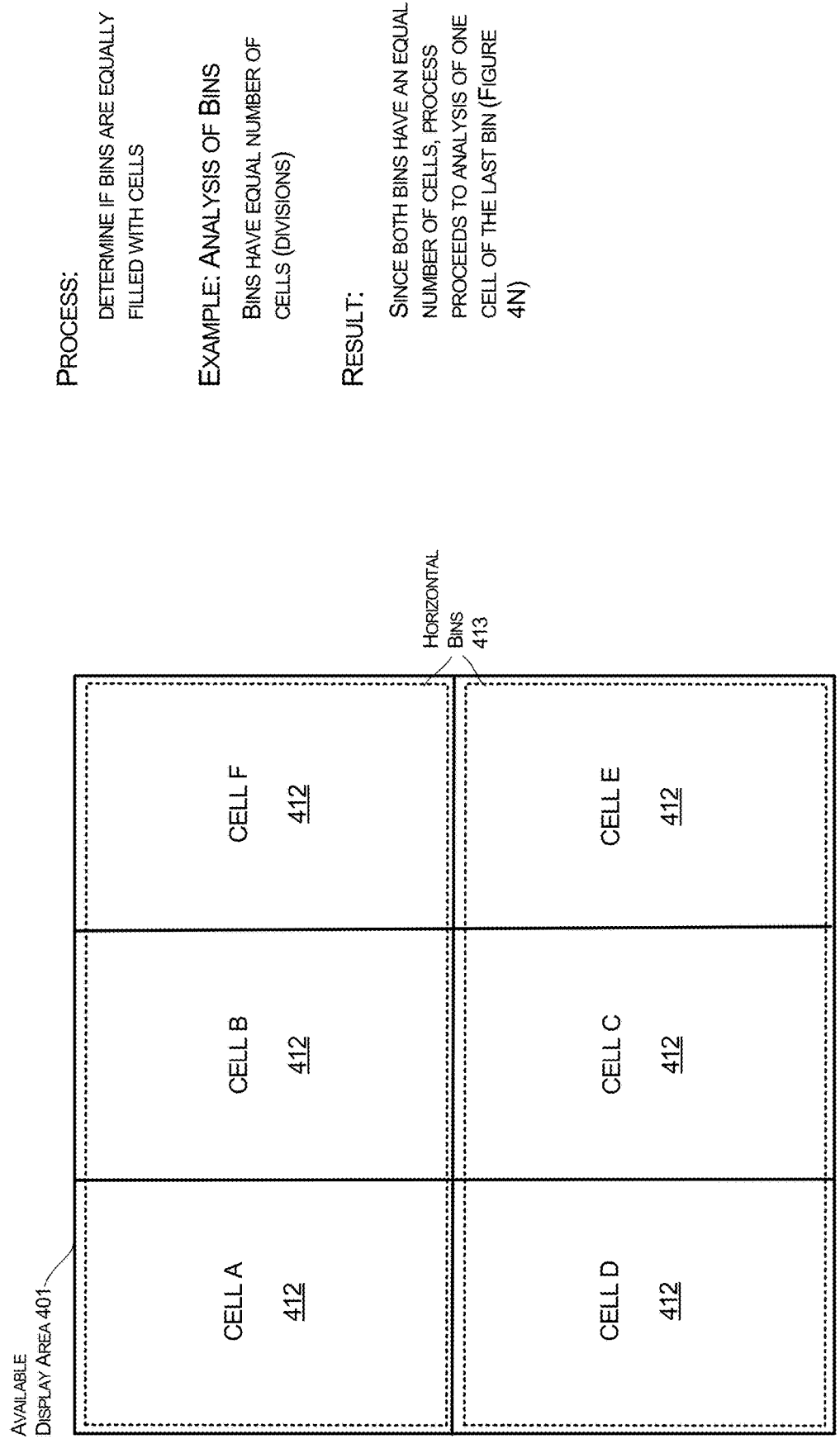
FIG. 4M illustrates aspects of a thirteenth state of a process for configuring an arrangement of video stream renderings within a user interface based on an aspect ratio of an available display area and a target aspect ratio.
Figure 4N:
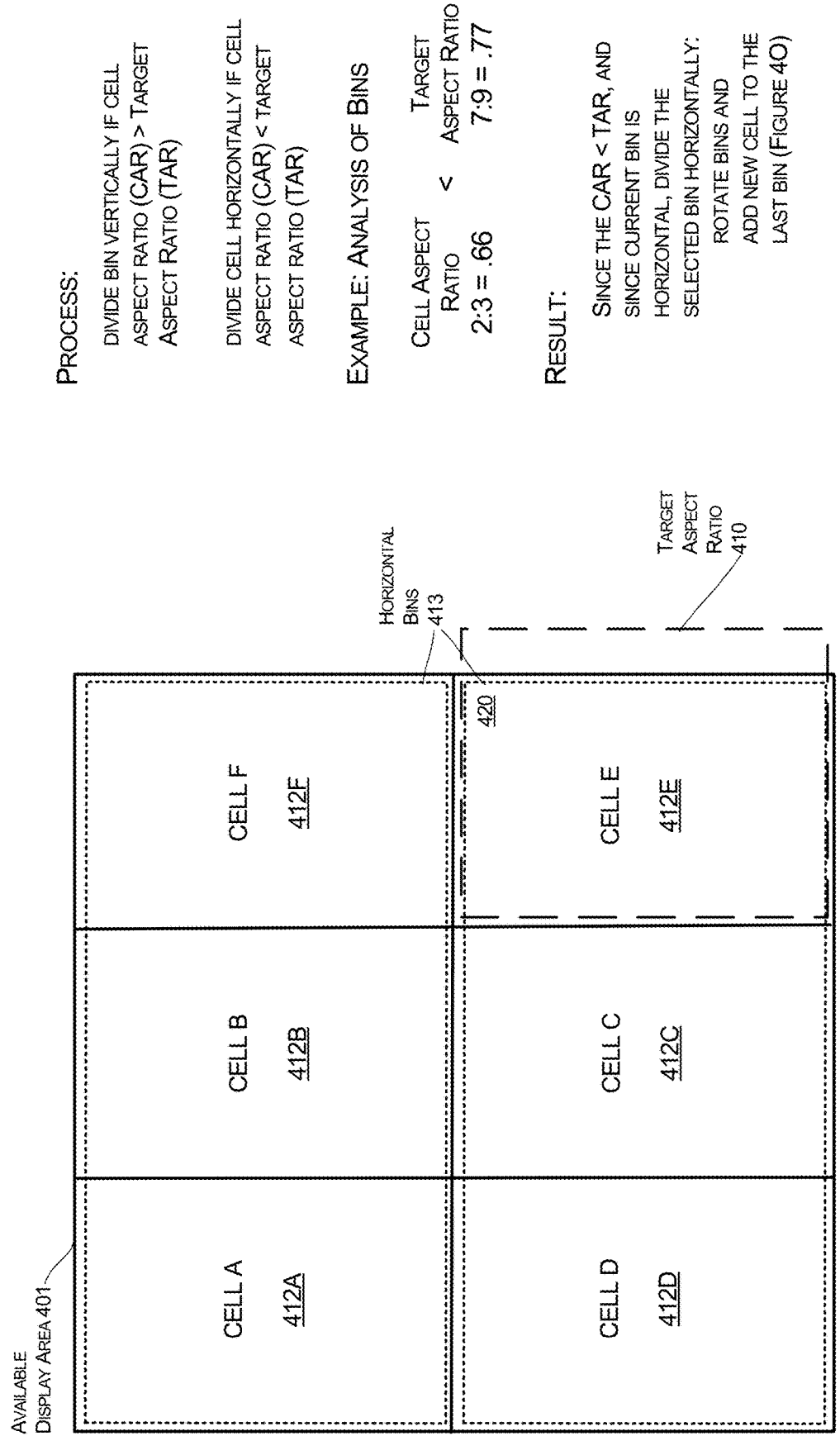
FIG. 4N illustrates aspects of a fourteenth state of a process for configuring an arrangement of video stream renderings within a user interface based on an aspect ratio of an available display area and a target aspect ratio.
Figure 4R:
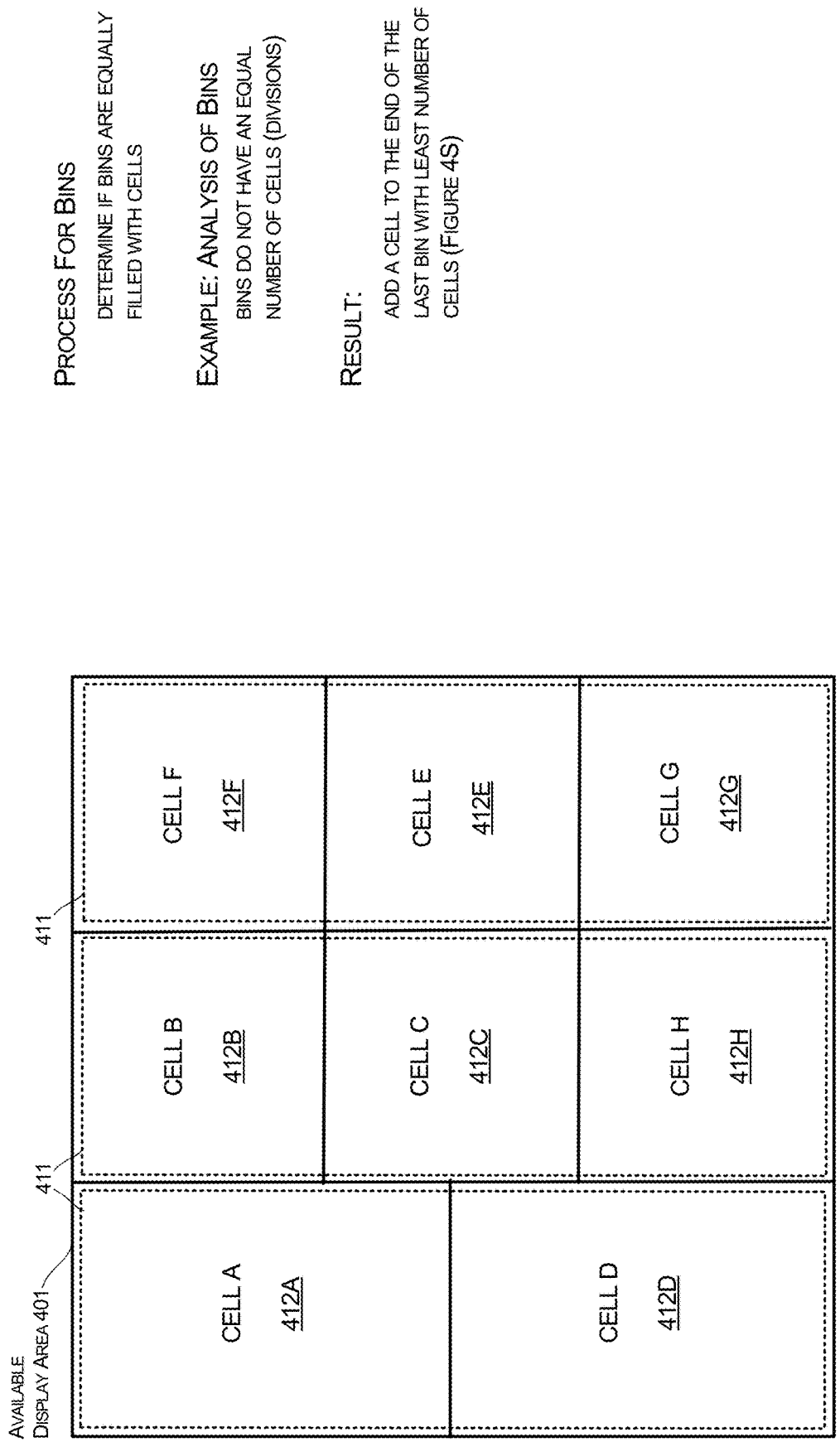
FIG. 4R illustrates aspects of an eighteenth state of a process for configuring an arrangement of video stream renderings within a user interface based on an aspect ratio of an available display area and a target aspect ratio.
Figure 4S:
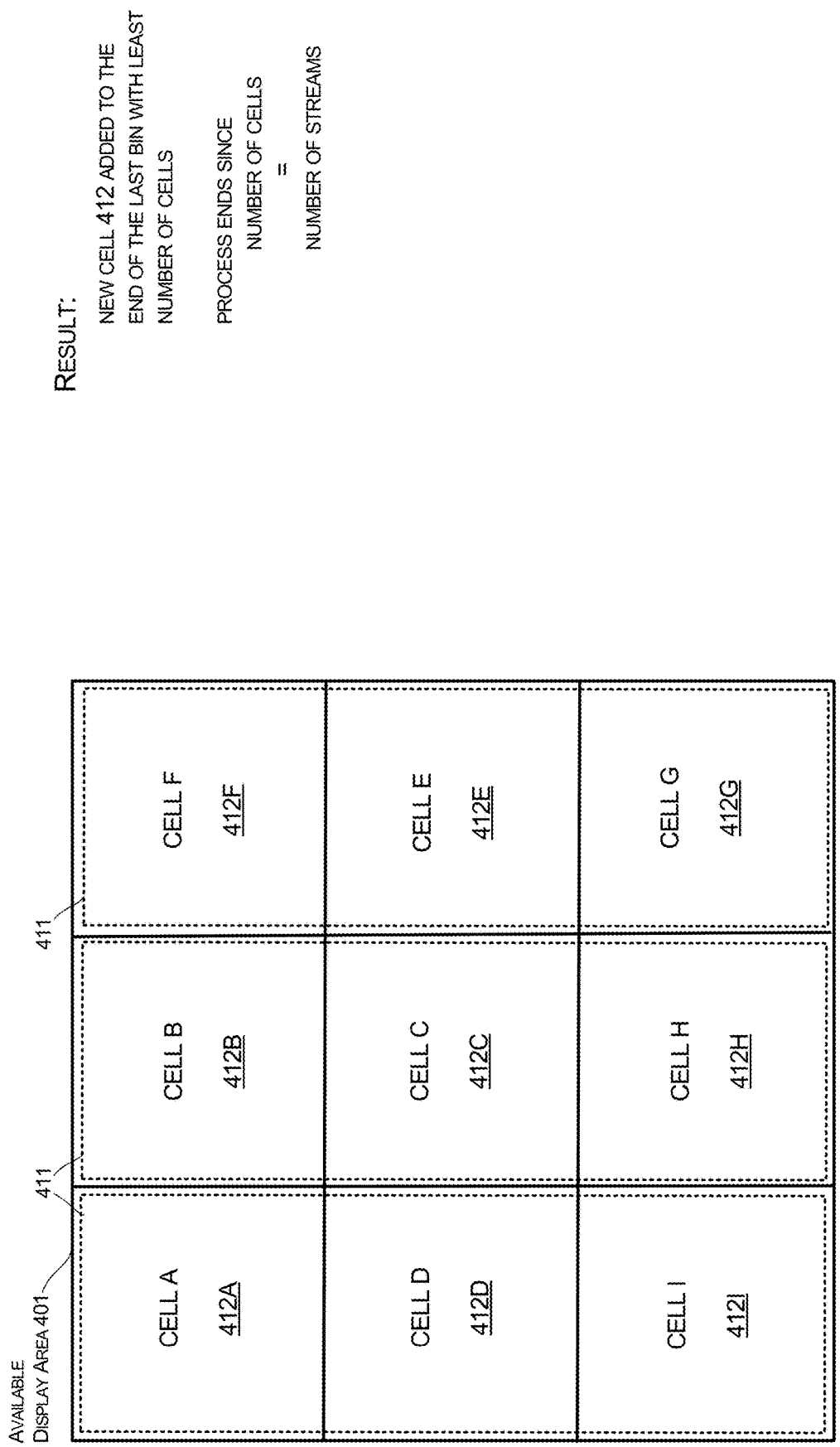
FIG. 4S illustrates aspects of a nineteenth state of a process for configuring an arrangement of video stream renderings within a user interface based on an aspect ratio of an available display area and a target aspect ratio.

Referring now to FIGS. 4A-4S a process for configuring a user interface comprising an arrangement of video stream renderings is shown and described below. In this example, the available display area 401 is to be utilized to display nine renderings of nine individual video streams received by a client device. The renderings of the nine individual video streams are arranged based on an order in which the streams are added to a communication session. The order and position in which renderings are added to the user interface can minimize movement of the renderings of salient streams and minimize the movement of stream renderings positioned near the renderings of the salient streams. Stream renderings can also be removed in the same order to minimize movement of the renderings of salient streams and minimize the movement of stream renderings positioned near the renderings of the salient streams.

In general, the process for determining an arrangement of video stream renderings within a user interface is recursive and divides an available display area into bins (also referred to herein as "divisions") having cells for displaying each video stream rendering. The bins can be either horizontal bins ("bin rows") or vertical bins ("bin columns") depending on an aspect ratio of an available display area 401 or an aspect ratio of a cell within a bin. This process can optimize the position and shape of each cell by the use of a specified target aspect ratio. The target aspect ratio can be any fractional value, e.g., 4:3 (1.33), 1:2 (0.5), 1:1 (1), 7:9 (0.77), etc. By optimizing the user interface based on a target aspect ratio, the divisions of an available display area are configured in such a way to mitigate movement of renderings within the user interface so that users are not distracted by the movement of renderings that are added or removed. The order of the cells is labelled alphabetically to illustrate how each cell maintains its relative position as other cells are added to the user interface arrangement. Cells can be added or removed in accordance to the labeled sequence shown in these examples. For illustrative purposes, a "grid" is an array of "bins." A "grid" also has a target aspect ratio (TAR) and an attribute defining whether its bins are vertical bins ("columns") or horizontal bins ("rows"). A "bin" is an array of "cells." A "cell" is a subdivision of the bin and has an "order" property that keeps track of the order it was added to the grid. Each cell is reserved for a single rendering of a video stream. The aspect ratio of each cell is based on the aspect ratio of the available display area, the aspect ratio of each bin, and the number of cells per bin.

The process can begin with the analysis of the number of selected streams provided to a client to determine if the available display area has a number of cells equal to the number of selected streams. If the available display area has a number of cells equal to the number of selected streams, the system can display the renderings. For instance, if the client device is to only display one selected stream and the available display area contains one cell, the available display area is not divided, and the client device would render the selected stream filling the entire available display area.

Returning to the current the example shown in FIG. 4A, it is a given that the client device is to display nine (9) selected video streams. To start the process, the available display area starts with a single bin 411, which is an allocated area that starts with one cell, "Cell A 412A." Since the number of selected streams is greater than the number of cells, the process proceeds to an operation where the available display area 401 is divided.

In one illustrative example, the available display area 401 can be divided vertically when the aspect ratio of the available display area 401 does not meet a target aspect ratio condition. In some embodiments, the aspect ratio of the available display area 401 does not meet the target aspect ratio condition when the aspect ratio of the available display area 401 is greater than the target aspect ratio. In some embodiments, the aspect ratio of the available display area 401 does not meet the target aspect ratio condition when the aspect ratio of the available display area 401 is greater than or equal to the target aspect ratio. In some embodiments, the aspect ratio of the available display area 401 does not meet the target aspect ratio condition if the aspect ratio of the available display area 401 is not less than the target aspect ratio.

The available display area 401 can be divided horizontally when the aspect ratio of the available display area 401 meets the aspect ratio condition. In some embodiments, the aspect ratio of the available display area 401 meets the target aspect ratio condition when the aspect ratio of the available display area 401 is less than the target aspect ratio. These examples are provided for illustrative purposes only and are not to be construed as limiting. It can be appreciated that any condition can be utilized by the techniques disclosed herein. Generally, a cell or display area can be divided horizontally if the cell or display area if the width and height are respectfully wider than a target value, and a cell or display area can be divided vertically if the cell or display area is more narrow than a target value. The techniques disclosed herein can utilize a general definition of an aspect ratio defining width and height values. However, the techniques disclosed herein can also utilize other definitions defining a shape of a viewing a cell or display area, e.g., width/height or height/width, etc. In such embodiments, target aspect ratio conditions can correspondingly utilize a target value "inverse" ratio or "greater" or "less" if the threshold is set up using an opposite or different definition, e.g., width/height or height/width.

In the example of FIG. 4A, for illustrative purposes, it is a given that the target aspect ratio is 7:9 and the aspect ratio of the available display area for one is 1:1. When such parameters are processed using the aspect ratio condition defined above, as shown in FIG. 4B, the available display area is divided vertically. Specifically, the target aspect ratio is less than the aspect ratio of the available display area. Thus, the available display area is divided vertically and data defining vertical bins is generated. When an available display area is divided vertically, each section resulting from the division is populated with a vertical bin 411, each containing one cell. This example, each vertical bin 411 is respectively populated with a first cell, Cell A 412A, and a second cell, Cell B 412B. Each cell can be populated with a video stream rendering based on a priority of each stream. In some configurations, stream renderings can be prioritized based on an order in which a participant joins a communication session. In some configurations, the streams can be prioritized based on an activity level associated with each stream, such as a level of movement of a participant depicted in a stream, a level of volume of a participant depicted in a stream, etc. Each stream can be positioned within each cell based on the priority, e.g., Cell A can be used to display the stream having the first priority, and Cell B can be used to display the stream having the second priority. A priority of a stream can be based on an order in which a stream joins a communication session, a type of content depicted in a stream, e.g., a word document versus a data spreadsheet, or a given priority based on a number of people depicted in the video component of a stream.

Next, as shown in FIG. 4C, the bins are analyzed to determine if the bins are filled equally with cells. In this example, each bin 411 contains only one cell, e.g., the cells are filled equally. Thus, the process continues to an operation where at least one cell is analyzed.

FIG. 4D shows aspects of an operation for analyzing a cell of a user interface. For this operation, any cell can be selected for analysis. In some configurations, a bottom cell, a cell on the right side of a bin, or a recently added cell can be selected. In this example, Cell B 412B is selected. In this operation, if the aspect ratio of the selected cell is less than the target aspect ratio (CAR<TAR) and if the selected cell is in a vertical bin, a new cell is added to the last bin, e.g., the last bin can be divided horizontally. In this specific example, since the selected cell is in a vertical bin and since the aspect ratio of the selected cell, 1:2, is less than the target aspect ratio, 7:9, a new cell, Cell C 412C, is added to the last bin, as shown in FIG. 4E.

Each time a new cell is added, the system checks to see if the number of cells equals the number of selected streams. Once the number of cells equals the number of selected streams, the routine can terminate. For instance, if the number of selected streams is three, the recursive process of further dividing the display area would terminate with the configuration shown in FIG. 4E. However, in returning to the current example, given that the number of selected streams is nine, the routine continues with the operation shown in FIG. 4F.

Once a cell is added, and if the number of cells is less than the number of selected streams, the process restarts at an operation where the system determines if the cells are equally filled. As shown in FIG. 4F, given that the vertical bins 411 do not have an equal number of cells, a new cell is added to the bin with the least number of cells. As shown in FIG. 4G, a new cell, Cell D 412D is added to the first bin.

As described above, each time a cell is added, and if the number of cells is less than the number of selected streams, the process starts at the operation where the system determines if the cells are equally filled. In the state shown in FIG. 4H, it is determined that the bins are equally filled. If it is determined that the bins are equally filled, the process proceeds to an operation where one of the cells is selected for analysis. Any one of the cells can be selected for analysis. In some configurations, the right-bottom cell of a display area can be selected for analysis. In this example, Cell C 412C is selected for analysis. The analysis can compare the aspect ratio of the selected cell with the target aspect ratio.

If the cell aspect ratio is greater than the target aspect ratio and if the selected cell is in a vertical bin, the system rotates the bins, e.g., changes the vertical bins to horizontal bins, and adds a new cell to the last bin. As shown in FIG. 4I, the cell aspect ratio 1:1 is greater than the target aspect ratio, 7:9. As a result, as shown in FIG. 4J, the vertical bins are converted to horizontal bins 413, where individual horizontal bins 413 is aligned with individual row of cells. After the bins are rotated, a new cell, such as Cell E 412E, is added to the last bin. The last bin can include the right most bin and/or the bottom bin.

Once a cell is added, and if the number of cells is less than the number of selected streams, the process restarts at the operation where the system determines if the cells are equally filled. In the state of the display area shown in FIG. 4K, it is determined that the bins are not equally filled. The top bin has two cells and the bottom bin has three cells. As a result, given that the horizontal bins 413 do not have an equal number of cells, a new cell is added to the bin with the least number of cells. As shown in FIG. 4L, a new cell, Cell F 412F is added to the first horizontal bin 413.

Again, once a cell is added, and if the number of cells is less than the number of selected streams, the process restarts at the operation where the system determines if the cells are equally filled. In the state of the display area shown in FIG. 4M, it is determined that the bins are equally filled. If it is determined that the bins are equally filled, the process proceeds to an operation where one of the cells is selected for analysis. Any one of the cells can be selected for analysis. In some configurations, the right-bottom cell of a display area can be selected for analysis. In this example, as shown in FIG. 4N, Cell E 412E is selected for analysis. The analysis can compare the aspect ratio of the selected cell with the target aspect ratio.

If the cell aspect ratio is less than the target aspect ratio and if the selected cell is in a horizontal bin, the system rotates the bins, e.g., changes the horizontal bins to vertical bins, and adds a new cell to the last bin. As shown in FIG. 4N, the cell aspect ratio 2:3 is less than the target aspect ratio, 7:9. As a result, as shown in FIG. 4O, the horizontal bins are converted to vertical bins 411, where a vertical bin 411 is aligned with each existing column of cells. After the vertical bins 411 are generated, a cell, such as Cell G 412G, is added to the last bin. The last bin can include the right and/or bottom bin.

Once a cell is added, and if the number of cells is less than the number of selected streams, the process restarts at the operation where the system determines if the cells are equally filled. In the state of the display area shown in FIG. 4P, it is determined that the bins are not equally filled. The far-right bin has three cells and the other bins have two cells. As a result, given that the bins do not have an equal number of cells, a new cell is added to one of the bins with the least number of cells. As shown in FIG. 4Q, a new cell, Cell H 412H is added to the middle bin 411. In such an embodiment, of the two bins having the fewest number of cells, the right and/or bottom bin can be selected for insertion of the new cell.

Once a cell is added, and if the number of cells is less than the number of selected streams, the process restarts at the operation where the system determines if the cells are equally filled. In the state of the display area shown in FIG. 4R, it is determined that the bins are not equally filled. The middle and far-right bins have three cells and left bin has one cell. As a result, given that the bins do not have an equal number of cells, a new cell is added to one of the bins with the least number of cells. As shown in FIG. 4S, a new cell, Cell I 412I is added to the left bin 411. Since the number of cells is equal to the number of selected streams, the recursive division process can terminate.

Referring now to FIGS. 5A-5I another example process for configuring a user interface comprising an arrangement of video stream renderings is shown and described below. This example follows the regressive process described above also using an initial available display area 401 having an aspect ratio of 1:1. However, in this example, the target aspect ratio is 4:3. This example illustrates how a user interface arrangement can be modified by merely changing the target aspect ratio. In this example, the available display area 401 is to be utilized to display five renderings of five individual video streams selected for display. The renderings of the individual video streams are arranged based on an order in which the streams are added to a communication session. The order and position in which renderings are added to the user interface can minimize movement of the renderings of salient streams and minimize the movement of stream renderings positioned near the renderings of the salient streams.

The process can begin with the analysis of a number of selected streams to determine if the available display area has a number of cells equal to the number of selected streams. If the available display area has a number of cells equal to the number of selected streams, the system can display the renderings. For instance, if the client device is to only display one selected stream and the available display area contains one cell, the available display area is not divided, and the client device would render the selected stream filling the entire available display area.

In the current the example of FIG. 5A, it is a given that the client device is to display five (5) selected video streams. To start the process, the available display area starts with a single bin 411, which is an allocated area that starts with one cell, "Cell A 412A." Since the number of selected streams is greater than the number of cells, the process proceeds to an operation where the available display area 401 is divided. In any embodiment, when an available display area 401 only contains one bin, the bin can be a horizontal bin or a vertical bin.

In one illustrative example, the available display area 401 can be divided vertically when the aspect ratio of the available display area 401 does not meet a target aspect ratio condition. In some embodiments, the aspect ratio of the available display area 401 does not meet the target aspect ratio condition when the aspect ratio of the available display area 401 is greater than the target aspect ratio. In some embodiments, the aspect ratio of the available display area 401 does not meet the target aspect ratio condition if the aspect ratio of the available display area 401 is not less than the target aspect ratio. The available display area 401 can be divided horizontally when the aspect ratio of the available display area 401 meets the aspect ratio condition. In some embodiments, the aspect ratio of the available display area 401 meets the target aspect ratio condition when the aspect ratio of the available display area 401 is less than the target aspect ratio.

Figure 5B:
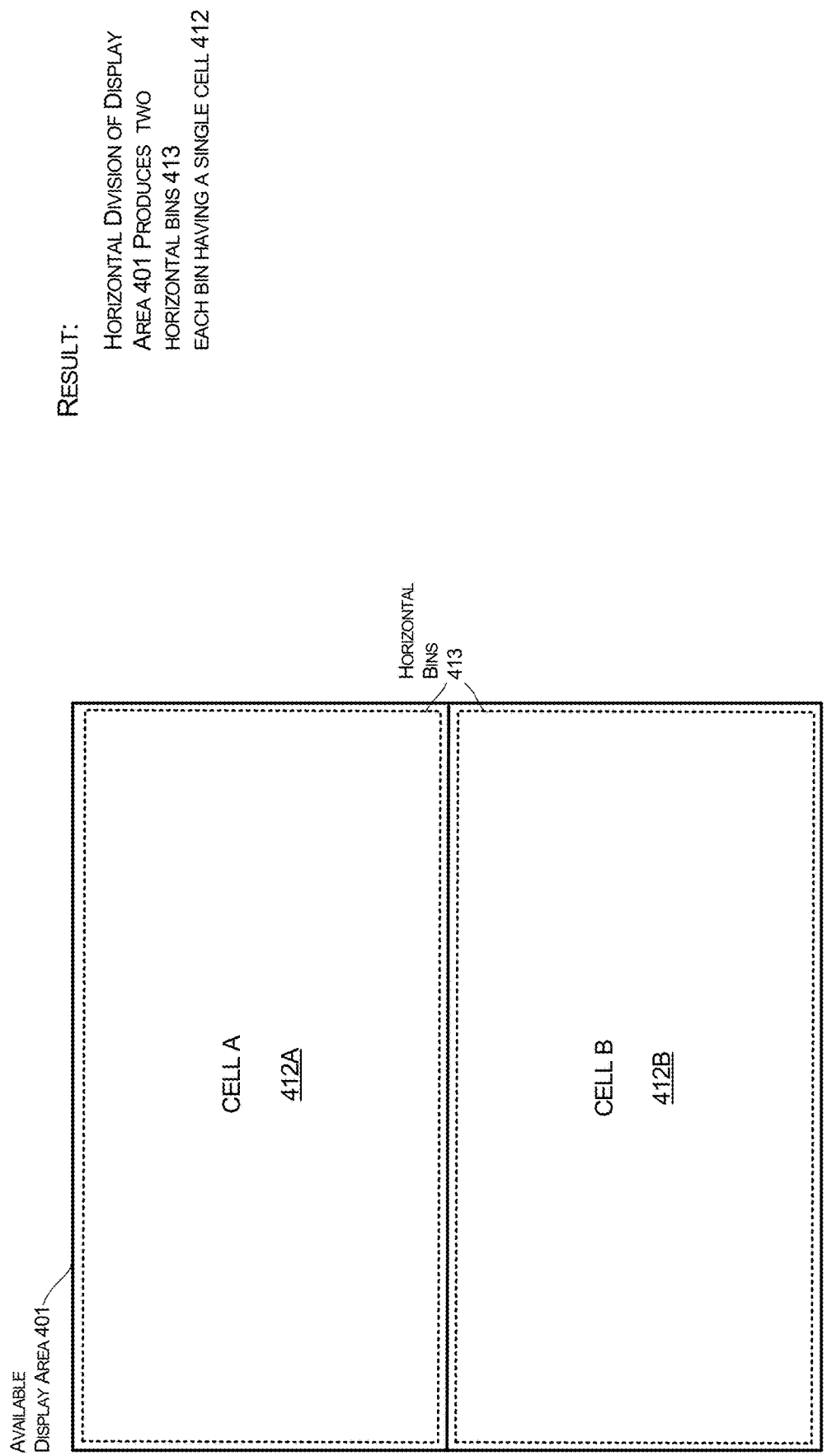
FIG. 5B illustrates aspects of a second state of a process for configuring an arrangement of video stream renderings within a user interface based on an aspect ratio of an available display area and an adjusted target aspect ratio.

In the example of FIG. 5A, for illustrative purposes, it is a given that the target aspect ratio is 4:3 and the aspect ratio of the available display area for one is 1:1. When such parameters are processed using the aspect ratio condition defined above, as shown in FIG. 5B, the available display area is divided horizontally. Specifically, the target aspect ratio is greater than the aspect ratio of the available display area. Thus, the available display area is divided horizontally and data defining horizontal bins is generated. When an available display area is divided horizontally, each section resulting from the division is populated with a horizontal bin 413, each containing one cell. This example, each horizontal bin 413 is respectively populated with a first cell, Cell A 412A, and a second cell, Cell B 412B. Each cell can be populated with a video stream rendering based on a priority of each stream. In some configurations, stream renderings can be prioritized based on an order in which a participant joins a communication session. In some configurations, the streams can be prioritized based on an activity level associated with each stream, such as a level of movement of a participant depicted in a stream, a level of volume of a participant depicted in a stream, etc. Each stream rendering can be positioned within each cell based on a priority of each stream, e.g., Cell A can be used to display the stream having the first priority, and Cell B can be used to display the stream having the second priority.

Next, as shown in FIG. 5C, the bins are analyzed to determine if the bins are filled equally with cells. In this example, each bin 413 contains only one cell, e.g., the cells are filled equally. Thus, the process continues to an operation where at least one cell is analyzed.

Figure 5D:
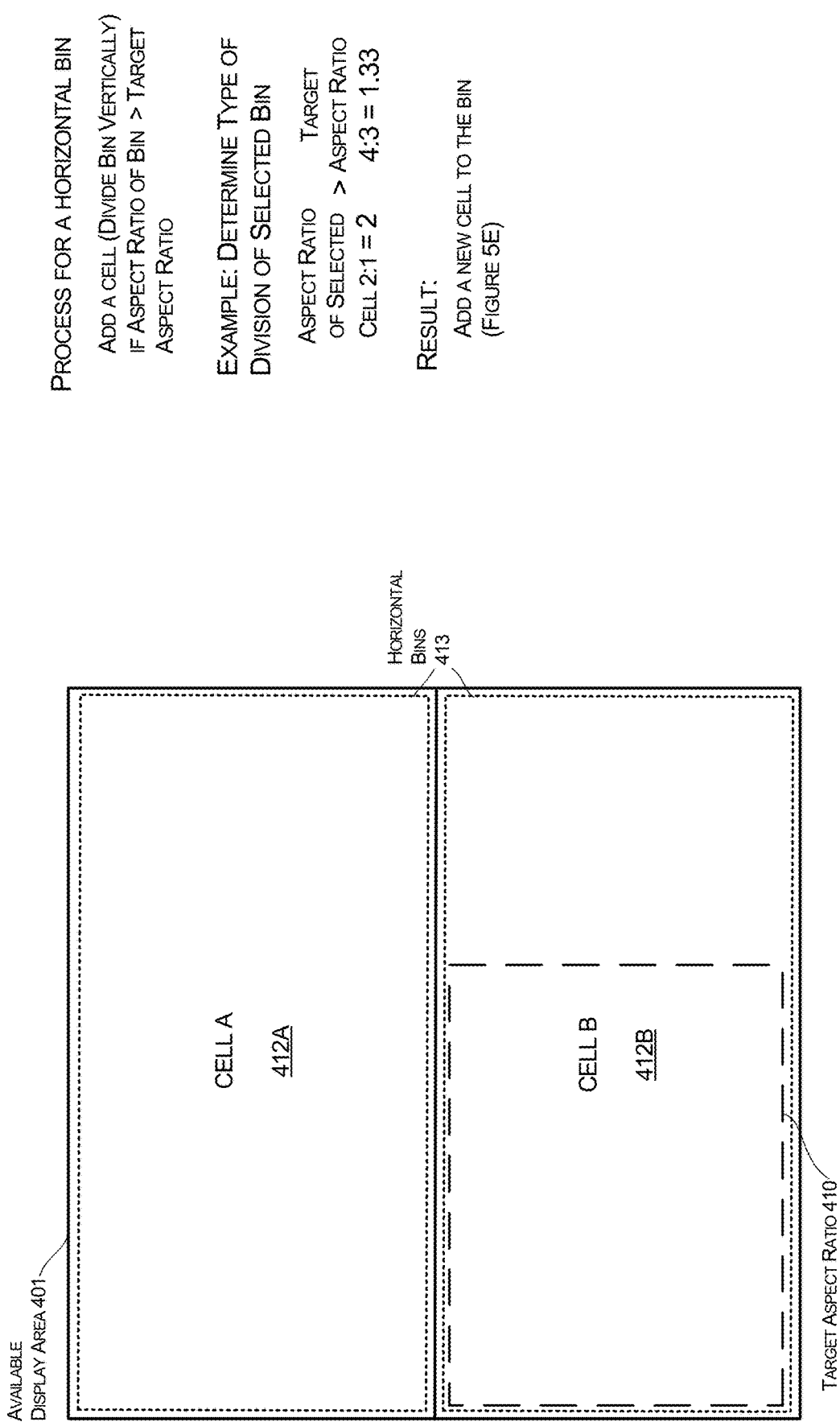
FIG. 5D illustrates aspects of a fourth state of a process for configuring an arrangement of video stream renderings within a user interface based on an aspect ratio of an available display area and an adjusted target aspect ratio.
Figure 5E:
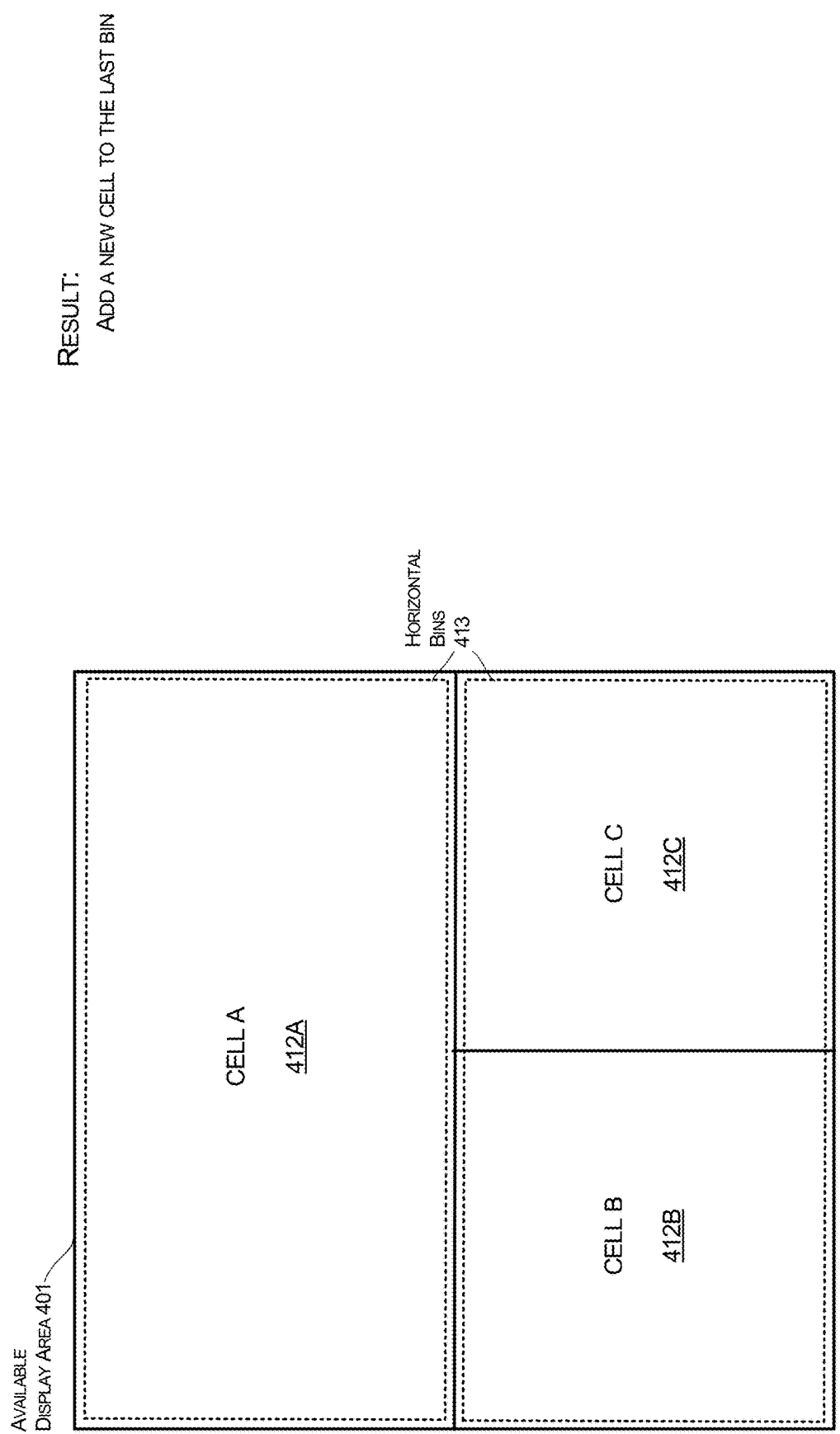
FIG. 5E illustrates aspects of a fifth state of a process for configuring an arrangement of video stream renderings within a user interface based on an aspect ratio of an available display area and an adjusted target aspect ratio.

FIG. 5D shows aspects of an operation for analyzing a selected cell of the user interface. For this operation, any cell can be selected for analysis. In some configurations, a bottom cell can be selected, or a most recently added cell can be selected. In this example, Cell B 412B is selected. In this operation, if the aspect ratio of the selected cell is greater than the target aspect ratio (CAR>TAR) and if the selected cell is in a horizontal bin, a new cell is added to the last bin, e.g., the last bin can be divided vertically. In this specific example, since the selected cell is in a horizontal bin and since the aspect ratio of the selected cell, 2:1, is greater than the target aspect ratio, 4:3, a new cell, Cell C 412C, is added to the last bin, as shown in FIG. 5E.

Each time a new cell is added, the system checks to see if the number of cells equals the number of selected streams. Once the number of cells equals the number of selected streams, the routine can terminate. For instance, if the number of selected streams is three, the recursive process of further dividing the display area would terminate with the configuration shown in FIG. 5E. However, in returning to the current example, given that the number of selected streams is five and the number of cells is three, the routine continues with the operation shown in FIG. 5F.

Figure 5F:
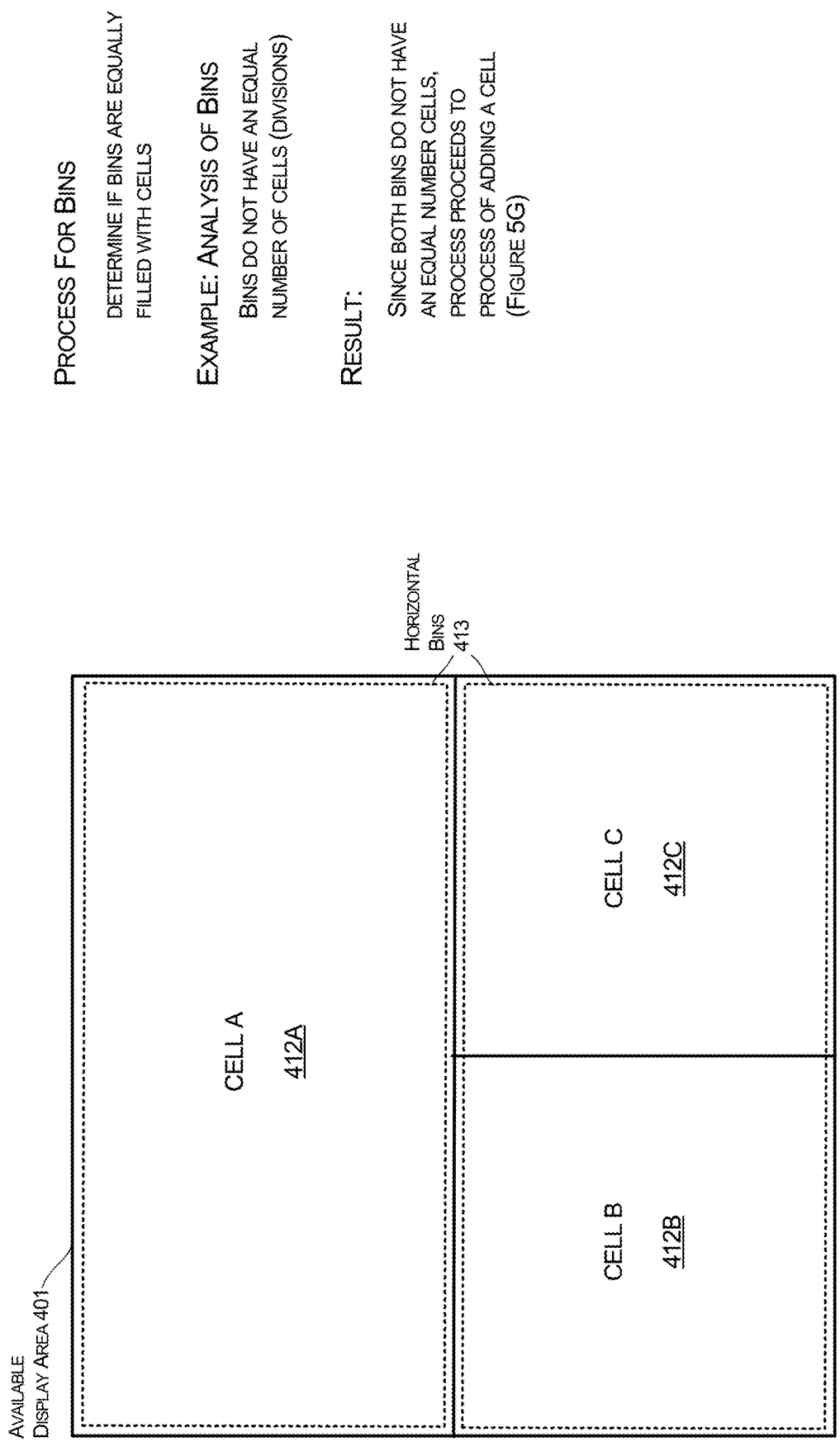
FIG. 5F illustrates aspects of a sixth state of a process for configuring an arrangement of video stream renderings within a user interface based on an aspect ratio of an available display area and an adjusted target aspect ratio.
Figure 5G:
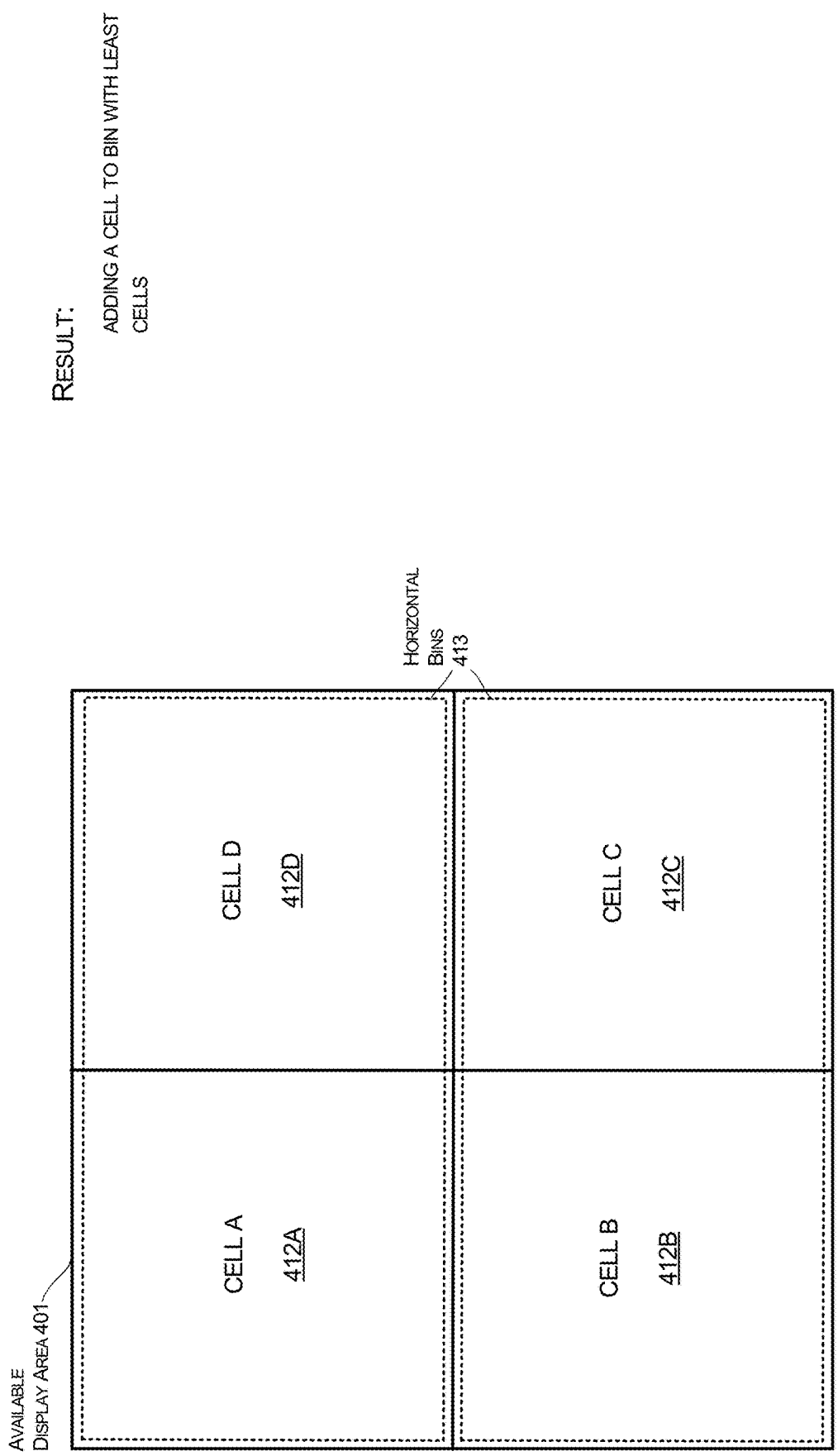
FIG. 5G illustrates aspects of a seventh state of a process for configuring an arrangement of video stream renderings within a user interface based on an aspect ratio of an available display area and an adjusted target aspect ratio.

Once a cell is added, and if the number of cells is less than the number of selected streams, the process restarts at an operation where the system determines if the cells are equally filled. As shown in FIG. 5F, given that the bins 413 do not have an equal number of cells, a new cell is added to the bin with the least number of cells. As shown in FIG. 5G, a new cell, Cell D 412D is added to the first bin.

Again, as part of the recursive process, once a cell is added, and if the number of cells is less than the number of selected streams, the process restarts at the operation where the system determines if the cells are equally filled. In the state shown in FIG. 5G, it is determined that the bins are equally filled. If it is determined that the bins are equally filled, the process proceeds to an operation where one of the cells is selected for analysis. Any one of the cells can be selected for analysis. In some configurations, the right-bottom cell of a display area can be selected for analysis. In this example, Cell C 412C is selected for analysis. The analysis can compare the aspect ratio of the selected cell with the target aspect ratio.

Figure 5H:
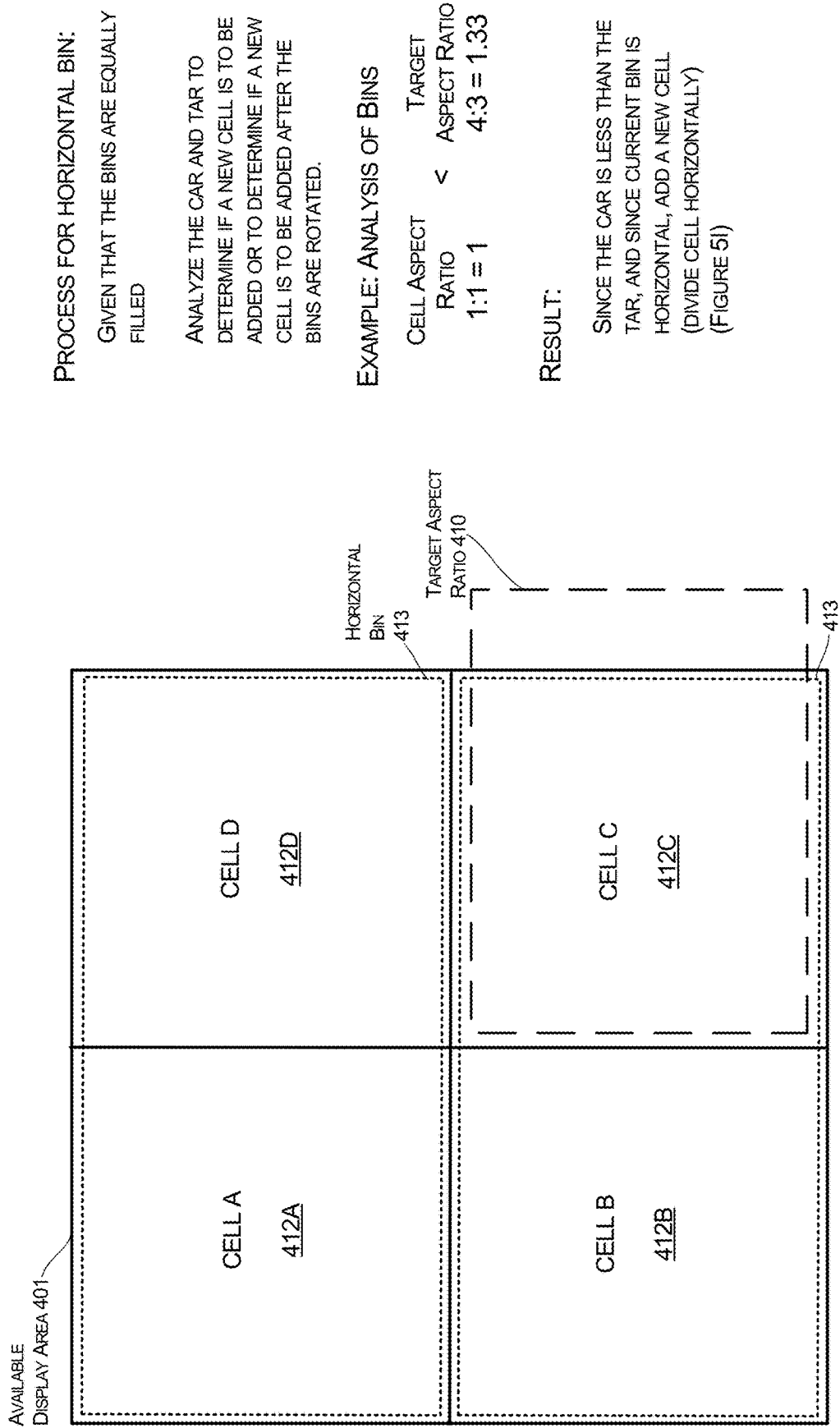
FIG. 5H illustrates aspects of an eighth state of a process for configuring an arrangement of video stream renderings within a user interface based on an aspect ratio of an available display area and an adjusted target aspect ratio.

As shown in FIG. 5H, if the cell aspect ratio is less than the target aspect ratio (CAR<TAR) and if the selected cell is in a horizontal bin, the system rotates the bins, e.g., changes the horizontal bins to vertical bins, and adds a new cell to the last bin. In the current example, the cell aspect ratio 1:1 is less than the target aspect ratio, 4:3, and the selected cell is in a horizontal bin. As a result, as shown in FIG. 5I, the horizontal bins 413 are converted to vertical bins 411, and individual vertical bins 411 are aligned with individual rows of cells. After the bins are rotated, a new cell, such as Cell E 412E, is added to the last bin. The last bin can include the right most bin and/or the bottom bin. At this point the process stops the recursive division process since the number of selected streams equals the number of cells in the available display area.

Figure 6:
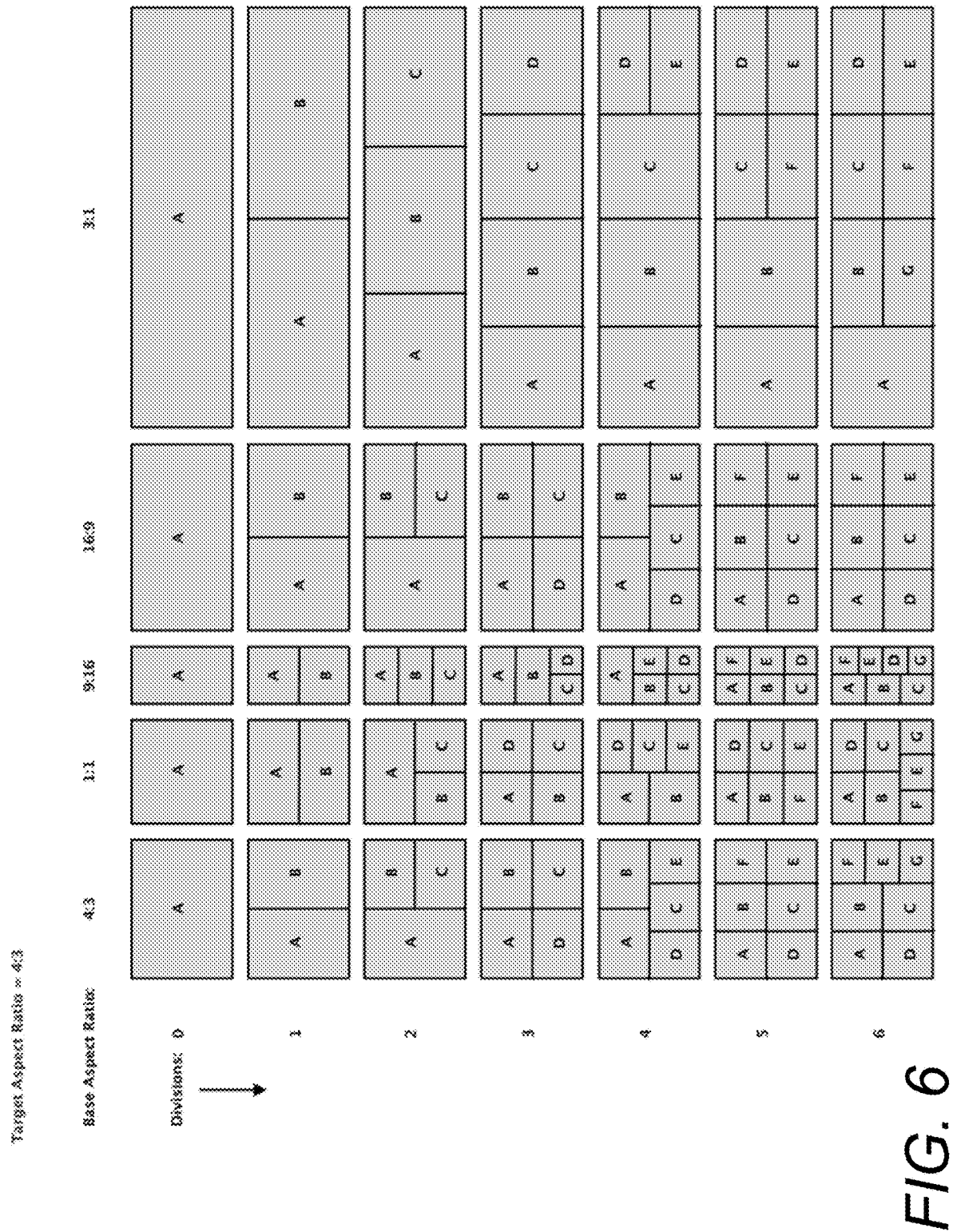
FIG. 6 illustrates the number of a number of different user interface arrangements that are configured based on aspect ratios of available display areas and various target aspect ratios.

Referring now to FIG. 6, a number of different user interface arrangements that are configured based on aspect ratios of available display areas and various target aspect ratios is shown and described below. These examples illustrate the versatility of the techniques disclosed herein. A single target aspect ratio can be used to configure user interfaces or available display areas having any aspect ratio. Similar to the examples described above, the order in which different streams can be displayed within the cells can be based on the designated letters, e.g., A, B, C, etc.

These examples are provided for illustrative purposes and are not to be construed as limiting. It can be appreciated that any target aspect ratio can be used to configure a user interface having an available display area of any dimension. At the same time, it can be appreciated that different target aspect ratios can be used to produce different arrangements for any given user interface dimension for optimizing the screen space of the device while providing a variety of different arrangement styles that suit different needs.

Figure 7:
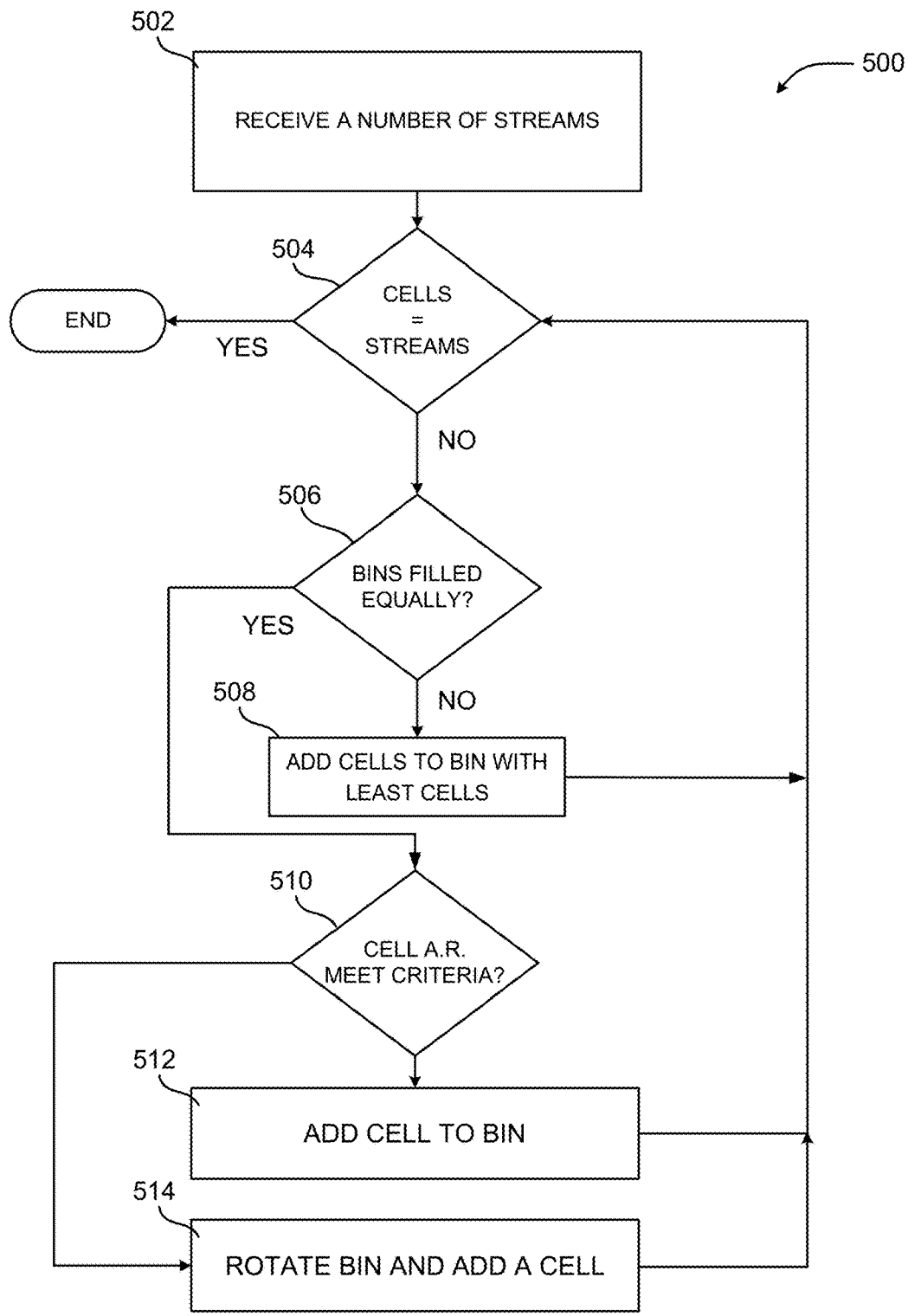
FIG. 7 is a flow diagram illustrating aspects of a routine for computationally efficient generation of user interface arrangements based on an aspect ratio of an available display area and a predetermined target aspect ratio.

FIG. 7 is a diagram illustrating aspects of a routine 500 for improving user engagement and more efficient use of computing resources by providing a system that dynamically configures communication video stream arrangements based on an aspect ratio of an available display area and a target aspect ratio. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 7 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices associated with a communication session.

The routine 500 starts at operation 502, where one or more computing modules receive a plurality of streams. As described in more detail below, a system can manage a number of streams received from a number of different client devices. The streams can be bundled and communicated to individual computing devices, which may be used to display different arrangements of each stream. Each stream may comprise an audio component and a video component.

Next, at operation 504, where one or more computing devices analyzes the received streams to determine if the available display area has a number of cells equal to a number of streams that are selected for display. If the available display area has a number of cells equal to the number of selected streams, the routine can terminate or return to operation 502 where the one or more computing devices can receive the streams and display renderings of the streams. If the one or more devices are to display only one selected stream and the available display area contains one cell, the available display area is not divided, and the one or more devices render the selected stream. However, at operation 504, if the number of selected streams is greater than the number of cells of a user interface, the routine 500 proceeds to operation 506 where bins of the user interface are analyzed to determine if the bins are filled equally with cells.

At operation 506, if the bins of the user interface are not filled equally with cells, the routine 500 proceeds to operation 508 where a cell is added to the bin with the least number of cells. However, if the bins of the user interface are filled equally with cells, routine 500 proceeds to operation 510 where a selected cell of at least one bin is analyzed to determine if an aspect ratio of the cells meets one or more criteria.

In one illustrative example, at operation 510, when there is only one bin and one cell, there the available display area 401 can be divided vertically when the aspect ratio of the available display area 401 does not meet a target aspect ratio condition. In some embodiments, the aspect ratio of the available display area 401 does not meet the target aspect ratio condition when the aspect ratio of the available display area 401 is greater than the target aspect ratio. In some embodiments, the aspect ratio of the available display area 401 does not meet the target aspect ratio condition if the aspect ratio of the available display area 401 is not less than the target aspect ratio. The available display area 401 can be divided horizontally when the aspect ratio of the available display area 401 meets the aspect ratio condition. In some embodiments, the aspect ratio of the available display area 401 meets the target aspect ratio condition when the aspect ratio of the available display area 401 is less than the target aspect ratio.

In some embodiments, at operation 510, if the aspect ratio of a selected cell is less than the target aspect ratio (CAR<TAR) and if the selected cell is in a vertical bin, the routine 500 proceeds to operation 512 where a new cell is added to the last bin, e.g., the last bin can be divided horizontally. An example of this operation is shown in FIG. 4E. In that example, since the selected cell is in a vertical bin and since the aspect ratio of the selected cell, 1:2, is less than the target aspect ratio, 7:9, a new cell, Cell C 412C, is added to the last bin. After operation 512, the routine 500 proceeds back to operation 504 where the one or more devices determines if the number streams is equal to the number of cells in the user interface.

In some embodiments, at operation 510, if a cell aspect ratio is greater than the target aspect ratio (CAR>TAR) and if the selected cell is in a vertical bin, the routine 500 proceeds to operation 514 the system rotates the bins, e.g., changes the vertical bins to horizontal bins, and adds a new cell to the last bin. An example of this operation is shown in FIG. 4I. In that example, the cell aspect ratio 1:1 is greater than the target aspect ratio, 7:9. As a result, as shown in FIG. 4J, the vertical bins are converted to horizontal bins 413, where individual horizontal bins 413 is aligned with individual row of cells. After the bins are rotated, a new cell, such as Cell E 412E, is added to the last bin. The last bin can include the right most bin and/or the bottom bin. After operation 514, the routine 500 proceeds back to operation 504 where the one or more devices determines if the number streams is equal to the number of cells in the user interface.

In some embodiments, at operation 510, if the cell aspect ratio is less than the target aspect ratio (CAR<TAR) and if the selected cell is in a horizontal bin, the routine 500 proceeds to operation 514 where the bins are rotated, e.g., the horizontal bins are changed to vertical bins, and a new cell is added to the last bin. An example of this operation is shown in FIG. 4N. In that example, the cell aspect ratio 2:3 is less than the target aspect ratio, 7:9. As a result, as shown in FIG. 4O, the horizontal bins are converted to vertical bins 411, where a vertical bin 411 is aligned with each existing column of cells. After the vertical bins 411 are generated, a new cell, such as Cell G 412G, is added to the last bin. The last bin can include the right and/or bottom bin. After operation 514, the routine 500 proceeds back to operation 504 where the one or more devices determines if the number streams is equal to the number of cells in the user interface.

In some embodiments, at operation 510, if the aspect ratio of the selected cell is greater than the target aspect ratio (CAR>TAR) and if the selected cell is in a horizontal bin, the routine 500 proceeds to operation 512 where a new cell is added to the last bin, e.g., the last bin can be divided vertically. An example of this operation is shown in FIG. 5D. In that specific example, since the selected cell is in a horizontal bin and since the aspect ratio of the selected cell, 2:1, is greater than the target aspect ratio, 4:3, the routine 500 proceeds to operation 512 where a new cell, Cell C 412C, is added to the last bin, as shown in FIG. 5E. After operation 512, the routine 500 proceeds back to operation 504 where the one or more devices determines if the number streams is equal to the number of cells in the user interface.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 8:
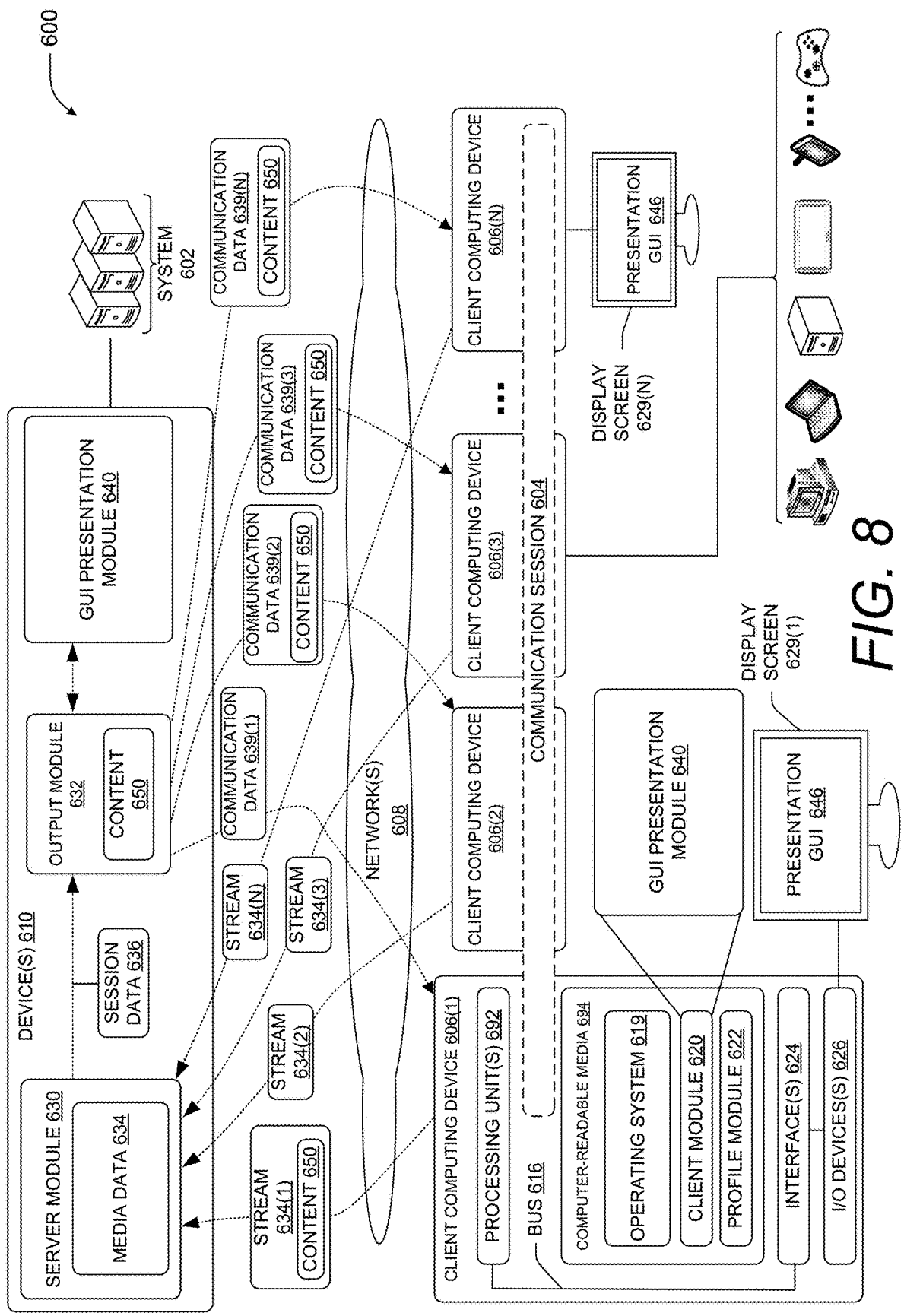
FIG. 8 is a computing system diagram showing aspects of an illustrative operating environment for the technologies disclosed herein.

FIG. 8 is a diagram illustrating an example environment 600 in which a system 602 can implement the techniques disclosed herein. In some implementations, a system 602 may function to collect, analyze, and share data defining one or more objects that are displayed to users of a communication session 604.

As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 8 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 8 illustrates that client computing device 606(1) is in some way connected to a display device (e.g., a display screen 629(N)), which can display a UI according to the techniques described herein.

In the example environment 600 of FIG. 8, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 8) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 8, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such a image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different than the general communication session.

Figure 9:
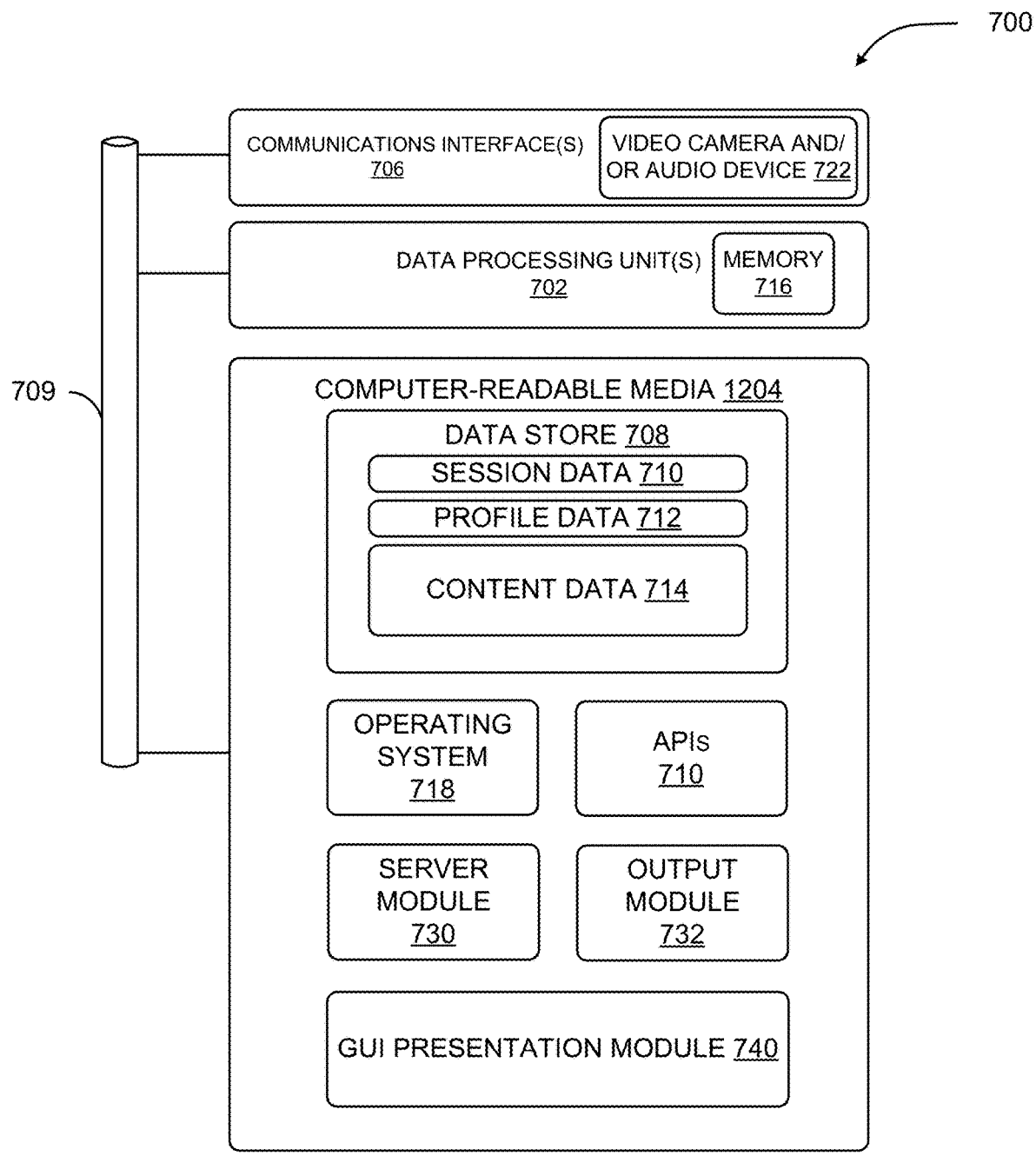
FIG. 9 is a computing architecture diagram showing aspects of the configuration and operation of a computing device that can implement aspects of the technologies disclosed herein.

FIG. 9 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 8), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include content data 714, such as the content that includes video, audio, or other content for rendering and display on one or more of the display screens 629.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary higher or lower. That is, functionality described herein in association with the illustrated modules may be performed by a fewer number of modules or a larger number of modules on one device or spread across multiple devices.

The disclosure presented herein also encompasses the subject matter set forth in the following clauses.

Clause A: A method performed by a computing system 110, the method comprising: receiving a plurality of streams 111, individual streams of the plurality of streams comprising a video component; analyzing the plurality of streams 111 to identify select streams 111A having at least one video component depicting at least a threshold 118 number of individuals 119A; selecting a first aspect ratio 131 from a plurality of preset aspect ratios, the first aspect ratio reserved for the select streams 111A having one or more video components depicting at least the threshold 118 number of individuals 119A; selecting a second aspect ratio 132 from the plurality of preset aspect ratios, the second aspect ratio reserved for other streams having one or more video components depicting less than the threshold 118 number of individuals 119B, wherein the first aspect ratio 131 is greater than the second aspect ratio 132; causing a transmission of communication session data 113 and the plurality of streams 111 to a plurality of client computing devices 101, the communication session data 113 causing the plurality of client computing devices 101 to display a user interface 120 having a first set of individual renderings 111A' of the select streams 111A having video components depicting at least the threshold 118 number of individuals 119A) the first set of individual renderings displayed using the first aspect ratio that is selected using the number of depicted individuals, and a second set of individual renderings 111B'-111E' of the other streams 111B-111E having the one or more video components depicting less than the threshold 118 number of individuals 119B-119E, the second set of individual renderings having a second aspect ratio 132 that is less than the first aspect ratio 131.

Clause B: The method of clause A, further comprising: analyzing the other streams 111B-111E having the one or more video components depicting less than the threshold 118 number of individuals 119B-119E to determine if one or more video components of the other streams 111B-111E starts to depict the threshold number of individuals; and in response to determining if one or more video components of the other streams 111B-111E starts to depict the threshold number of individuals, modify the communication session data 113 to cause the user interface 120 to transition the display of at least one of the other streams that started to depict the threshold number of individuals from the second aspect ratio to the first aspect ratio.

Clause C: The method of clauses A and B, further comprising: analyzing the select streams 111E having video components depicting at least the threshold 118 number of individuals 119E to determine if one or more video components of the select streams 111E starts to depict less than the threshold number of individuals; and in response to determining if one or more video components of the select streams 111E starts to depict less than the threshold number of individuals, modify the communication session data 113 to cause the user interface 120 to transition the display the select streams 111E that started to depict less than the threshold number of individuals from the first aspect ratio to the second aspect ratio.

Clause D: The method of Clauses A through C, further comprising: analyzing the plurality of streams to determine a number of people depicted in the video components of each stream; and configuring the user interface to order individual renderings of each stream based on the number of people depicted in the video components of each stream.

Clause E: The method of clauses A through D, wherein a target aspect ratio is selected based on one or more dimensions of a display device in communication with computing system, wherein the first aspect ratio is greater than the target aspect ratio and the second aspect ratio is less than the target aspect ratio.

Clause F: The method of clauses A through E, wherein the first aspect ratio is greater than a first target aspect ratio and the second aspect ratio is less than a second target aspect ratio.

Clause G: The method of clauses A through F, wherein the first target aspect ratio and the second target aspect ratio are selected based on one or more dimensions of a display device in communication with computing system.

Clause H: The method of clauses A through G, further comprising: receiving a user input to adjust the first aspect ratio; generating usage data defining an adjusted target aspect ratio that is based on the input used for adjusting the first aspect ratio, the adjusted target aspect ratio being greater than the target aspect ratio if the user input increases the first aspect ratio; and storing the adjusted target aspect ratio causing subsequent executions of the method to set the first aspect ratio to a value that is greater than or equal to the adjusted target aspect ratio.

Clause I: The method of clauses A through H, further comprising: receiving a user input to adjust the second aspect ratio; generating usage data defining an adjusted target aspect ratio that is based on the input for adjusting the second aspect ratio, the adjusted target aspect ratio being less than the target aspect ratio if the user input decreases the second aspect ratio; and storing the adjusted target aspect ratio causing subsequent executions of the method to set the second aspect ratio to a value that is less than or equal to the adjusted target aspect ratio.

Clause J: A system 101, comprising: one or more processing units 692; and a computer-readable medium 694 having encoded thereon computer-executable instructions to cause the one or more processing units 692 to: analyze a plurality of streams 111 to identify select streams 111A having at least one video component depicting at least a threshold 118 number of individuals 119A; select a first aspect ratio 131 from a plurality of preset aspect ratios, the first aspect ratio reserved for the select streams 111A having one or more video components depicting at least the threshold 118 number of individuals 119A; select a second aspect ratio 132 from the plurality of preset aspect ratios, the second aspect ratio reserved for other streams having one or more video components depicting less than the threshold 118 number of individuals 119B, wherein the first aspect ratio 131 is greater than the second aspect ratio 132; cause a display of a user interface 120 having a first set of individual renderings 111A' of the select streams 111A having video components depicting at least the threshold 118 number of individuals 119A, the first set of individual renderings displayed using the first aspect ratio that is selected using the number of depicted individuals, and a second set of individual renderings 111B'-111E' of the other streams 111B-111E having the one or more video components depicting less than the threshold 118 number of individuals 119B-119E, the second set of individual renderings having a second aspect ratio 132 that is less than the first aspect ratio 131.

Clause K: The system of clause J, wherein the instructions further cause the one or more processing units to: analyze the other streams 111B-111E having the one or more video components depicting less than the threshold 118 number of individuals 119B-119E to determine if one or more video components of the other streams 111B-111E starts to depict the threshold number of individuals; and in response to determining if one or more video components of the other streams 111B-111E starts to depict the threshold number of individuals, modify the user interface 120 to display at least one of the other streams depicting the threshold number of individuals using the first aspect ratio.

Clause L: The system of clauses J and K, wherein the instructions further cause the one or more processing units to: analyze the select streams 111E having video components depicting at least the threshold 118 number of individuals 119E to determine if one or more video components of the select streams 111E starts to depict less than the threshold number of individuals; and in response to determining if one or more video components of the select streams 111E starts to depict less than the threshold number of individuals, modify the communication session data 113 to cause the user interface 120 to display the select streams 111E that started to depict less than the threshold number of individuals using the second aspect ratio.

Clause M: The system of clauses J through L, wherein the instructions further cause the one or more processing units to: analyze the plurality of streams to determine a number of people depicted in the video components of each stream; and configure the user interface to order individual renderings of each stream based on the number of people depicted in the video components of each stream.

Clause N: The system of clauses J through M, wherein a target aspect ratio is selected based on one or more dimensions of a display device in communication with computing system, wherein the first aspect ratio is greater than the target aspect ratio and the second aspect ratio is less than the target aspect ratio.

Clause O: A system 110, comprising: means for receiving a plurality of streams 111, individual streams of the plurality of streams comprising a video component; means for analyzing the plurality of streams 111 to identify select streams 111A having at least one video component depicting at least a threshold 118 number of individuals 119A; means for selecting a first aspect ratio 131 from a plurality of preset aspect ratios, the first aspect ratio reserved for the select streams 111A having one or more video components depicting at least the threshold 118 number of individuals 119A; means for selecting a second aspect ratio 132 from the plurality of preset aspect ratios, the second aspect ratio reserved for other streams having one or more video components depicting less than the threshold 118 number of individuals 119B, wherein the first aspect ratio 131 is greater than the second aspect ratio 132; means for causing a display of a user interface 120 having a first set of individual renderings 111A' of the select streams 111A each being displayed using the first aspect ratio, and a second set of individual renderings 111B'-111E' of the other streams 111B-111E being displayed using a second aspect ratio 132 that is less than the first aspect ratio 131.

Clause P: The system of clause O, further comprising: means for analyzing the other streams 111B-111E having the one or more video components depicting less than the threshold 118 number of individuals 119B-119E to determine if one or more video components of the other streams 111B-111E starts to depict the threshold number of individuals; and means for modifying the communication session data 113 to cause the user interface 120 to transition the display of at least one of the other streams from the second aspect ratio to the first aspect ratio, the transition being in response to determining if one or more video components of the other streams 111B-111E starts to depict the threshold number of individuals Clause Q: The system of clauses O and P, further comprising: means for analyzing the select streams 111E having video components depicting at least the threshold 118 number of individuals 119E to determine if one or more video components of the select streams 111E starts to depict less than the threshold number of individuals; and means for modifying the communication session data 113 to cause the user interface 120 to display the select streams 111E to transition from the first aspect ratio to using the second aspect ratio, wherein the transition occurs in response to determining if one or more video components of the select streams 111E starts to depict less than the threshold number of individuals Clause R: The system of clauses O through Q, further comprising: means for analyzing the plurality of streams to determine a number of people depicted in the video components of each stream; and means for configuring the user interface to order individual renderings of each stream based on the number of people depicted in the video components of each stream.

Clause S: The system of clauses O through R, wherein a target aspect ratio is selected based on one or more dimensions of a display device in communication with computing system, wherein the first aspect ratio is greater than the target aspect ratio and the second aspect ratio is less than the target aspect ratio.

Clause T: The system of clauses O through S, wherein the first aspect ratio is greater than a first target aspect ratio and the second aspect ratio is less than a second target aspect ratio.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method performed by a computing system, the method comprising:
receiving a number of streams, individual streams of the number of streams comprising a video component;
receiving configuration data defining a target aspect ratio condition based on a target aspect ratio;
configuring user interface data defining a user interface by
vertically dividing an available display area creating a first vertical bin and a second vertical bin, if an aspect ratio of an available display area does not meet the target aspect ratio condition, or
horizontally dividing the available display area creating a first horizontal bin and a second horizontal bin, if the aspect ratio of the available display area meets the target aspect ratio condition;
recursively dividing the vertical bins or the horizontal bins to insert a number of cells equal to the number of streams, wherein individual cells are arranged within the vertical bins or the horizontal bins based on the target aspect ratio condition and at least one of an aspect ratio of the individual cells within the vertical bins or an aspect ratio of individual cells within the horizontal bins; and
causing a display of the user interface having the number of cells that are arranged by the target aspect ratio condition and at least one of an aspect ratio of individual cells within the vertical bins or an aspect ratio of individual cells within the horizontal bins, wherein individual cells of the number of cells each comprise a rendering of individual streams of the number of streams, wherein an aspect ratio of each cell is based on a number of divisions of the horizontal bins or the vertical bins.

2. The method of claim 1, wherein the aspect ratio of the available display area does not meet the target aspect ratio condition if the aspect ratio of the available display area is greater than a target aspect ratio.

3. The method of claim 1, wherein the aspect ratio of the available display area does not meet the target aspect ratio condition if the aspect ratio of the available display area is greater than or equal to a target aspect ratio.

4. The method of claim 1, wherein recursively dividing the vertical bins or the horizontal bins comprises:

determining that the vertical bins are equally filled with cells; and in response to determining that the vertical bins are equally filled with cells, and if an aspect ratio of the individual cell existing within a selected vertical bin is less than a target aspect ratio, adding a new cell to the selected vertical bin causing a horizontal division of the selected vertical bin.

5. The method of claim 4, further comprising:

determining if the first vertical bin and the second vertical bin are equally filled with cells; and in response to determining that the first vertical bin and the second vertical bin are not equally filled with cells, adding a new cell to a vertical bin having a least number of cells.

6. The method of claim 5, further comprising:

determining that the vertical bins are equally filled with cells; and in response to determining that the vertical bins are equally filled with cells, and if an aspect ratio of an individual cell existing within a selected vertical bin is greater than the target aspect ratio, generating data defining a transformation from the vertical bins to new horizontal bins and adding a new cell to one of the new horizontal bins.

7. The method of claim 1, wherein the aspect ratio of an available display area meets the target aspect ratio condition if the aspect ratio of the available display area is less than a target aspect ratio.

8. The method of claim 1, wherein recursively dividing the vertical bins or the horizontal bins comprises:

determining that the first horizontal bin and the second horizontal bin are equally filled with cells; and in response to determining that the first horizontal bin and the second horizontal bin are equally filled with cells, and if an aspect ratio of the individual cell existing within a selected horizontal bin is greater than a target aspect ratio, adding a new cell to the selected horizontal bin causing a vertical division of the selected horizontal bin.

9. The method of claim 8, further comprising: determining if the first horizontal bin and the second horizontal bin are equally filled with cells; and in response to determining that the first horizontal bin and the second horizontal bin are equally filled with cells, and if an aspect ratio of an individual cell existing within a selected horizontal bin is less than the target aspect ratio, generating data defining a transformation from the horizontal bins to new vertical bins and adding a new cell to one of the new vertical bins.

10. A method performed by a computing system, the method comprising:

receiving a number of streams, individual streams of the number of streams comprising a video component;

receiving configuration data defining a target aspect ratio;

configuring user interface data defining a user interface by vertically dividing an available display area to generate a first vertical bin and a second vertical bin within the available display area, if an aspect ratio of the available display area is greater than the target aspect ratio, or horizontally dividing the available display area to generate a first horizontal bin and a second horizontal bin within the available display area, if the aspect ratio of the display area is less than the target aspect ratio;

configuring the vertical bins or the horizontal bins with individual cells; and causing a display of the user interface having the cells arranged within the vertical bins or the horizontal bins based on a comparison of the target aspect ratio and at least one of an aspect ratio of individual cells within the vertical bins or an aspect ratio of individual cells within the horizontal bins, wherein the individual cells each comprise a rendering of individual streams of the number of streams.

11. The method of claim 10, further comprising:

determining that the first vertical bin and the second vertical bin are equally filled with cells; and determining that the first vertical bin and the second vertical bin are equally filled with cells, and if an aspect ratio of an individual cell existing within a selected vertical bin is less than the target aspect ratio, add a new cell to the selected vertical bin causing a horizontal division of the selected vertical bin.

12. The method of claim 10, further comprising:

determining if the first vertical bin and the second vertical bin are equally filled with cells; and in response to determining if the first vertical bin and the second vertical bin are equally filled with cells, and if an aspect ratio of an individual cell existing within a selected vertical bin is greater than the target aspect ratio, generating data defining a transformation from the vertical bins to new horizontal bins and adding a new cell to one of the new horizontal bins causing a vertical division of a selected horizontal bin of the new horizontal bins.

13. The method of claim 10, wherein recursively dividing the vertical bins or the horizontal bins comprises:

determining that the first horizontal bin and the second horizontal bin are equally filled with cells; and in response to determining that the first horizontal bin and the second horizontal bin are equally filled with cells, and if an aspect ratio of the individual cell existing within a selected horizontal bin is greater than a target aspect ratio, adding a new cell to the selected horizontal bin causing a vertical division of the selected horizontal bin.

14. The method of claim 10, further comprising:

determining if the first horizontal bin and the second horizontal bin are equally filled with cells; and in response to determining that the first horizontal bin and the second horizontal bin are not equally filled with cells, adding a new cell a horizontal bin having a least number of cells.

15. The method of claim 10, further comprising:

determining if the first horizontal bin and the second horizontal bin are equally filled with cells; and in response to determining that the first horizontal bin and the second horizontal bin are equally filled with cells, and if an aspect ratio of an individual cell existing within a selected horizontal bin is less than the target aspect ratio, generating data defining a transformation from the horizontal bins to new vertical bins and adding a new cell to one of the new vertical bins causing a horizontal division of a selected vertical bin of the new vertical bins.

16. A computing system, comprising:

means for receiving a number of streams, individual streams of the number of streams comprising a video component;

means for receiving configuration data defining a target aspect ratio;

means for configuring user interface data defining a user interface by vertically dividing an available display area to generate a first vertical bin and a second vertical bin within the available display area, if an aspect ratio of the available display area is greater than the target aspect ratio, or horizontally dividing the available display area to generate a first horizontal bin and a second horizontal bin within the available display area, if the aspect ratio of the display area is less than the target aspect ratio;

means for configuring the vertical bins or the horizontal bins with individual cells; and means for causing a display of the user interface having the cells arranged within the vertical bins or the horizontal bins based on a comparison of the target aspect ratio and at least one of an aspect ratio of individual cells within the vertical bins or an aspect ratio of individual cells within the horizontal bins, wherein the individual cells each comprise a rendering of individual streams of the number of streams.

17. The system of claim 16, further comprising:
means for determining that the first vertical bin and the second vertical bin are equally filled with cells; and
means for determining that the first vertical bin and the second vertical bin are equally filled with cells, and if an aspect ratio of an individual cell existing within a selected vertical bin is less than the target aspect ratio, add a new cell to the selected vertical bin causing a horizontal division of the selected vertical bin.

18. The system of claim 17, further comprising:
means for determining if the first vertical bin and the second vertical bin are equally filled with cells; and
means for in response to determining if the first vertical bin and the second vertical bin are equally filled with cells, and if an aspect ratio of an individual cell existing within a selected vertical bin is greater than the target aspect ratio, generate data defining a transformation from the vertical bins to new horizontal bins and add a new cell to one of the new horizontal bins causing a vertical division of a selected horizontal bin of the new horizontal bins.

19. The method of claim 1, further comprising:
receiving a user input resizing the available display area;
in response to the user input, recalculating the size, shape, and position of each cell of the number of cells by reconfiguring the user interface data defining the user interface.

20. The method of claim 1, wherein the number of cells is arranged by the target aspect ratio condition to minimize movement of one or more streams of the number of streams.

* * * * *